US012742527B2

(12) United States Patent
Collado et al.

(10) Patent No.: US 12,742,527 B2
(45) Date of Patent: Sep. 22, 2026

(54) LIGHTING FIXTURE

(71) Applicant: QTran, Inc., Milford, CT (US)

(72) Inventors: Justin Collado, Bridgeport, CT (US); Michael Kelley, Guilford, CT (US)

(73) Assignee: QTran, Inc., Milford, CT (US)

( * ) Notice: Subject to any disclaimer, the term of this patent is extended or adjusted under 35 U.S.C. 154(b) by 110 days.

(21) Appl. No.: 18/772,085

(22) Filed: Jul. 12, 2024

(65) Prior Publication Data

US 2025/0020294 A1 Jan. 16, 2025

Related U.S. Application Data

(60) Provisional application No. 63/513,772, filed on Jul. 14, 2023.

(51) Int. Cl.

| | |
|---|---|
| ***F21S 8/00*** | (2006.01) |
| ***F21S 8/02*** | (2006.01) |
| ***F21V 21/04*** | (2006.01) |
| ***F21V 23/00*** | (2015.01) |
| ***F21Y 103/10*** | (2016.01) |
| ***F21Y 115/10*** | (2016.01) |

(52) U.S. Cl.

CPC ............... *F21S 8/033* (2013.01); *F21S 8/026* (2013.01); *F21V 21/041* (2013.01); *F21V 23/002* (2013.01); *F21V 23/008* (2013.01); *F21Y 2103/10* (2016.08); *F21Y 2115/10* (2016.08)

(58) Field of Classification Search

CPC . F21S 8/033; F21S 8/026; F21S 8/036; F21V 21/041; F21V 21/00; F21V 21/02; F21V 21/116; F21V 23/002; F21V 23/008; F21Y 2103/10; F21Y 2115/10

See application file for complete search history.

(56) References Cited

U.S. PATENT DOCUMENTS 11,490,474 B1 * 11/2022 Lax ......................... F21S 8/036

* cited by examiner

*Primary Examiner* — Anne M Hines
*Assistant Examiner* — Jose M Diaz
(74) *Attorney, Agent, or Firm* — Ware, Fressola, Maguire & Barber LLP

(57) ABSTRACT

An exemplary aspect of the present invention is directed to a lighting fixture having a mounting bracket configured for attachment to a surface and having a supporting arm and a retaining bay at least partially bounded by the supporting arm, a housing configured for attachment to the mounting bracket and having a longitudinal hook extending at least partially along a length of the housing, a light module configured for removable attachment to the housing, and a flange configured for attachment to the mounting bracket.

20 Claims, 54 Drawing Sheets

E - Corner

ILC

Inside Lit Corner

OLC

Outside Lit Corner

FIG. 71A
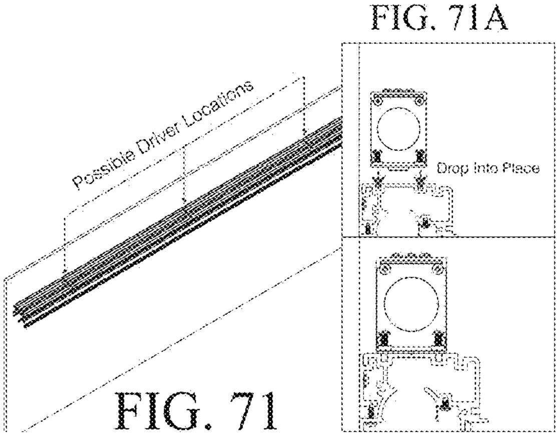
FIG. 71
FIG. 71B
FIG. 72A
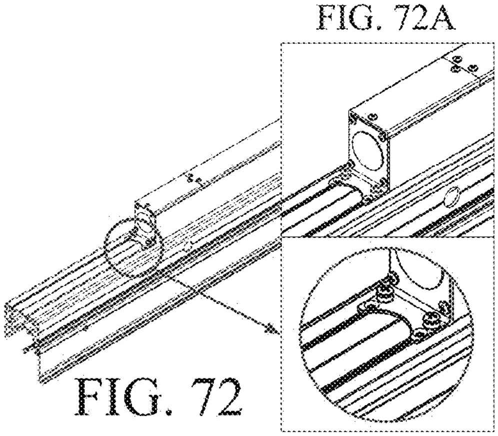
FIG. 72
FIG. 72B
FIG. 73A
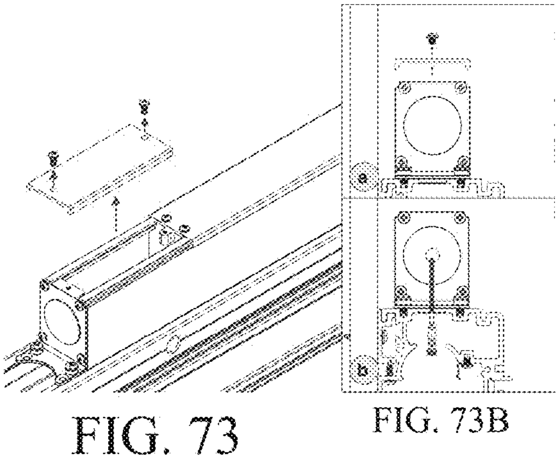
FIG. 73
FIG. 73B
FIG. 74A
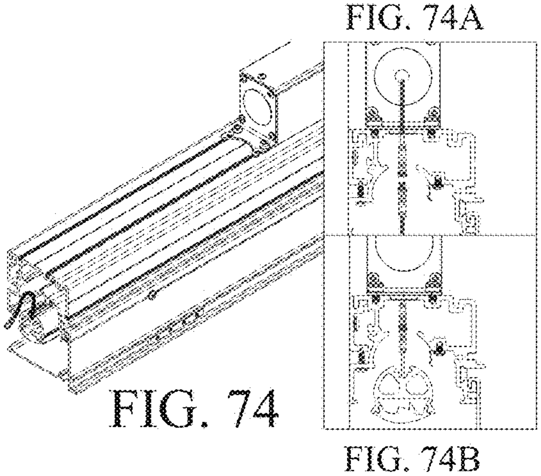
FIG. 74
FIG. 74B FIG. 75A
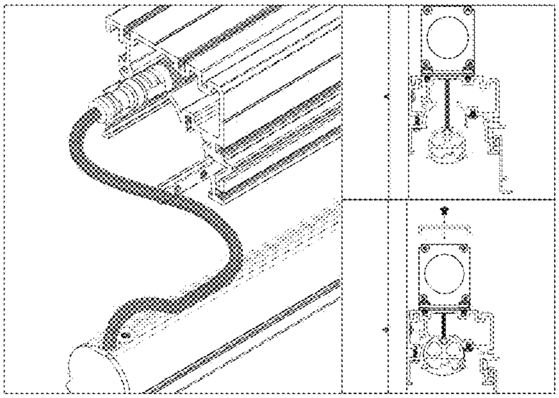
FIG. 75 FIG. 75B
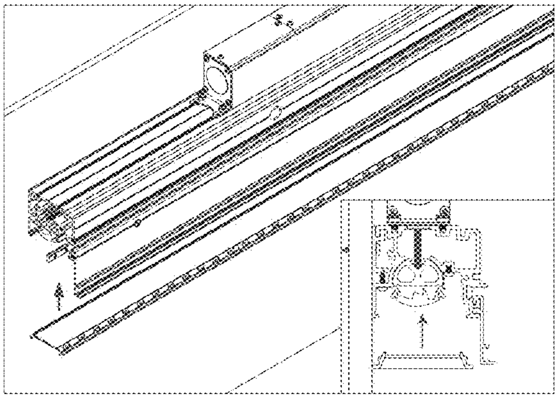
FIG. 76 FIG. 77
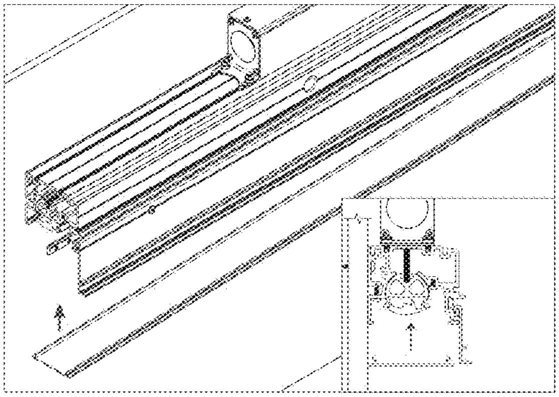
FIG. 78 FIG. 78A
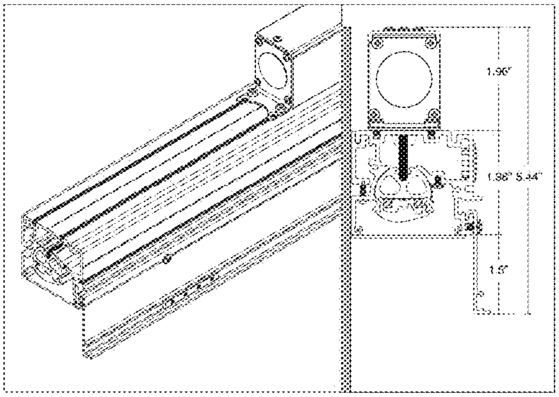
FIG. 79 FIG. 79A FIG. 80A
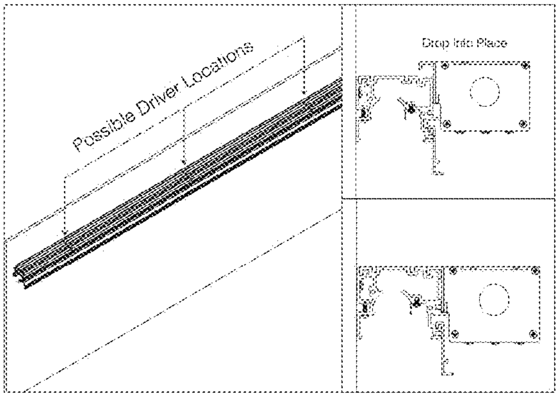
FIG. 80
FIG. 80B
FIG. 81A
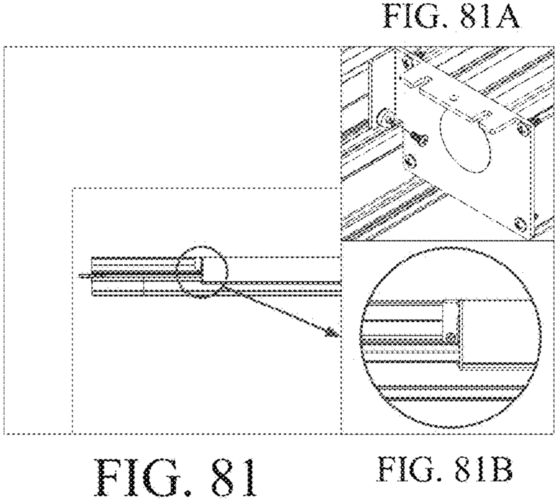
FIG. 81
FIG. 81B
FIG. 82A
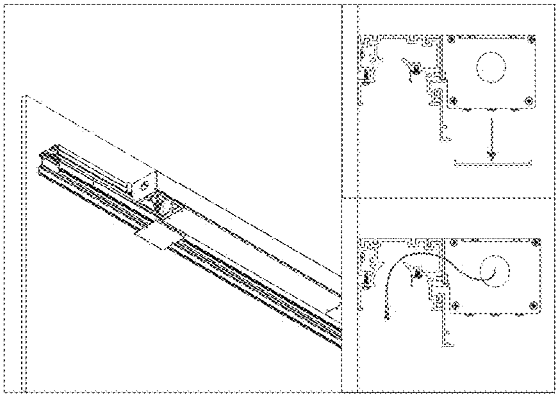
FIG. 82
FIG. 82B
FIG. 83A
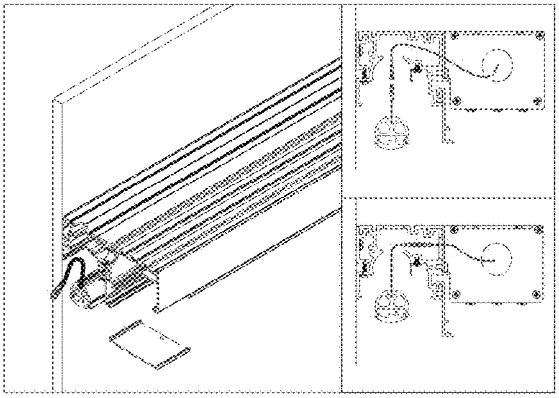
FIG. 83
FIG. 83B FIG. 84A
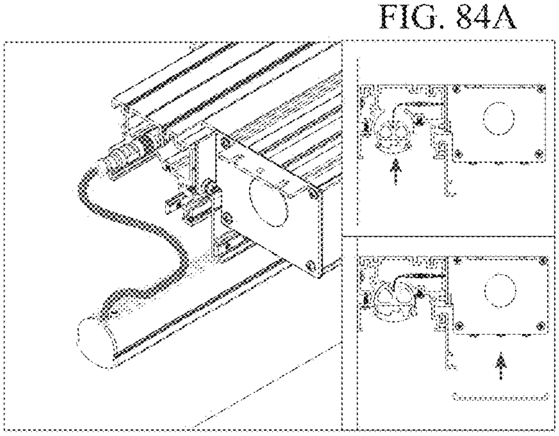
FIG. 84
FIG. 84B
FIG. 85A
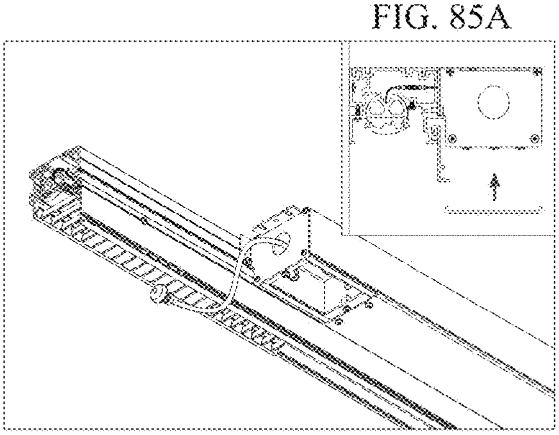
FIG. 85
FIG. 86A
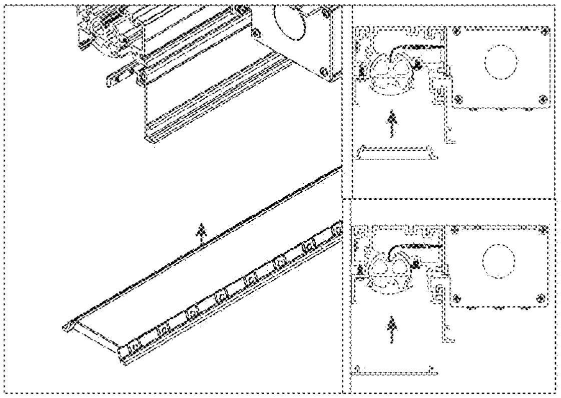
FIG. 86
FIG. 86B
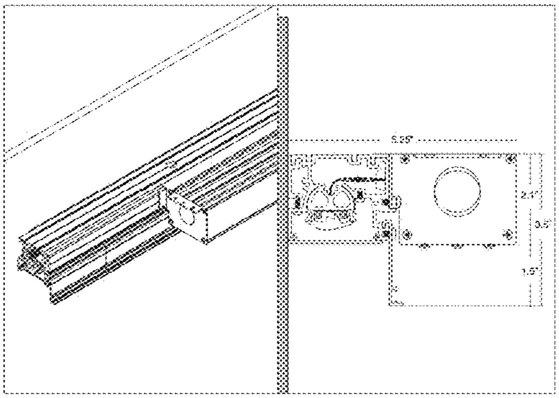
FIG. 87
FIG. 87A

LIGHTING FIXTURE

CROSS-REFERENCE TO RELATED APPLICATIONS

This application claims priority to U.S. Provisional Appl. No. 63/513,772 filed Jul. 14, 2023, which is hereby incorporated by reference in its entirety.

BACKGROUND OF THE INVENTION

1. Field of the Invention

The present invention generally relates to a linear lighting fixture, and more particularly to a lighting fixture that can be configured for installation along a perimeter of an area for lighting applications related to illumination of the area.

SUMMARY OF THE INVENTION

Exemplary embodiments of the present invention are directed to a lighting fixture that is configured for use in perimeter lighting applications.

It is an object of the present invention to provide a lighting fixture configured to provide asymmetric lighting by installing the lighting fixture on a wall and directing light from the lighting fixture across a floor adjacent to the wall and to the edge of the wall.

It is another object of the present invention to provide a lighting fixture configured to provide grazer lighting by installing the lighting fixture on a wall and directing light from the lighting fixture downward onto the wall in order to highlight a texture of the wall, a pattern on the wall or artwork affixed to the wall.

It is still another object of the present invention to provide a lighting fixture configured for installation in shallow plenums.

It is yet another object of the present invention to provide a lighting fixture having a compact assembly.

It is another object of the present invention to provide a lighting fixture having multiple mounting options for an integral power supply, and one or more options for connection of the wiring of the power supply to a lighting element of the lighting fixture.

It is still another object of the present invention to provide a lighting fixture configured for adaptation of the power feed during installation in order to avoid existing obstructions such as structural beams or building systems.

It is yet another object of the present invention to provide a lighting fixture having a modular construction to provide for a phased in approach to installation of the lighting fixture to facilitate installation and reduce the likelihood of damage to the lighting fixture during installation.

It is still another object of the present invention to provide a lighting fixture configured for adaption to a number of lighting engines, optics and mounting flanges.

It is another object of the present invention to provide a lighting fixture configured for installation at various heights on a wall surface relative to a fixed ceiling and/or floor.

It is yet another object of the present invention to provide a lighting fixture having light diffuser providing high lumen output with low glare.

It is still another object of the present invention to provide a lighting fixture having a flexible lens allowing for a seamless lens over a variety of lengths of the lighting fixture.

In order to achieve these and other objects of the present invention, a lighting fixture according to an exemplary aspect of the present invention is provided that may include a mounting bracket configured for attachment to a surface and having a supporting arm and a retaining bay at least partially bounded by the supporting arm, and a housing configured for attachment to the mounting bracket and having a longitudinal hook extending at least partially along a length of the housing, the retaining bay of the mounting bracket is configured to receive the longitudinal hook of the housing in a first direction, the mounting bracket may also include a foot and the housing may also include a first arm and a second arm, and the first arm of the housing is configured to receive at least one fastener in a second direction substantially opposite the first direction and the at least one fastener operatively engages with the foot of the mounting bracket in the second direction.

According to this and other exemplary aspects of the present invention, the mounting bracket may also include an upright portion having the supporting arm and the foot extending therefrom.

According to this and other exemplary aspects of the present invention, the foot of the mounting bracket may include an indentation formed therein, the indentation may be formed in a side of the foot so that the at least one fastener can operatively engage with the indentation.

According to this and other exemplary aspects of the present invention, the mounting bracket may also include a channel formed in the upright portion configured to facilitate fastening of the mounting bracket to the surface.

According to this and other exemplary aspects of the present invention, the mounting bracket may also include an upper extended portion extending from one end of the upright portion and a lower extended portion extending from another end of the upright portion.

According to this and other exemplary aspects of the present invention, the upper extended portion and the lower extended portion extend from one side of the upright portion opposite the side of the upright portion from which the supporting arm and the foot extend from.

According to this and other exemplary aspects of the present invention, wherein the upper extended portion and the lower extended portion are configured for space the beam portion of the mounting bracket away from the surface.

According to this and other exemplary aspects of the present invention, the lighting fixture may also include a light module configured for removable attachment to the housing.

According to this and other exemplary aspects of the present invention, the housing may include a first arcuate portion and a second arcuate portion spaced apart from the first arcuate portion and having a spring clip disposed thereon, and the spring clip is configured to urge the light module towards the first arcuate portion to removably attach the light module to the housing.

According to this and other exemplary aspects of the present invention, the first arcuate portion of the housing is positioned on the housing between the longitudinal hook and the first arm.

According to this and other exemplary aspects of the present invention, the spring clip is secured to the housing by a fastener.

According to this and other exemplary aspects of the present invention, the first arcuate portion and the second arcuate portion of the housing are spaced apart so as to allow access to a cavity formed within the housing.

According to this and other exemplary aspects of the present invention, the light module may include an extrusion profile having a surface formed thereon for longitudinal positioning of a lighting element thereon, wherein the extrusion profile may include a wire raceway positioned on an opposite side of the extrusion profile from the surface.

According to this and other exemplary aspects of the present invention, the lighting element may be a light emitting diode (LED) strip.

According to this and other exemplary aspects of the present invention, the extrusion profile may include at least one longitudinal cavity formed therein, and at least a pair of finger extensions for receipt of a lens configured to be positioned over the lighting element.

According to this and other exemplary aspects of the present invention, the lighting fixture may include a flange configured for attachment to the mounting bracket.

According to this and other exemplary aspects of the present invention, the second arm of the housing has a notch formed therein, the flange may include a curved finger and the notch of the housing is configured to receive the curved finger in the first direction, and the housing may include a threaded channel disposed on the second arm and configured to receive a fastener passing through the flange in a third direction substantially perpendicular to the first direction.

According to this and other exemplary aspects of the present invention, the housing may include a longitudinal slot formed therein and the flange may include a slot formed therein, the longitudinal slot and the slot are each configured for receipt of a horizontal bracket to allow connection of the housing to another housing and the flange to another flange.

According to this and other exemplary aspects of the present invention, the flange may include a beam portion, and the curved finger extends from one side of the beam portion, and a horizontal shoe extends from an opposite side of the beam portion.

According to this and other exemplary aspects of the present invention, the curved finger is positioned at one end of the beam portion of the flange, and the horizontal shoe is positioned at the opposite end of the beam portion of the flange.

According to this and other exemplary aspects of the present invention, the flange may include a beam portion, and the curved finger extends from one side of the beam portion, and a horizontal shoe extends from an opposite side of the beam portion, the flange includes an extension extending substantially parallel to the beam portion and substantially perpendicular to the horizontal shoe.

According to this and other exemplary aspects of the present invention, the horizontal shoe is configured for support of a ceiling surface.

According to this and other exemplary aspects of the present invention, the flange may include a beam portion, and the curved finger extends from one side of the beam portion, and a grooved shoe extends from an opposite side of the beam portion.

According to this and other exemplary aspects of the present invention, the grooved shoe is configured for support of a ceiling surface.

According to this and other exemplary aspects of the present invention, the lighting fixture may include a light diffuser configured for attachment to the mounting bracket within an opening in the housing between the first arm and the second arm.

According to this and other exemplary aspects of the present invention, the light diffuser comprises a louver portion and a cover extending at least partially over the louver portion.

According to this and other exemplary aspects of the present invention, the lighting fixture may include a light emitting diode driver operatively coupled with the housing and electrically coupled with the light module.

According to this and other exemplary aspects of the present invention, the light emitting diode driver may be electrically coupled to the light module by at least one wire.

According to this and other exemplary aspects of the present invention, the at least one wire may be electrically connected to the lighting element of the light module by solder connections.

According to this and other exemplary aspects of the present invention, the housing may include a horizontal wall and a vertical wall coupled together by a shoulder portion, the horizontal wall is positioned substantially perpendicular to the first direction and the vertical wall is positioned substantially parallel to the first direction.

According to this and other exemplary aspects of the present invention, the light emitting diode driver may be operatively coupled with the horizontal wall of the housing, the horizontal wall of the housing may include one or more longitudinal threaded channel each configured for receipt of one or more fasteners configured to affix the light emitting diode driver to the horizontal wall of the housing.

According to this and other exemplary aspects of the present invention, the light emitting diode driver may be operatively coupled with the horizontal wall and the vertical wall of the housing, the horizontal wall of the housing may include a longitudinal recess formed therein, and the vertical wall of the housing may include at least one longitudinal threaded channels formed therein, the light emitting diode driver may include a connection flange configured for insertion into the longitudinal recess of the horizontal wall of the housing in the first direction, the at least one longitudinal threaded channels formed in the vertical wall are configured for receipt of one or more fasteners configured to affix the light emitting diode driver to the vertical wall of the housing.

According to this and other exemplary aspects of the present invention, the housing may include an extended seat protruding from the vertical wall and configured to engage with at least a portion of the light emitting diode driver to provide additional support for the light emitting diode driver.

According to this and other exemplary aspects of the present invention, the light module may include a seamless component positioned on an end of the extrusion profile.

According to this and other exemplary aspects of the present invention, the seamless component may include an arcuate housing and an elevated surface connected to the arcuate housing by a longitudinal support, when the seamless component is positioned on the end of the extrusion profile, the elevated surface is positioned on substantially the same plane as the surface of the extrusion profile.

According to this and other exemplary aspects of the present invention, the seamless component is configured to be coupled with the extrusion profile by an inline bracket, and the lighting element is configured to extend at least partially along the elevated surface of the seamless component and the surface of the extrusion profile.

According to this and other exemplary aspects of the present invention, the seamless component may include a recess formed in an end thereof, and the end is configured for connection with an end cap having a hole formed therein for passage of a wire.

According to this and other exemplary aspects of the present invention, a method of installation of the lighting fixture is provided.

According to this and other exemplary aspects of the present invention, a kit including at least the housing, the mounting bracket, the light module and the flange of the lighting fixture is provided.

According to this and other exemplary aspects of the present invention, the flange may be positioned relative to the housing so as to at least partially obscure the light module when the lighting fixture is installed in a ceiling surface.

According to this and other exemplary aspects of the present invention, the lighting fixture is configured for installation above a ceiling surface.

According to this and other exemplary aspects of the present invention, the lighting fixture is configured for installation directly on a wall surface.

BRIEF DESCRIPTION OF THE SEVERAL VIEWS OF THE DRAWINGS

For a fuller understanding of the nature and object of the present invention, reference should be had to the following detailed description taken in connection with the accompanying drawings, in which:

FIGS. 71-79A provide various views of an exemplary installation process of an exemplary lighting fixture according to an exemplary aspect of the present invention;

FIGS. 80-87A provide various views of an exemplary installation process of an exemplary lighting fixture according to an exemplary aspect of the present invention;

DETAILED DESCRIPTION OF THE INVENTION

Figure 1:
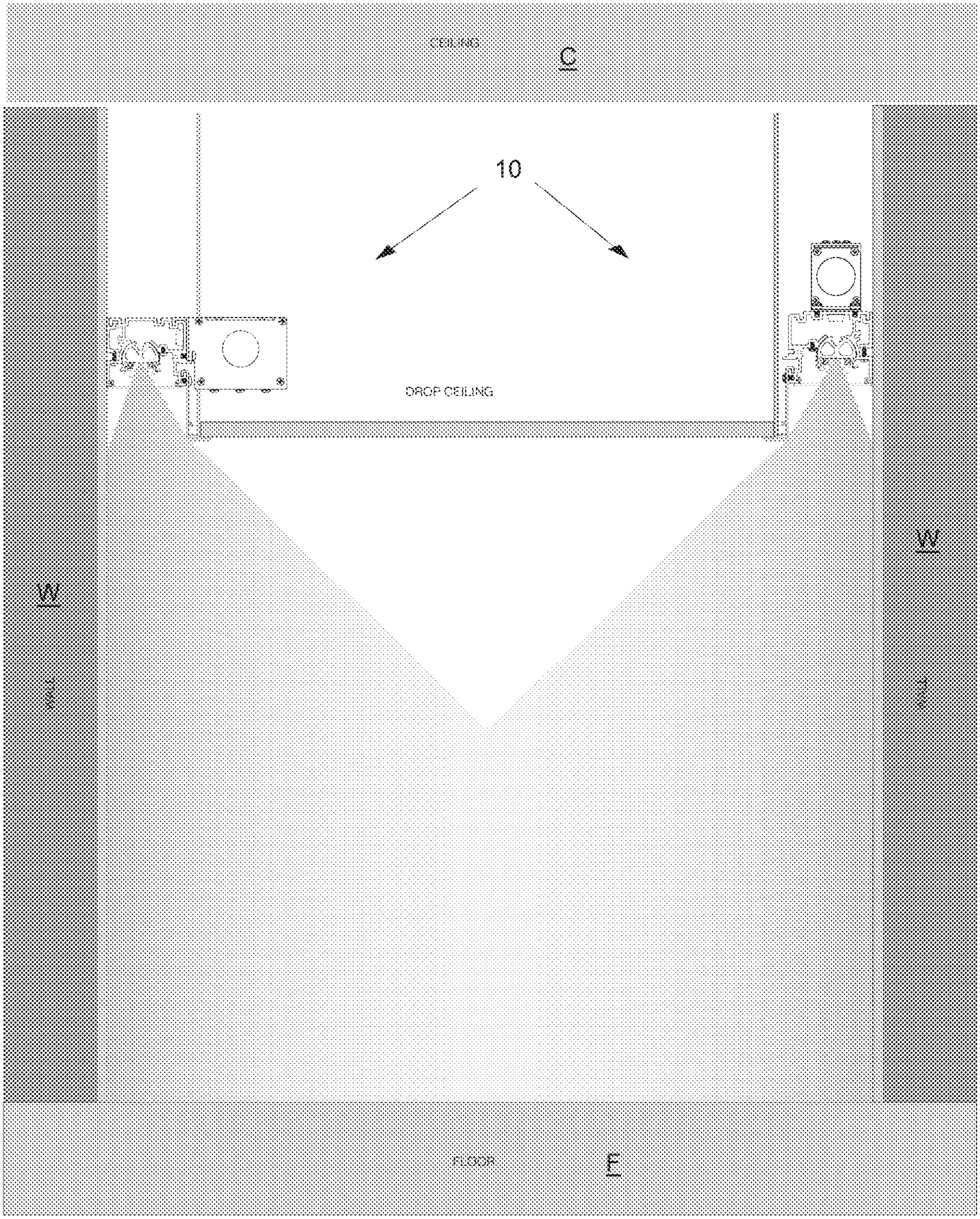
FIG. 1 is simplified cross-sectional view of an exemplary room in which the exemplary lighting fixtures according to an exemplary aspect of the present invention have been installed and projecting light into the room.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Referring to FIG. 1, therein illustrated are exemplary embodiments of linear lighting fixtures, generally indicated by reference number 10, according to exemplary aspects of the present invention. As illustrated in FIG. 1, the linear lighting fixtures 10 according to the present invention are configured for installation on a wall surface W, and configured to provide illumination to the wall surface W and/or a floor surface F. The lighting fixtures 10 may be installed on the wall surface W at a height below a ceiling surface C, whether unfinished or finished, in order to provide the desired illuminating effects, provide ease of access and/or installation of the lighting fixtures 10, and/or to provide seamless integration into a sub-ceiling (not shown in FIG. 1), e.g., a drop ceiling. For example the sub-ceiling (not shown in FIG. 1) may be positioned between the respective lighting fixtures 10 so that the illumination emitted from the lighting fixtures originates above the sub-ceiling (not shown in FIG. 1).

Referring now to FIGS. 2-3 and 19-20, therein illustrated is an exemplary embodiment of a linear lighting fixture, generally indicated by reference numeral 10, according to an exemplary aspect of the present invention. The lighting fixture 10 may include a housing 12 connected to a driver 14. The driver 14 may be electrically coupled to a light module 16 removably engaged with the housing 12. The housing 12 is configured to retain the light module 16 within the lighting fixture 10. The lighting fixture 10 may further include a light diffuser 18 positioned in a direction relative to the light module 16 so that light emitted from the light module 16 may pass through the light diffuser 18. The lighting fixture 10 may also include a mounting bracket 20 configured to couple the housing 12 of the lighting fixture 10 a surface, for example a wall surface W. The lighting fixture 10 may further include a flange 22 configured for removable engagement with the housing 12, and further configured to engage with a ceiling covering (see, e.g. FIG. 8).

Referring now to FIGS. 12-13, 13A and 13B, the housing 12 may include horizontal wall 24 connected to a vertical wall 26 by a shoulder portion 28. It is understood the terms "horizontal" and "vertical" are used to merely distinguish between various elements of the housing 12, and are in no way limiting to the orientation and/or positioning of the housing 12. For example, the horizontal wall 24 and/or the vertical wall 26 may be positioned at any angle relative to each other and/or a ground surface. The housing 12 may also include a first arcuate portion 30 and a second arcuate portion 32 spaced apart from the first arcuate portion 30. The housing 12 may also include a first arm 34 extending from the first arcuate portion 30, and a second arm 36 extending from the vertical wall 26. The first arm 34 is spaced apart from the second arm 36 so as to form an opening 38 in one side of the housing 12. The housing 12 may further include a longitudinal hook 40 extending from the horizontal wall 24, and a longitudinal recess 42 formed between the horizontal wall 24 and the shoulder portion 28. The housing 12 may also include one or more longitudinal threaded channels 44 formed in one or more of the horizontal wall 24, vertical wall 26 and/or second arm 36. The longitudinal threaded channels 44 may extend at least partially the length of the housing 12, and may be threaded in order to receive correspondingly threaded fasteners, such as screws, bolts or the like. The housing 12 may also include an extended seat 46, which may be positioned between the vertical wall 26 and the second arm 36. A spring clip 48 may be fastened to the housing 12 adjacent to the second arcuate portion 32 by a fastener, such as a screw, bolt or the like. The second arm 36 of the housing 12 may include a longitudinal slot 50 and a notch 52 formed therein. The horizontal wall 24, vertical wall 26, first arcuate portion 30 and second arcuate portion 32 may be positioned so as to form a cavity 54 within the housing 12 that opens in a direction of the opening 38 due to the spaced apart relationship of the first arcuate portion 30 ad the second arcuate portion 32.

Figure 14:
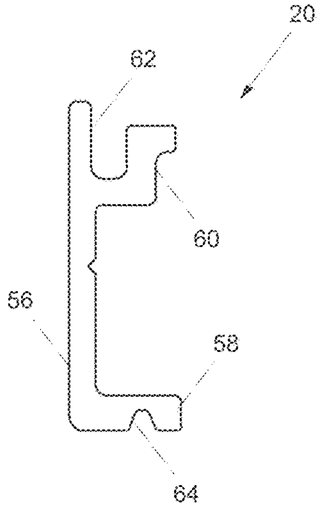
FIG. 14 is a front plan view of an exemplary mounting bracket of an exemplary lighting fixture according to an exemplary aspect of the present invention.
Figure 15:
FIG. 15 is a side view of the exemplary mounting bracket of an exemplary lighting fixture according to an exemplary aspect of the present invention.
Figure 16:
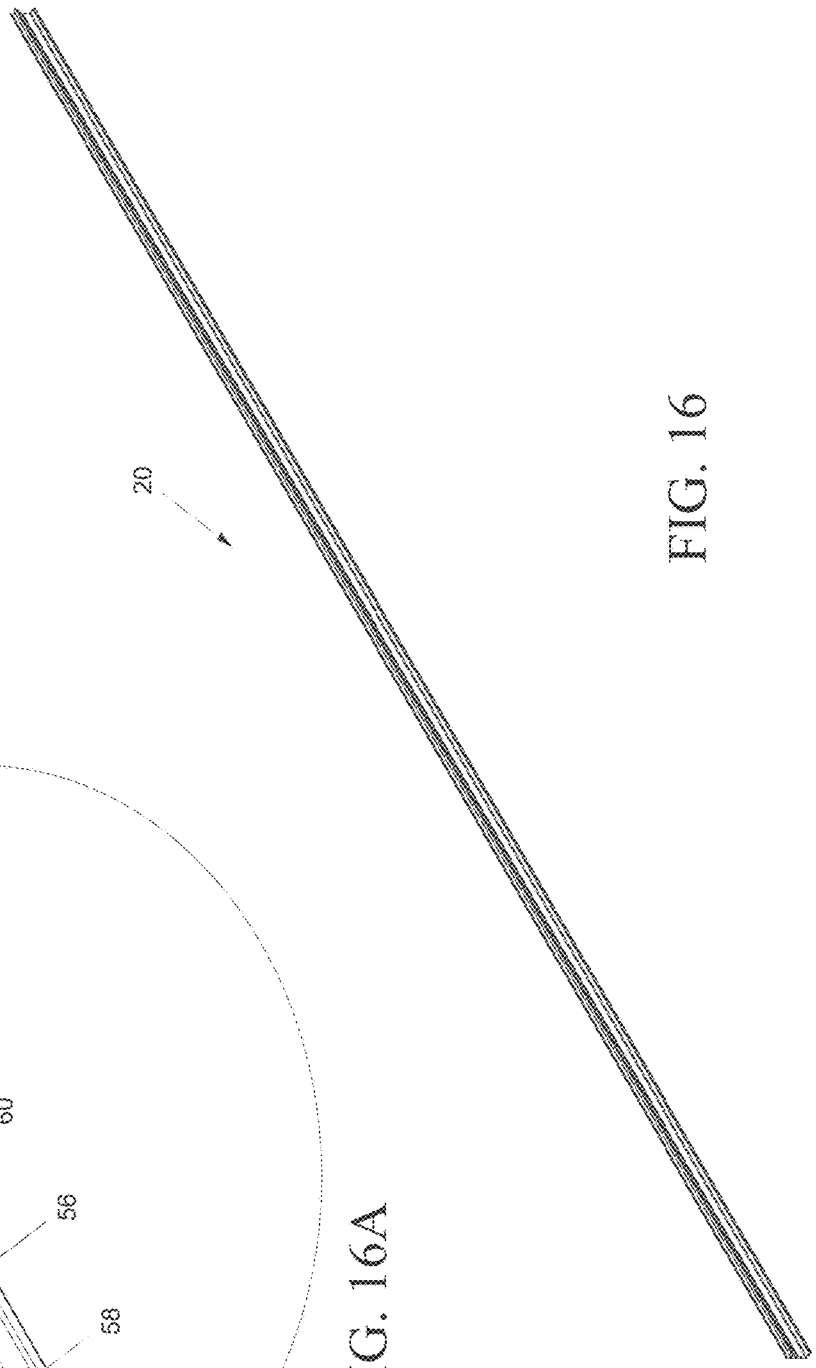
FIG. 16 is a top perspective view of the exemplary mounting bracket of an exemplary lighting fixture according to an exemplary aspect of the present invention.
Figure 16A:
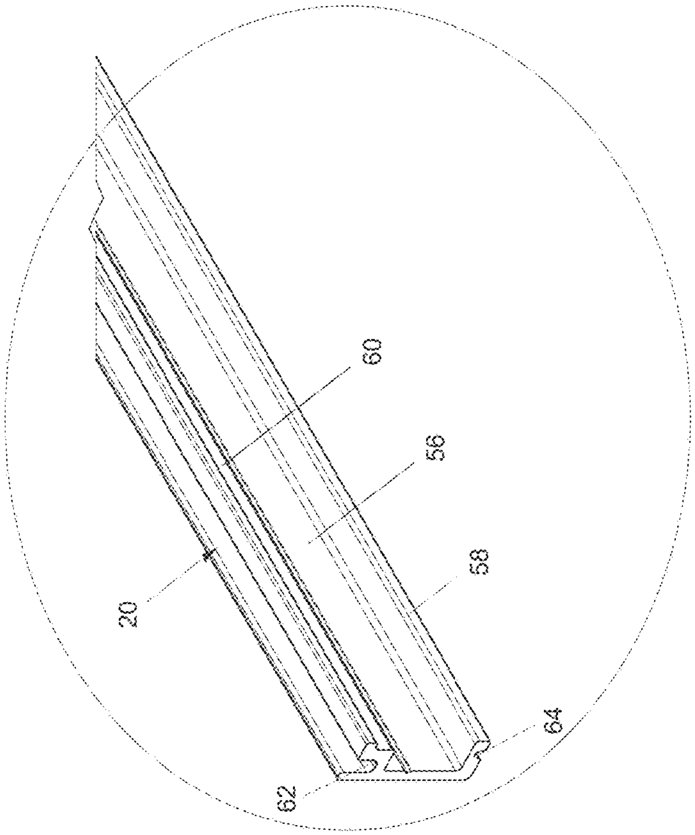
FIG. 16A is an enlarged perspective view of the exemplary mounting bracket of an exemplary lighting fixture according to an exemplary aspect of the present invention.

Referring now to FIGS. 14-16, the mounting bracket 20 of the lighting fixture 10 may include an upright portion 56 and a foot 58 extending from the upright portion 56. The mounting bracket 20 may also include a supporting arm 60. The supporting arm 60 extends from the upright portion 56 to create a retaining bay 62 formed between the upright portion 56 and the supporting arm 60. The mounting bracket 20 may also include an indentation 64 formed in the foot 58.

Figure 11:
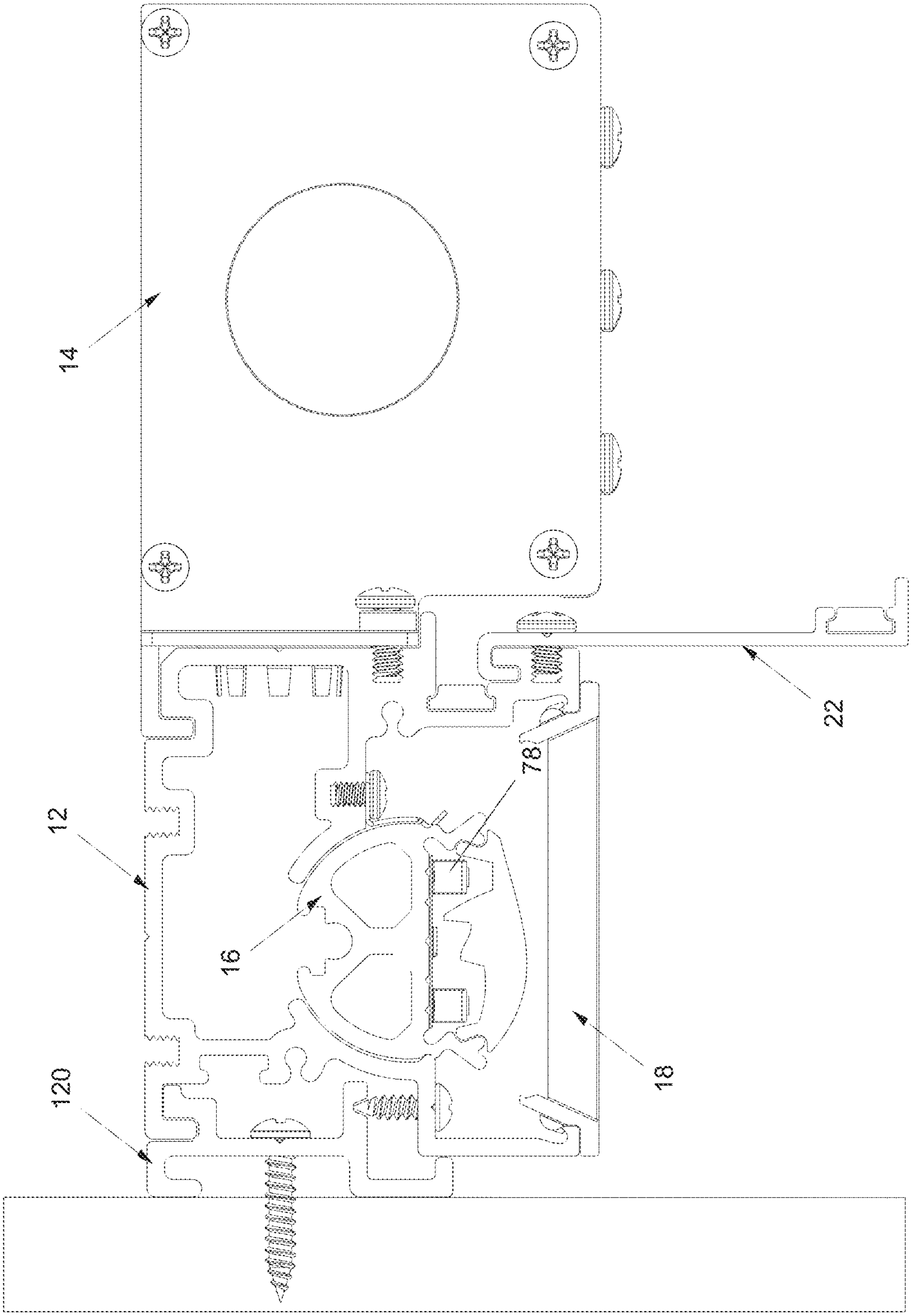
FIG. 11 is a front plan view of an exemplary lighting fixture according to an exemplary aspect of the present invention installed on a wall surface.
Figure 12:
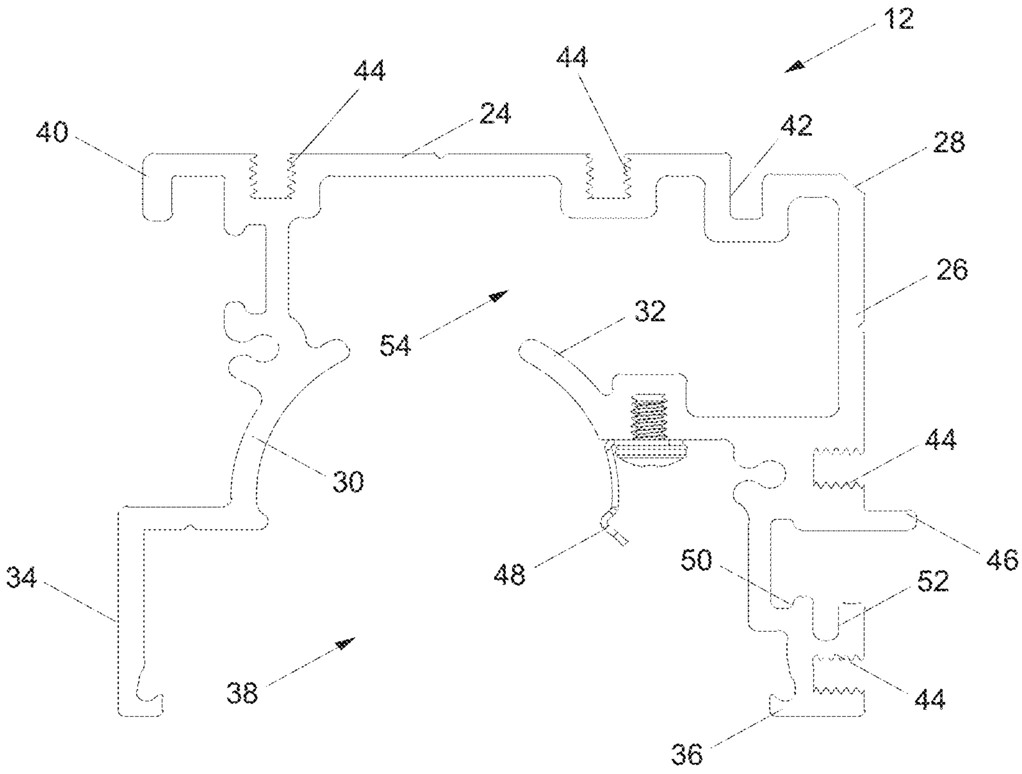
FIG. 12 is a front plan view of an exemplary housing of an exemplary lighting fixture according to an exemplary aspect of the present invention.
Figures 13, 13A, 13B:
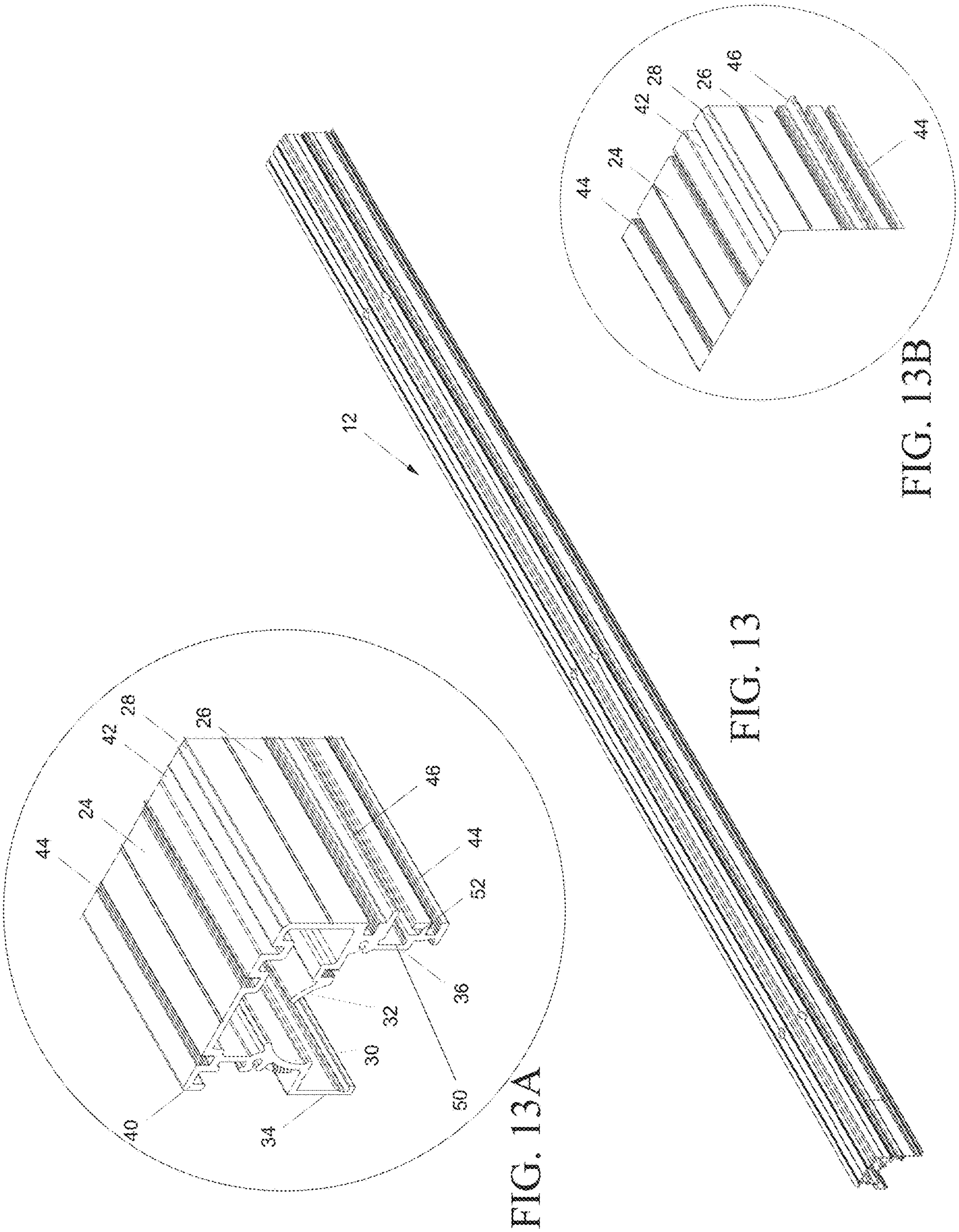
FIG. 13 is a top perspective view of the exemplary housing according to an exemplary aspect of the present invention.
FIG. 13A is an enlarged perspective view of the exemplary housing according to an exemplary aspect of the present invention.
FIG. 13B is an enlarged perspective view of the exemplary housing according to an exemplary aspect of the present invention.
Figure 17:
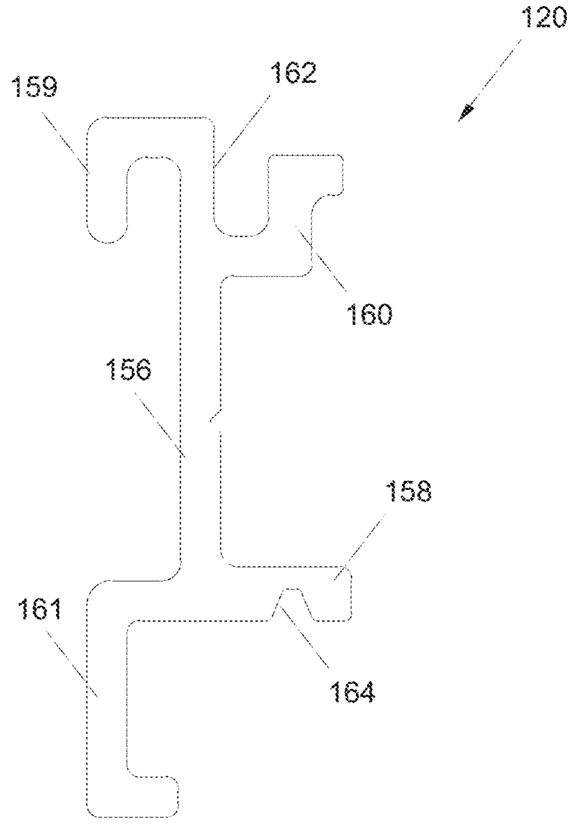
FIG. 17 is a front plan view of an exemplary mounting bracket of an exemplary lighting fixture according to an exemplary aspect of the present invention.
Figure 18:
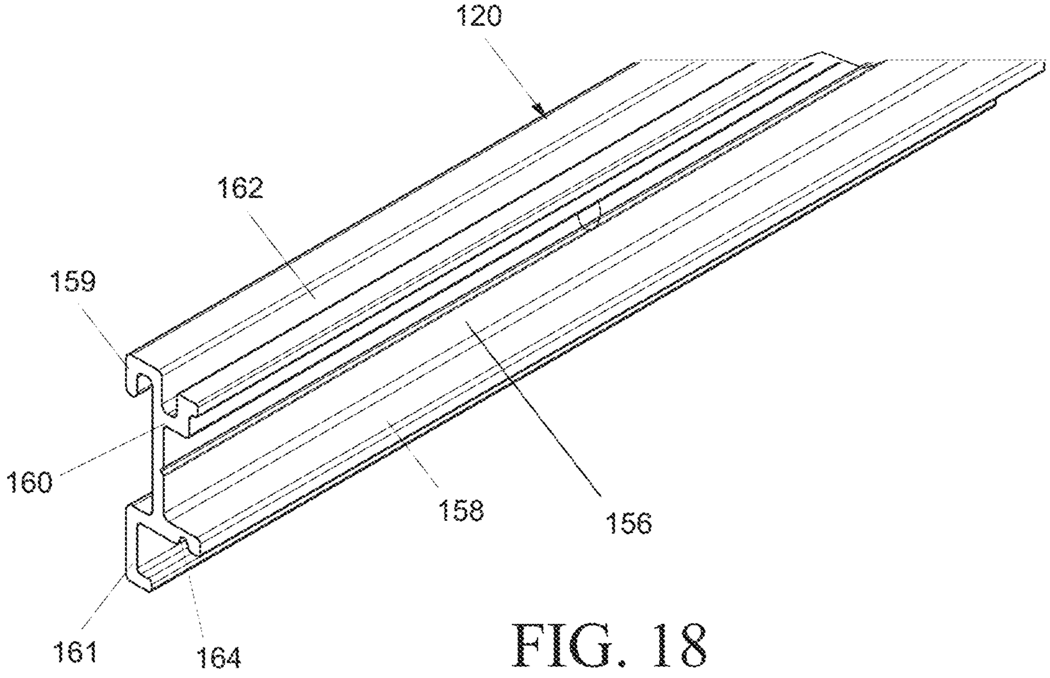
FIG. 18 is a perspective view of an exemplary mounting bracket of an exemplary lighting fixture according to an exemplary aspect of the present invention.
Figure 19:
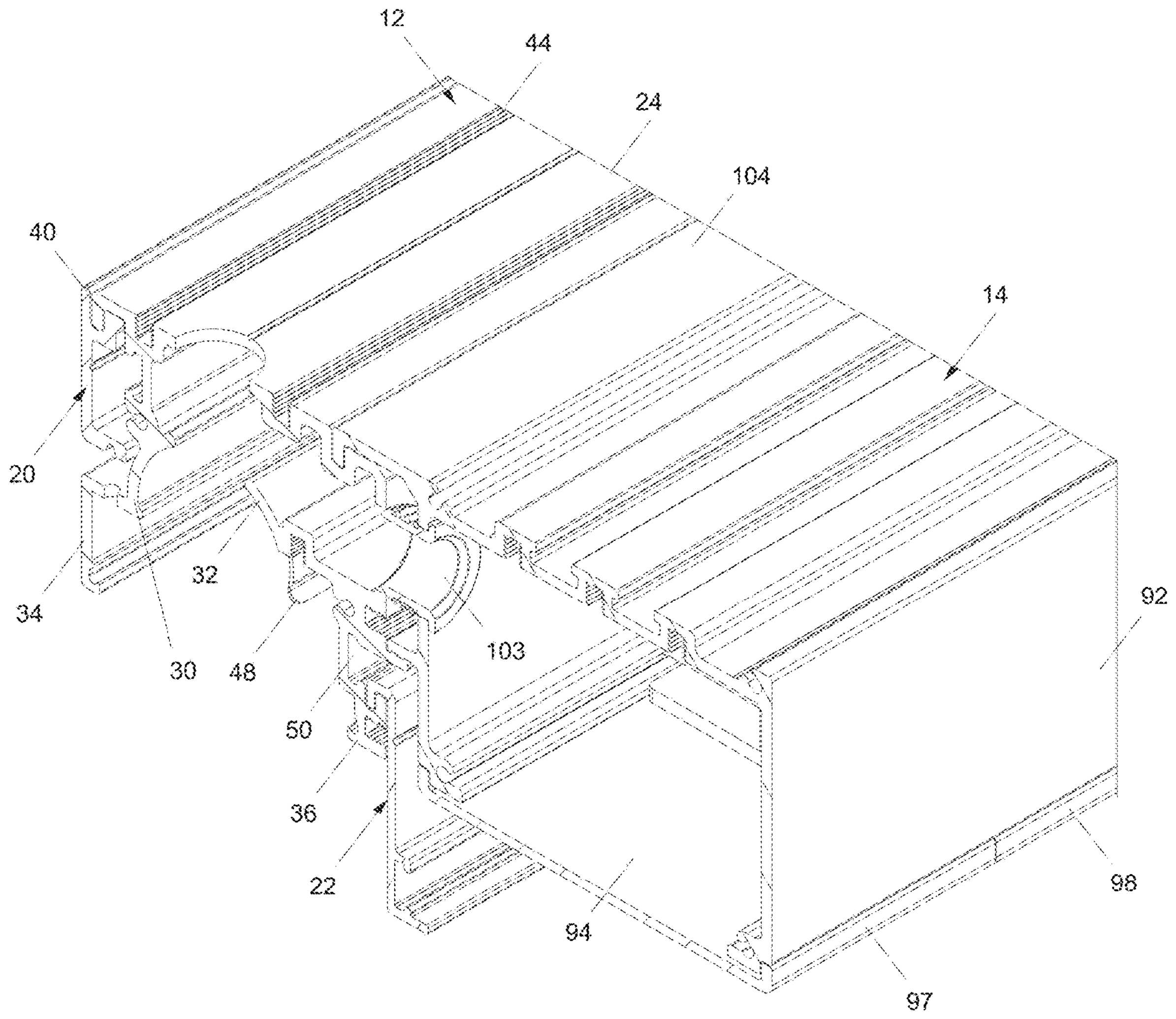
FIG. 19 is a cross-sectional perspective view of exemplary components of an exemplary lighting fixture according to an exemplary aspect of the present invention.
Figure 20:
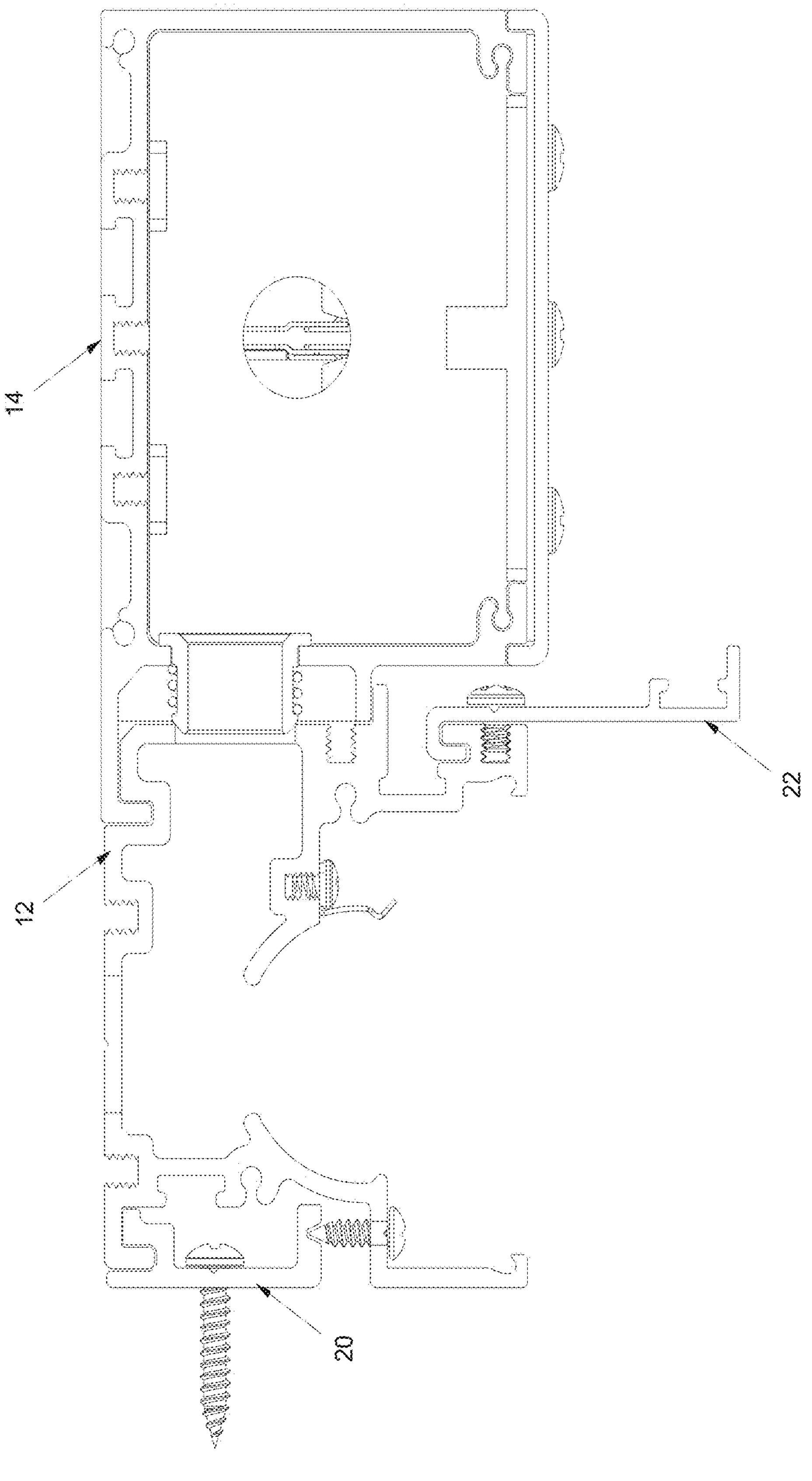
FIG. 20 is a cross-sectional front view of exemplary components of an exemplary lighting fixture according to an exemplary aspect of the present invention.

Referring now to FIGS. 11 and 17-18, an alternative embodiment of the mounting bracket, generally indicated by reference numeral 120, is therein illustrated. The mounting bracket 120 may include an upright portion 156 and a foot 158 extending from the upright portion 156. The mounting bracket 120 may further include an upper extended portion 159 and a lower extended portion 161 extending from the upright portion 156. The mounting bracket 120 may also include a supporting arm 160. The supporting arm 160 extends from the upright portion 156 to create a retaining bay 162 formed between the upright portion 156 and the supporting arm 160. The mounting bracket 120 may also include an indentation 164 formed in the foot 158.

Referring again to FIGS. 2, 5 and 7-8, the flange 22 of the lighting fixture 10 may include a beam portion 66 and a curved finger 68 extending from the beam portion 66. The flange 22 may also include a slot 70 and a horizontal shoe 72 extending from an end of the beam portion 66 opposite the end of the beam portion 66 from which the curved finger 68 extends. As discussed further below, the flange 22 may be configured to be removably secured to the housing 12 by the curved finger 68 and one or more fasteners, such as bolts, screws or the like, connecting the flange 22 to the housing 12.

Figure 4:
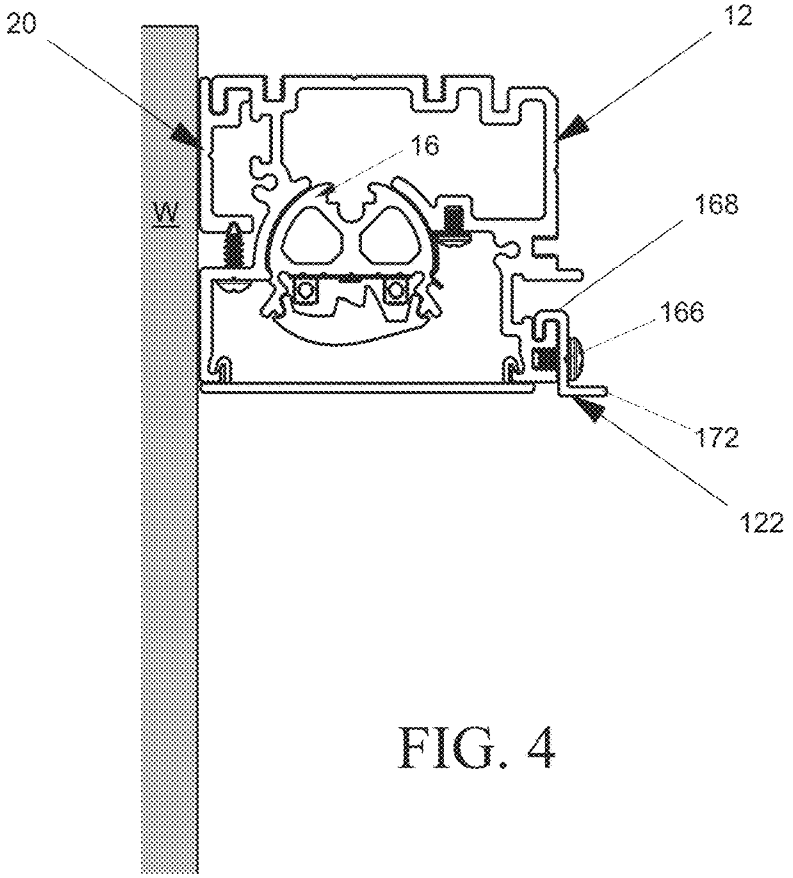
FIG. 4 is a front plan view of exemplary components of an exemplary lighting fixture according to an exemplary aspect of the present invention.
Figure 5:
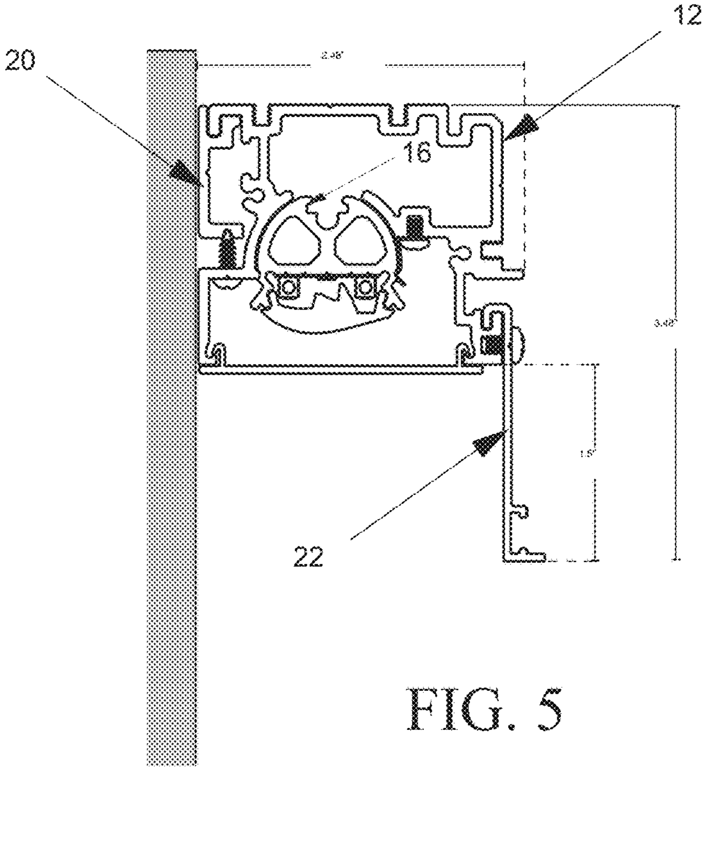
FIG. 5 is a front plan view of exemplary components of an exemplary lighting fixture according to an exemplary aspect of the present invention.
Figure 6:
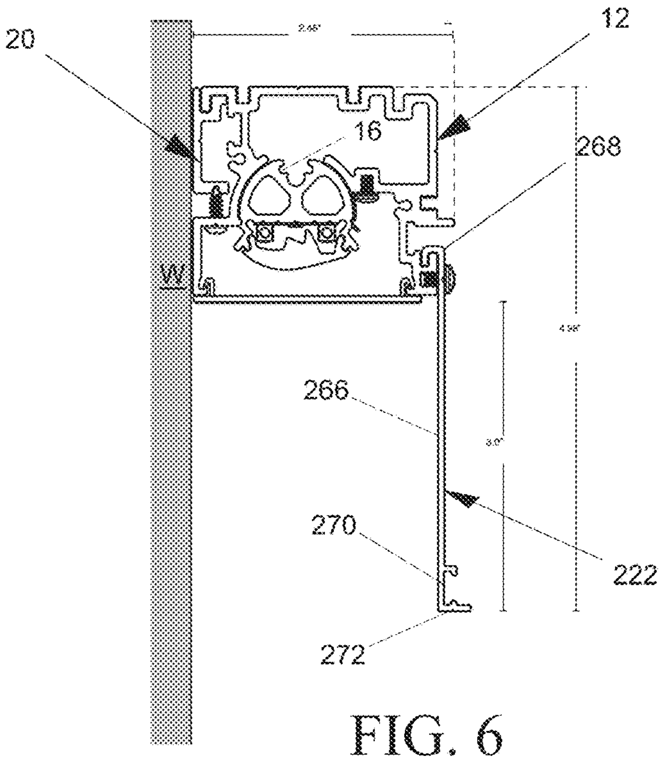
FIG. 6 is a front plan view of exemplary components of an exemplary lighting fixture according to an exemplary aspect of the present invention.
Figure 7:
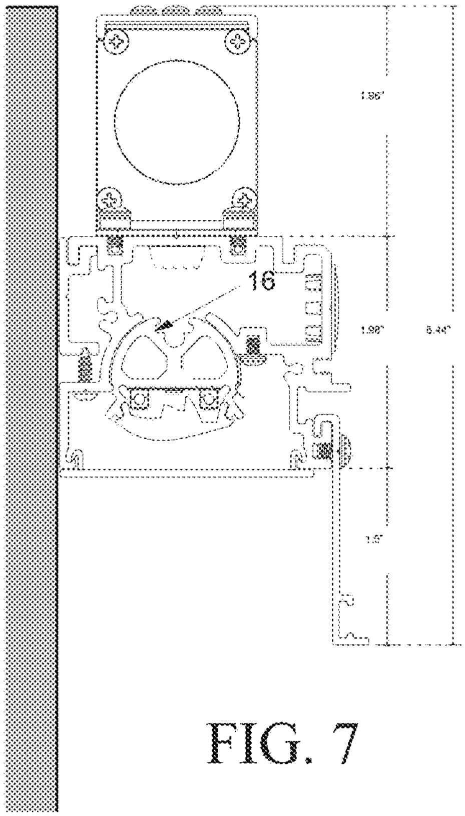
FIG. 7 is a front plan view of an exemplary lighting fixture according to an exemplary aspect of the present invention.
Figure 8:
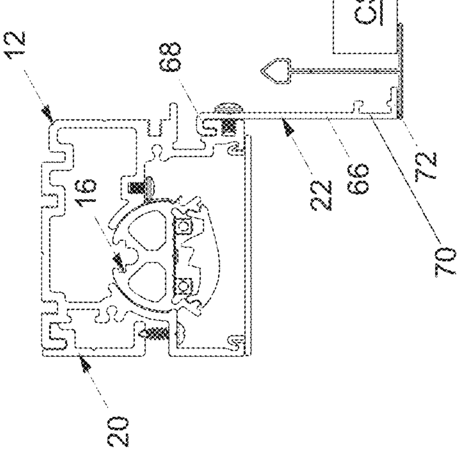
FIGS. 8-10 are front plan views of exemplary components of an exemplary lighting fixture integrated with various sub-ceiling constructions according to an exemplary aspect of the present invention.
Figure 9:
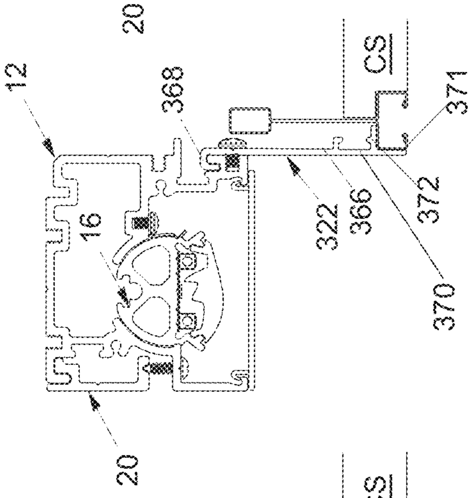

Referring now to FIGS. 4-10, therein illustrated are exemplary alternative embodiments of the flange that may be used for the lighting fixture 10 in accordance with aspects of the present invention. In addition, to the flange 22 as discussed above shown in FIGS. 2, 5 and 7-8, including exemplary dimensions for purposes of reference, the lighting fixture may use a flange 122 as shown in FIG. 4. The flange 122 may include a beam portion 166 and a curved finger 168 extending from the beam portion 166. The flange 122 may also include a horizontal shoe 172 extending from an end of the beam portion 166 opposite the end of the beam portion 166 from which the curved finger 168 extends. As illustrated by comparison to other embodiments of the flange, the beam portion 166 of the flange 122 is shorter than the corresponding beam portions of the other alternative embodiments of the flange according to various aspects of the present invention. Referring now to FIG. 6, an alternative embodiment of the flange 222 is illustrated. The flange 222 may include a beam portion 266 and a curved finger 268 extending from the beam portion 266. The flange 222 may also include a slot 270 and a horizontal shoe 272 extending from an end of the beam portion 266 opposite the end of the beam portion 266 from which the curved finger 268 extends. As illustrated by comparison to other embodiments of the flange, the beam portion 266 of the flange 222 is longer than the corresponding beam portions of the other alternative embodiments of the flange according to various aspects of the present invention. Referring now to FIG. 9, an alternative embodiment of the flange 322 is illustrated. The flange 322 may include a beam portion 366 and a curved finger 368 extending from the beam portion 366. The flange 322 may also include a slot 370, an end extension 371, and a horizontal shoe 372 extending from an end of the beam portion 366 opposite the end of the beam portion 366 from which the curved finger 368 extends.

Figure 10:
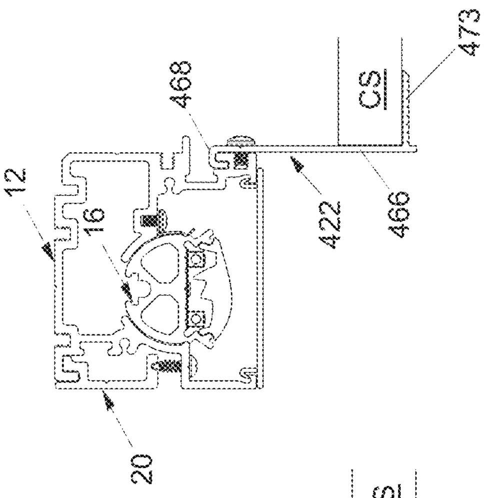

Referring now to FIG. 10, an alternative embodiment of the flange 422 is illustrated. The flange 422 may include a beam portion 466 and a curved finger 468 extending from the beam portion 466. The flange 422 may also include a grooved shoe 473 extending from an end of the beam portion 466 opposite the end of the beam portion 466 from which the curved finger 468 extends. All of the flanges 22, 122, 222, 322, 422 may be configured to be removably secured to the housing 12 by the curved fingers 68, 168, 268, 368, 468 and one or more fasteners, such as bolts, screws or the like, connecting the flanges 22, 122, 222, 322, 422 to the housing 12. As shown in FIGS. 8-10, the flanges 22, 322, 422 may be used to connect the housing 12 with a ceiling surface CS so at least a substantially contiguous surface is created between the flanges 22, 322, 422 and the ceiling surface CS. The ceiling surface CS may be a drop ceiling or installed wallboard, for example drywall. In addition, as shown for example in FIG. 10, the flange 422 may be configured to provide a supporting surface to the ceiling surface CS and/or be configured to be concealed by application of appropriate wall finishing material, for example joint compound. The grooved shoe 473 of the flange 422 is configured to retain the wall finishing material thereon as a result of the grooved lower surface of the grooved shoe 473.

Figure 2:
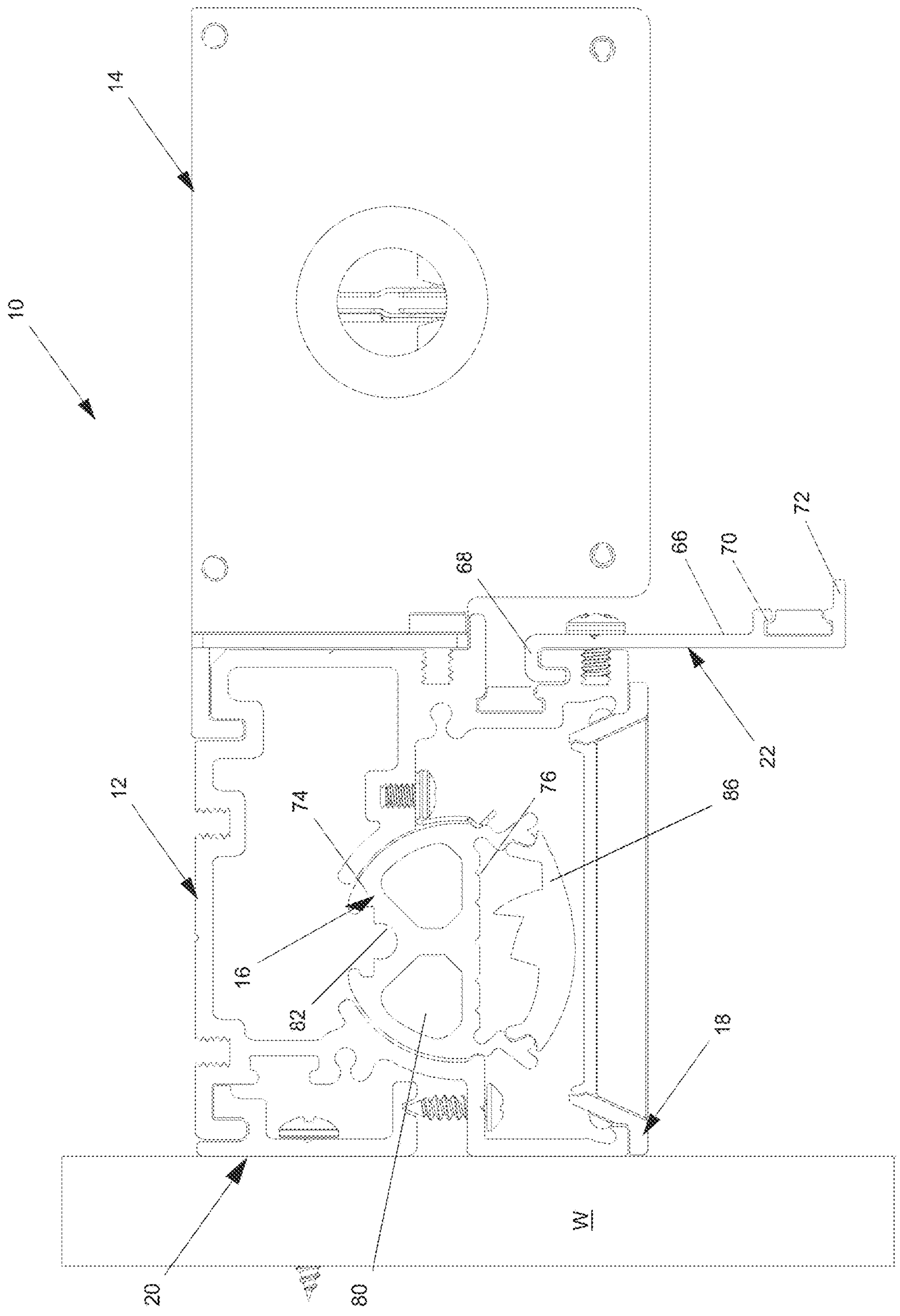
FIG. 2 is a front plan view of an exemplary lighting fixture according to an exemplary aspect of the present invention installed on a wall surface.
Figure 3:
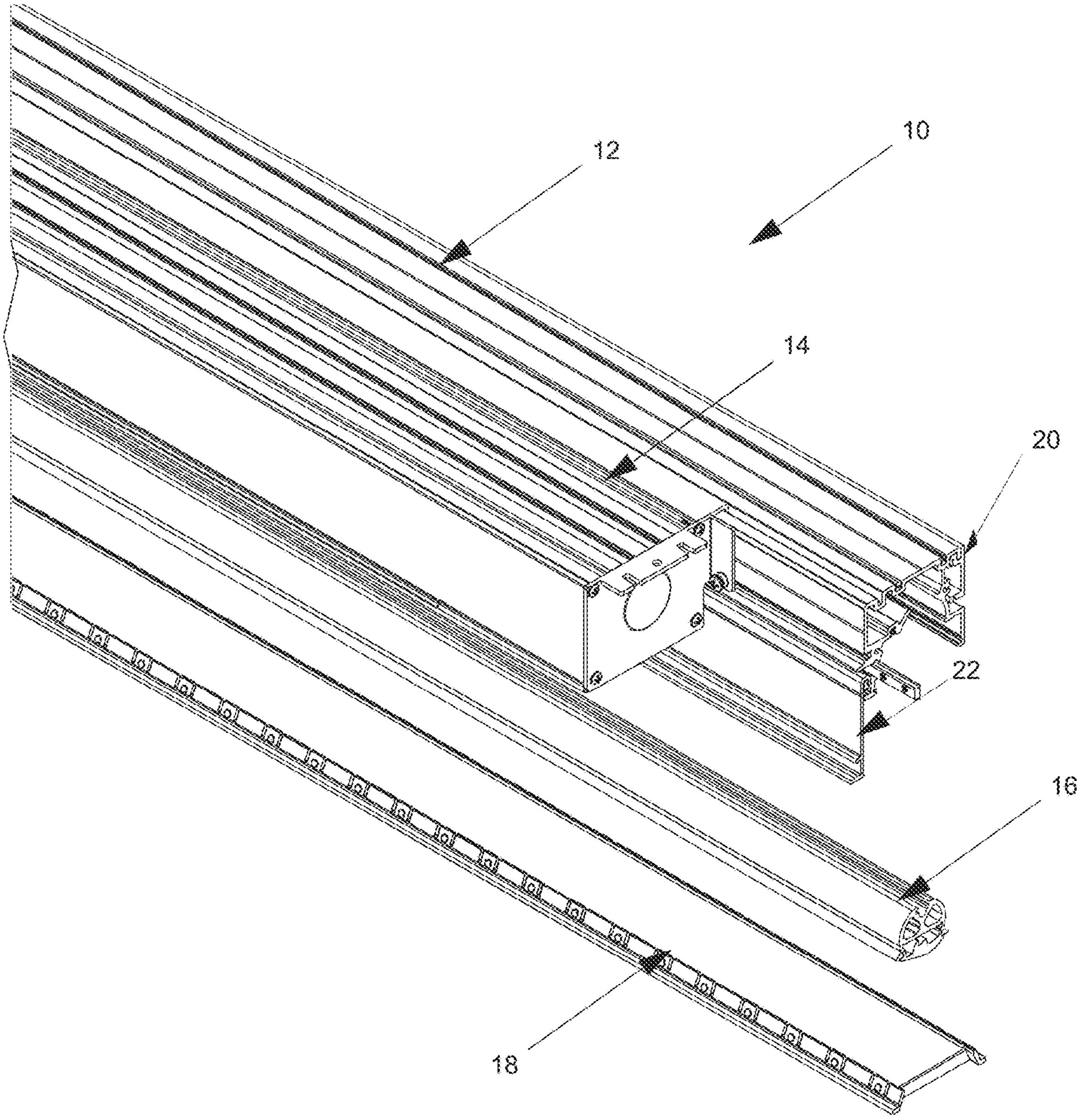
FIG. 3 is a partially exploded perspective view of an exemplary lighting fixture according to an exemplary aspect of the present invention.
Figure 36:
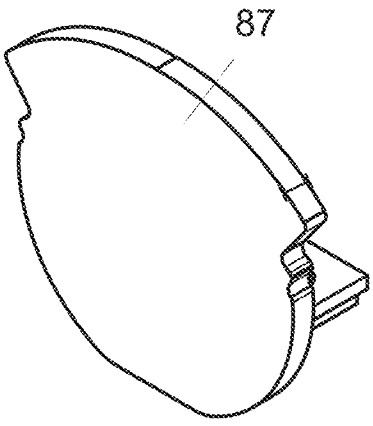
FIG. 36 is a perspective view of an exemplary end cap for use with an exemplary light module according to an exemplary aspect of the present invention.

Referring now to FIGS. 2-3 and 11, the light module 16 of the lighting fixture 10 may include an extrusion profile 74. The extrusion profile 74 may include a surface 76, on which a lighting element 78 may be deposed. The surface 76 may include one or more channels in order to increase the surface area of the surface 76 and facilitate heat dissipation for the light module 16. The extrusion profile 74 may also include one or more cavities 80 formed therein in order to reduce the thermal mass of the light module 16 and facilitate heat dissipation for the light module 16. The extrusion profile 74 may further include a wire raceway 82 formed therein and configured for receipt of one or more wires. The extrusion profile 74 may also include a pair of finger extensions 84 configured for receipt and retention of a lens 86. An end cap 87, as shown in FIG. 36, may be placed on one or both ends of the extrusion profile 74. The end cap 87 may be a press-fit and/or snap-fit.

Referring now to FIGS. 88-102, the light module 16 may also include a seamless component 75 configured for positioning on one or both ends of the extrusion profile 74 of the light module 16. The seamless component 75 may include an arcuate housing 77 and an elevated surface 79 connected to the arcuate housing 77 by a longitudinal support 81. The elevated surface 79 is connected to the arcuate housing 77 by the longitudinal support 81 so that there is a space on either side of the elevated surface 79 between the elevated surface 79 and the arcuate housing 77. The elevated surface 79 may include one or more channels in order to increase the surface area of the elevated surface 79 and facilitate heat dissipation for the light module 16. The seamless component 75 may also include a recess 83 formed in one end of the seamless component 75. The seamless component 75 may also include a pair of finger extensions 85 configured for receipt and retention of the lens 86 (not shown in FIGS. 88-102).

The seamless component 75 may also include a slot 89 formed in the arcuate housing 77 on a side of the seamless component 75 opposite the elevated surface 79. The slot 89 is configured for receipt of an inline bracket 105 in order to join the seamless component 75 with the extrusion profile 74 through the use of the inline bracket 105 and one or more set screws 106. An end cap 187 may be affixed to an end of the seamless component 75 in order to facilitate securing of a wire 91 to the seamless component 75. The wire 91 may be passed through an opening in the end cap 187, and the end cap 187 inserted into the slot 89 and secured by a set screw 106. The wire 91 may be soldered to the appropriate connections of the lighting element 78 in order to electrically connect the lighting element 78 to the wire 91. The wire 91 may then be electrically coupled to the driver 14 in order to power the lighting element 78.

Figure 21:
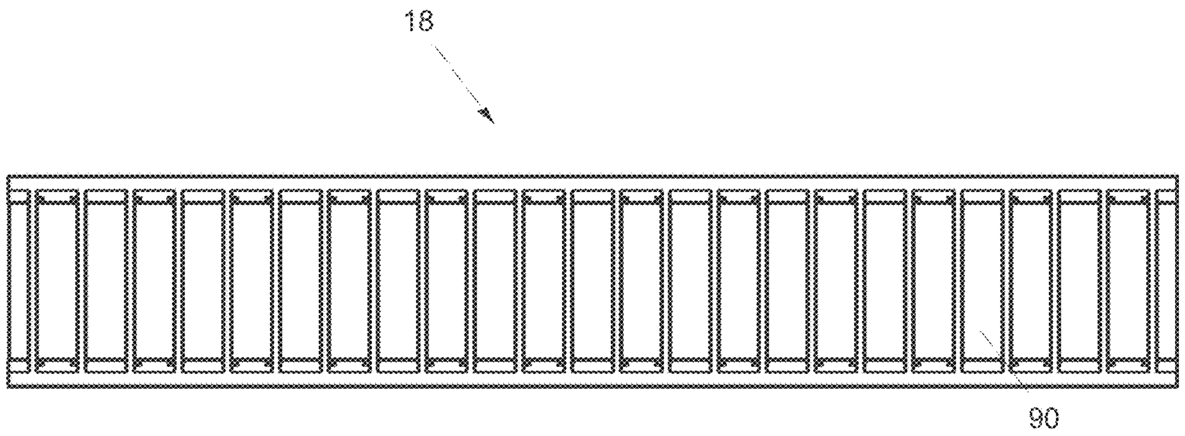
FIG. 21 is a top plan view of an exemplary light diffuser of an exemplary lighting fixture according to an exemplary aspect of the present invention.
Figure 22:
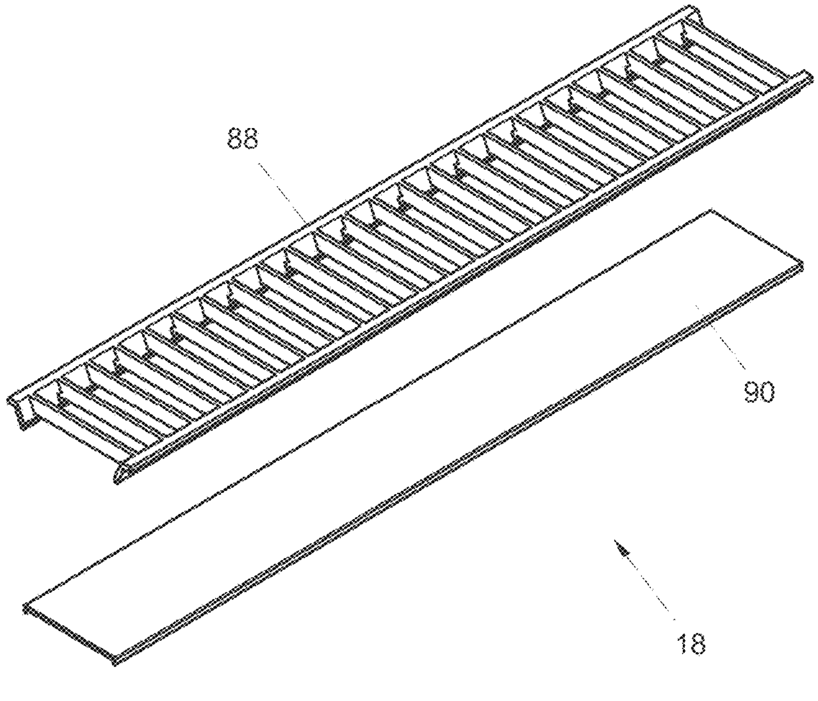
FIG. 22 is an exploded perspective view of the exemplary light diffuser of an exemplary lighting fixture according to an exemplary aspect of the present invention.
Figure 23:
FIG. 23 is a front view of an exemplary lens of an exemplary lighting fixture according to an exemplary aspect of the present invention.
Figure 24:
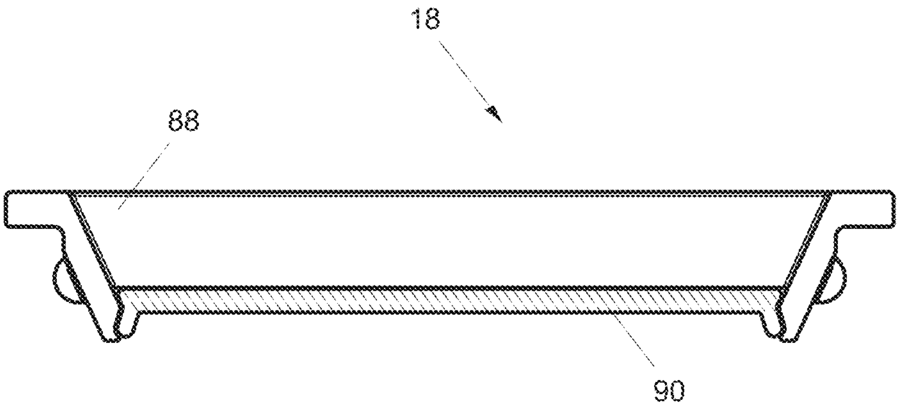
FIG. 24 is a front view of the exemplary light diffuser of an exemplary lighting fixture according to an exemplary aspect of the present invention.

Referring now to FIGS. 21-22 and 24, the light diffuser 18 may include a louver 88 and a cover 90. The cover 90 may be transparent or translucent, and have a frosted, polarized, diffused or prismatic finish.

Figure 25:
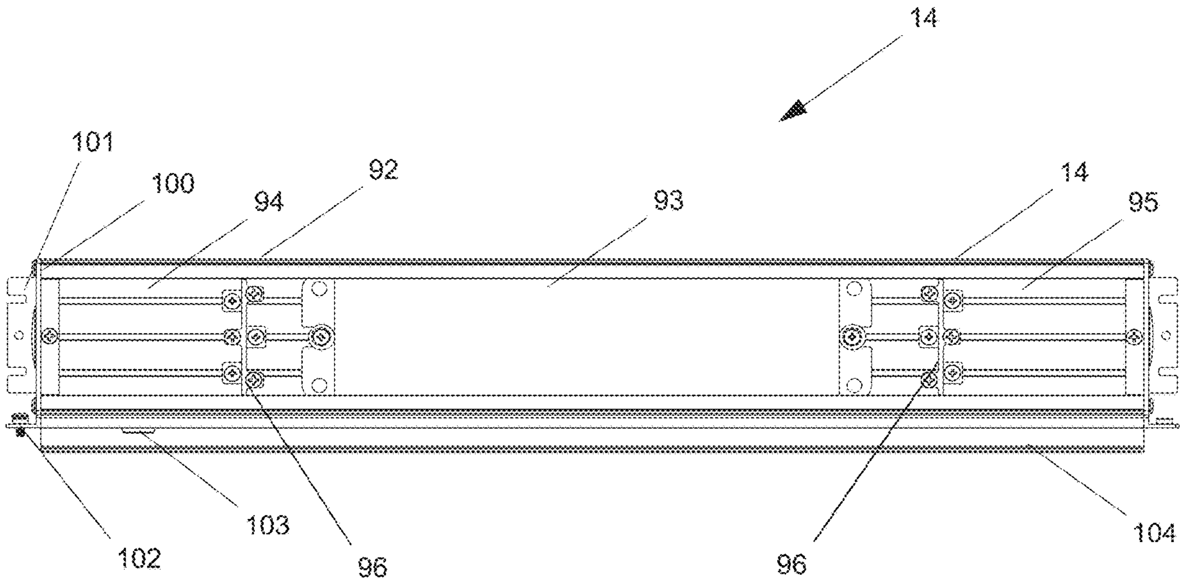
FIG. 25 is a top plan view, with certain components removed for illustration purposes, of an exemplary driver of an exemplary lighting fixture according to an exemplary aspect of the present invention.
Figure 26:
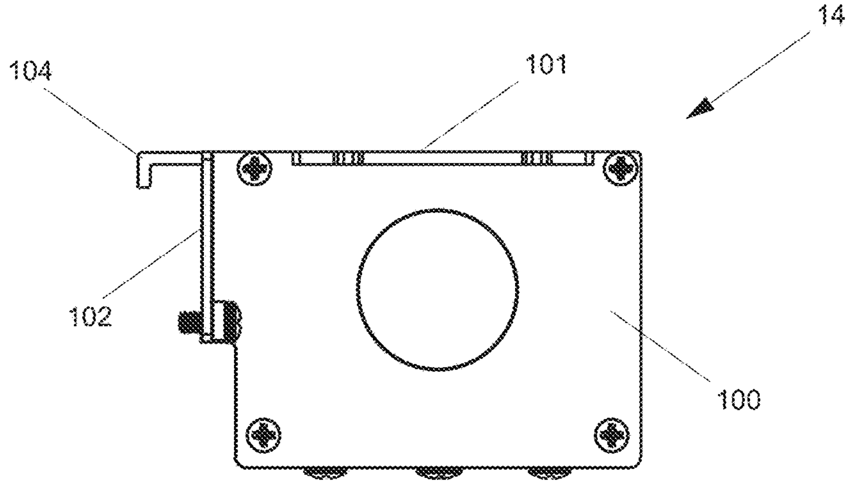
FIG. 26 is a front view of the exemplary driver of an exemplary lighting fixture according to an exemplary aspect of the present invention.
Figure 27:
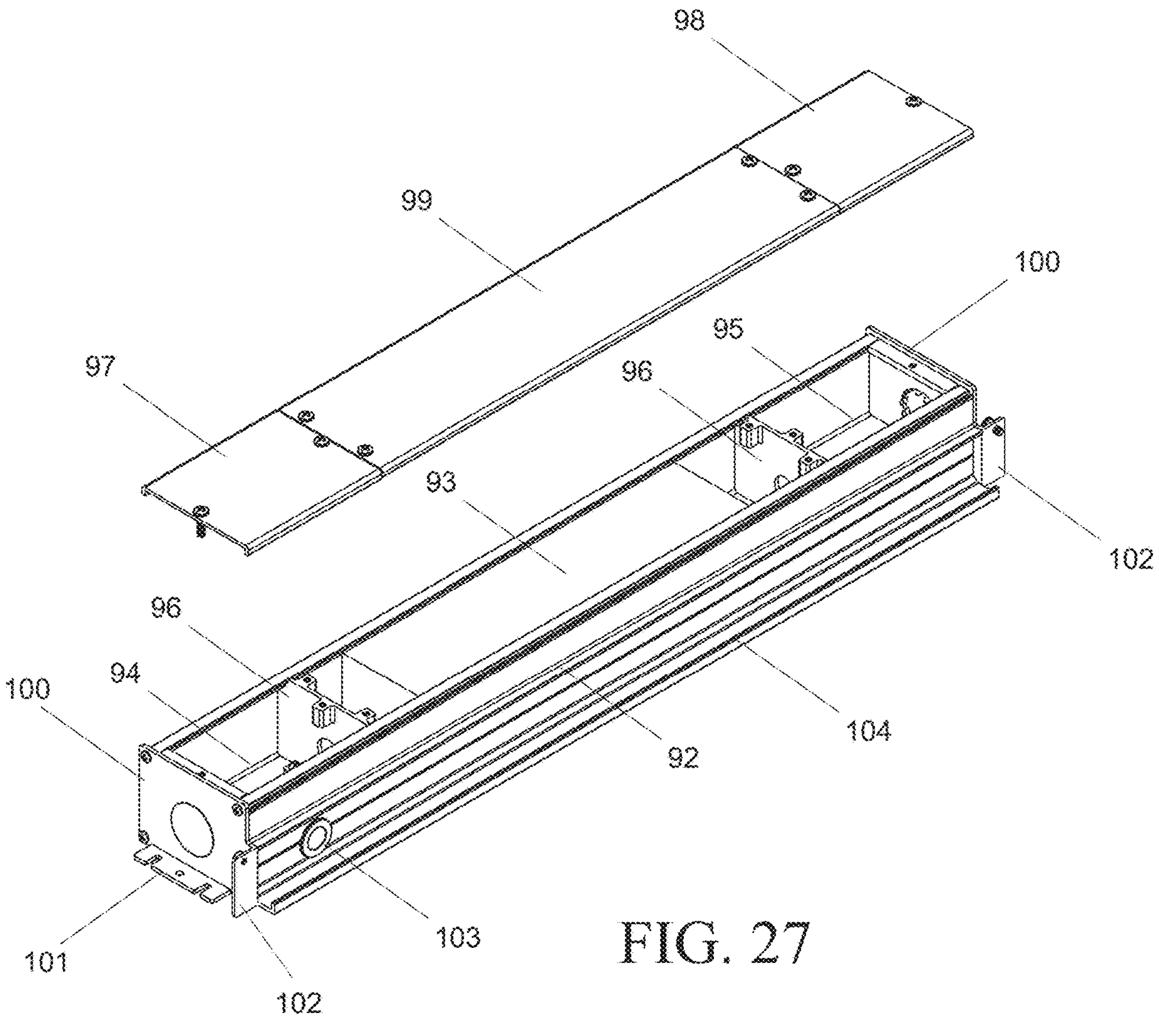
FIG. 27 is a partially exploded perspective view of the exemplary driver of an exemplary lighting fixture according to an exemplary aspect of the present invention.

Referring now to FIGS. 25-27, the driver 14 of the lighting fixture 10 may include a body 92 configured to house the components of the driver 14. The driver 14 may be an OSRAM OTi 100W constant current driver, but it is understood the present invention is not limited to any particular type of driver. The driver 14 may include a driver component 93, a low voltage compartment 94 and a high voltage compartment 95. The driver component 93 may be separated from each of the low voltage compartment 94 and the high voltage compartment 95 by divider plates 96. The low voltage compartment 94 may be covered by a low voltage wiring cover 97, which may be gasketed (not shown), and the high voltage compartment 95 may be covered by a high voltage wiring cover 98, which may be gasketed (not shown). Furthermore, the driver component 93, and/or the compartment of the body 92 in which the driver component 93 is disposed, may be covered by a driver cover 99, which may be gasketed (not shown). An end plate 100 may be secured to each end of the body 92 of the driver 14, and each end plate 100 may include a horizontal mounting tab 101 and a vertical mounting tab 102. The end plate 100 may also include a knockout or press-in cover that may be removed in order to connect the appropriate wiring to the driver 14. The body 92 of the driver 14 may include at least one wireway insert 103 through which an opening in the body 92 may be formed to create a passage between at least the low voltage compartment 94 and the region exterior to the body 92 of the driver 14. The driver 14 may further include a connecting flange 104 extending from the body 92 of the driver 14.

Figure 28:
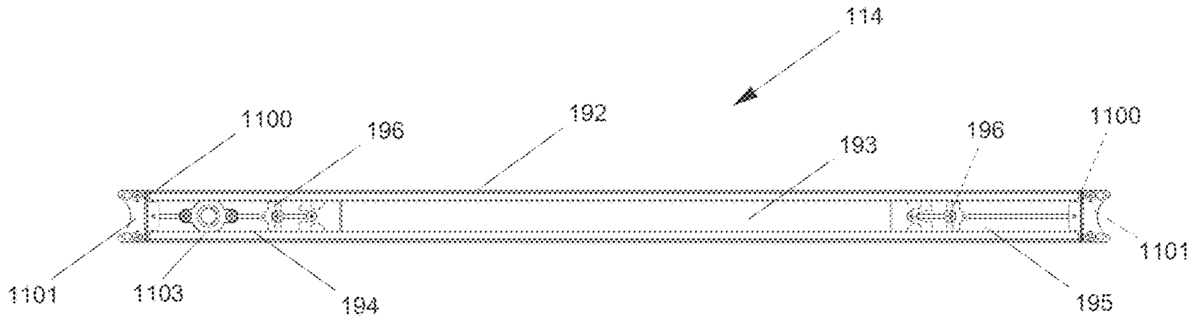
FIG. 28 is a top plan view, with certain components removed for illustration purposes, of an exemplary driver of an exemplary lighting fixture according to an exemplary aspect of the present invention.
Figure 29:
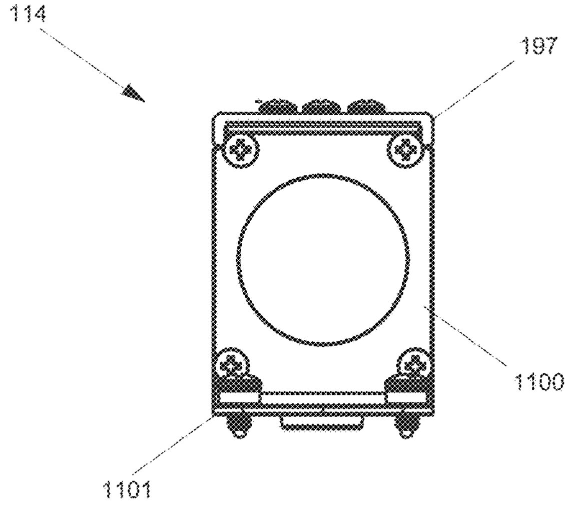
FIG. 29 is a front view of the exemplary driver of an exemplary lighting fixture according to an exemplary aspect of the present invention.
Figure 30:
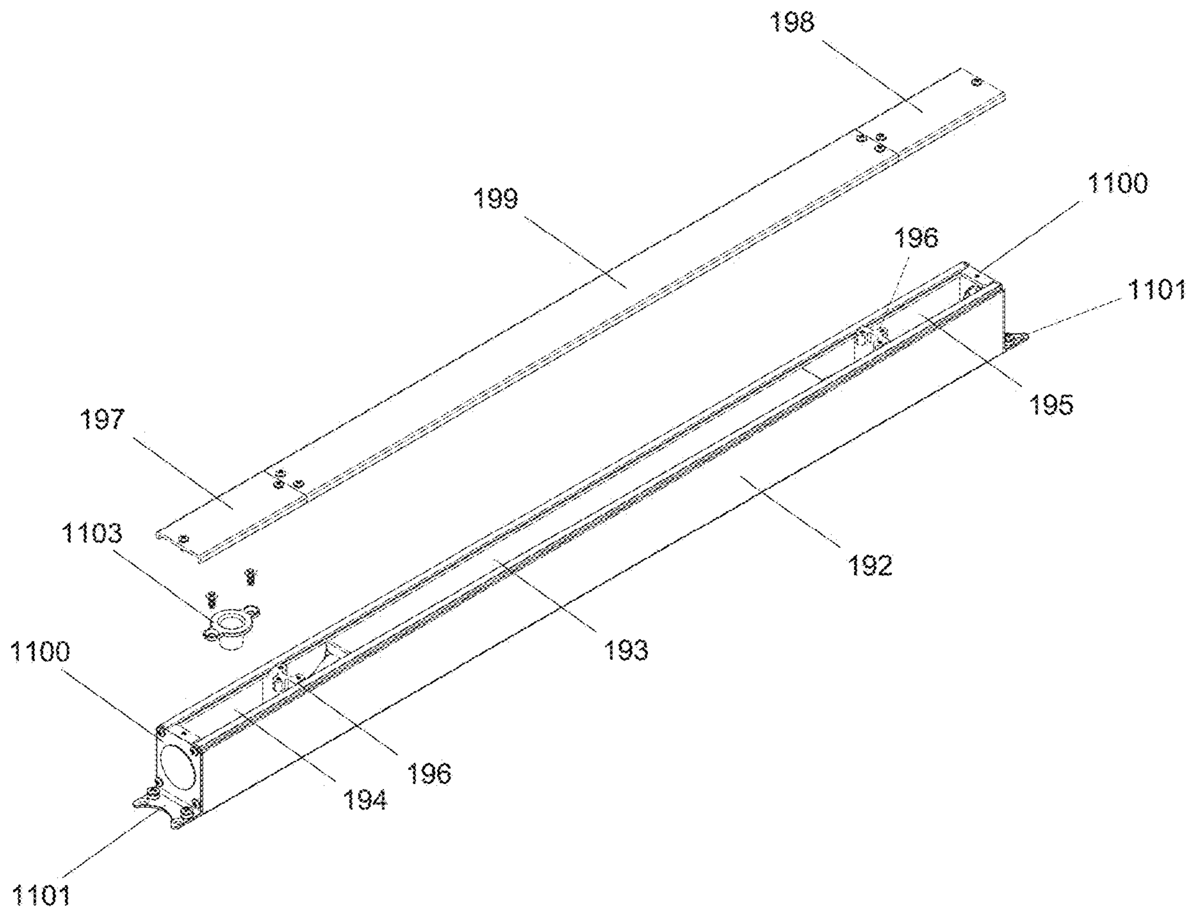
FIG. 30 is a partially exploded perspective view of the exemplary driver of an exemplary lighting fixture according to an exemplary aspect of the present invention.
Figure 31:
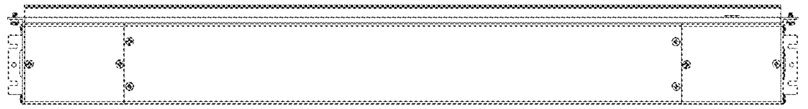
FIG. 31 is a top plan view of an exemplary driver of an exemplary lighting fixture according to an exemplary aspect of the present invention.
Figure 32:
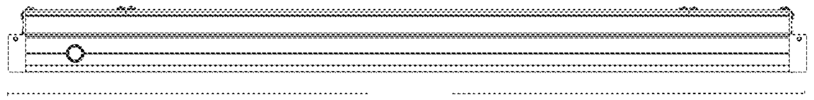
FIG. 32 is a side view of the exemplary driver of an exemplary lighting fixture according to an exemplary aspect of the present invention.
Figure 33:
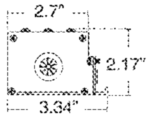
FIG. 33 is a front view of the exemplary driver of an exemplary lighting fixture according to an exemplary aspect of the present invention.
Figure 34:
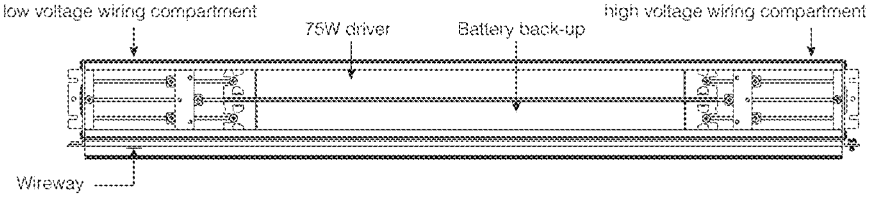
FIG. 34 is a top plan view, with certain components removed for illustration purposes, of the exemplary driver of an exemplary lighting fixture according to an exemplary aspect of the present invention.
Figure 35:
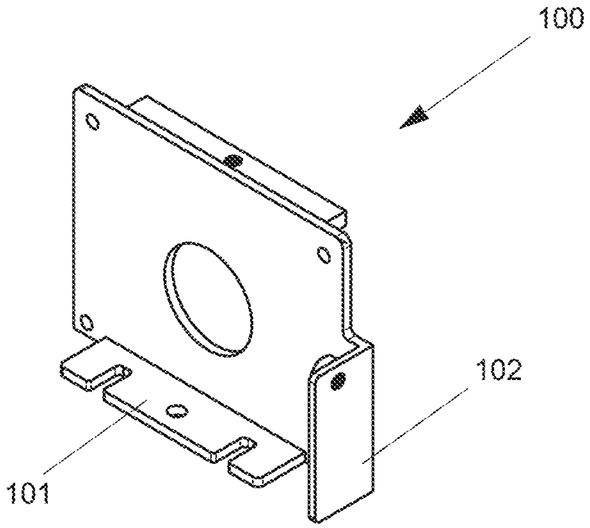
FIG. 35 is a perspective view of an exemplary end plate for use with an exemplary driver according to an exemplary aspect of the present invention.

Referring now to FIGS. 28-30, an alternative driver 114 for use with the lighting fixture 10 is illustrated. The driver 114 may include a body 192 configured to house the components of the driver 114. The driver 114 may be an Advance 40W or 75W constant current driver, but it is understood the present invention is not limited to any particular type of driver. The driver 114 may include a driver component 193, a low voltage compartment 194 and a high voltage compartment 195. The driver component 193 may be separated from each of the low voltage compartment 194 and the high voltage compartment 195 by divider plates 196. The low voltage compartment 194 may be covered by a low voltage wiring cover 197, which may be gasketed (not shown), and the high voltage compartment 195 may be covered by a high voltage wiring cover 198, which may be gasketed (not shown). Furthermore, the driver component 193, and/or the compartment of the body 192 in which the driver component 193 is disposed, may be covered by a driver cover 199, which may be gasketed (not shown). An end plate 1100 may be secured to each end of the body 192 of the driver 114, and each end plate 1100 may include a horizontal mounting tab 1101. The end plate 1100 may also include a knockout or press-in cover that may be removed in order to connect the appropriate wiring to the driver 114. The body 192 of the driver 114 may include at least one wireway insert 1103 through which an opening in the body 192 may be formed to create a passage between at least the low voltage compartment 194 and the region exterior to the body 192 of the driver 114.

Figure 37:
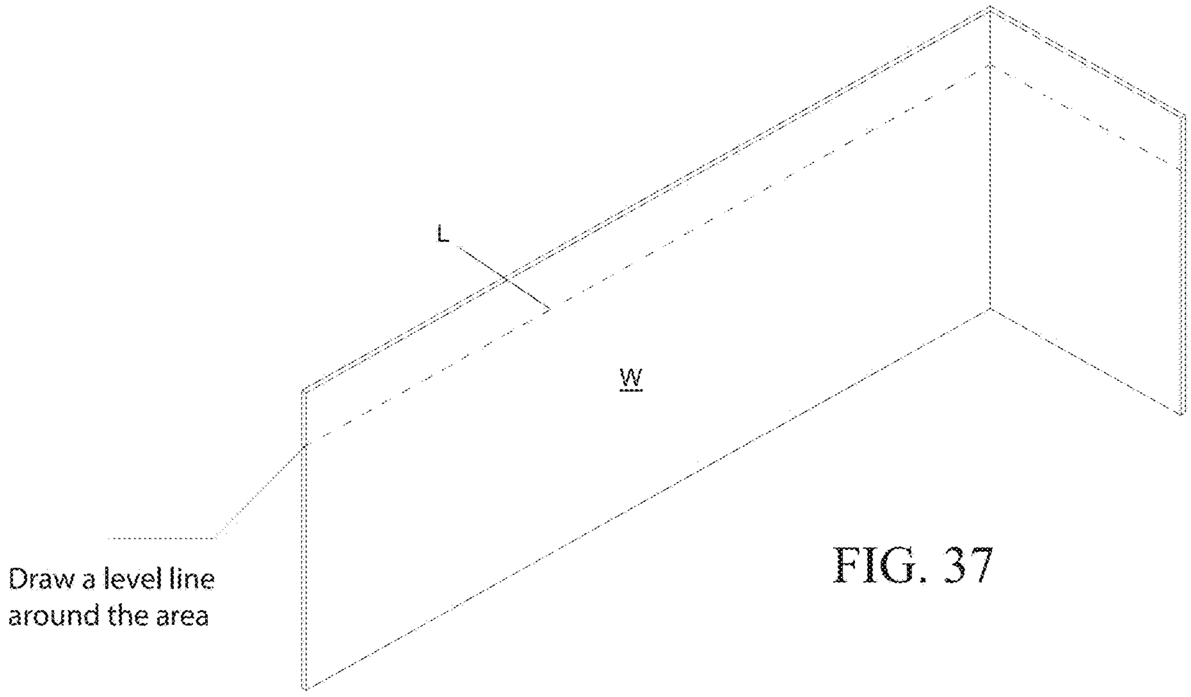
FIGS. 37-70 provide various views of an exemplary installation process of an exemplary lighting fixture according to an exemplary aspect of the present invention.

An exemplary installation of the lighting fixture 10 according to an exemplary aspect of the present invention will now be discussed with reference to FIGS. 37-70. As shown in FIG. 37, a level line L may be drawn on one or more wall surfaces W around the perimeter of the area in which the lighting fixture 10 is to be installed at a height calculated by:

Line Height=Finished Ceiling Height+Regressed Height

Figure 39:
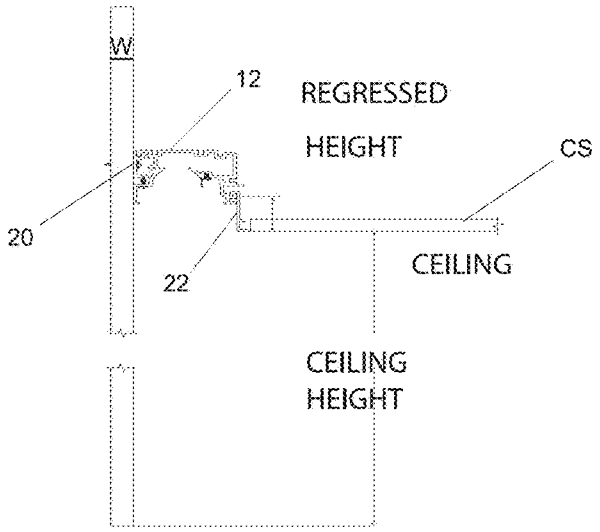

FIG. 39 demonstrates the exemplary distances used in calculating the level line L height for installation of the lighting fixture 10. The finished ceiling height refers to the distances between a floor surface and a ceiling surface CS, and the regressed height dependent upon the length of the flange 22 used in connection with the lighting fixture 10. The mounting bracket 20 can be cut to appropriate lengths so that there is a minimum clearance distances, for example at least two inches, between the mounting brackets 20 when installed on the wall surfaces W.

Figure 38:
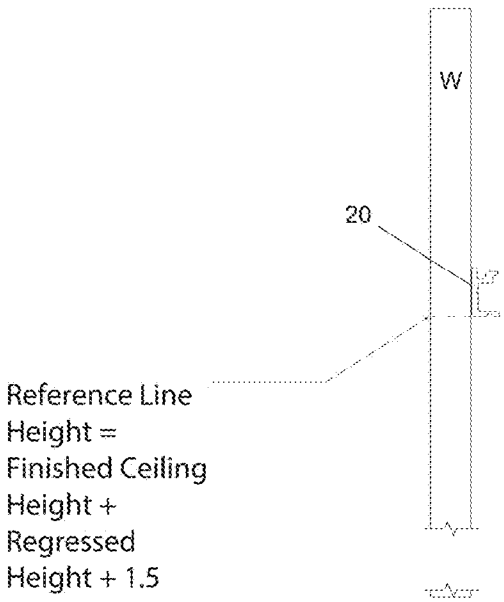
Figure 40:
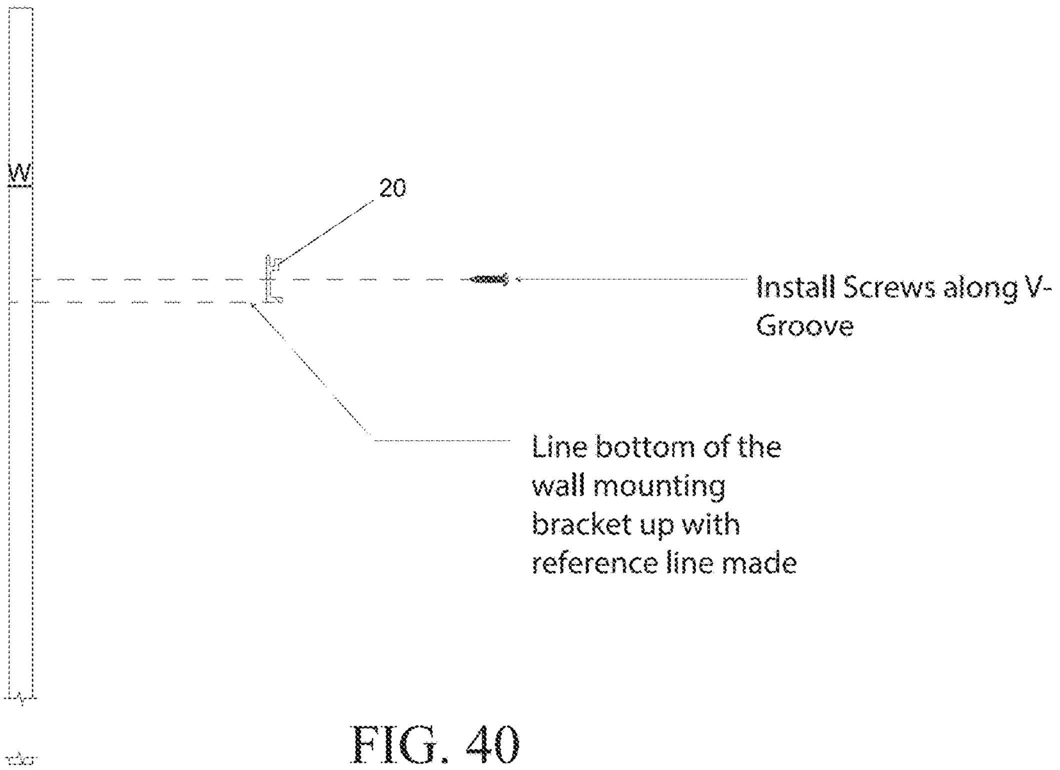
Figure 41:
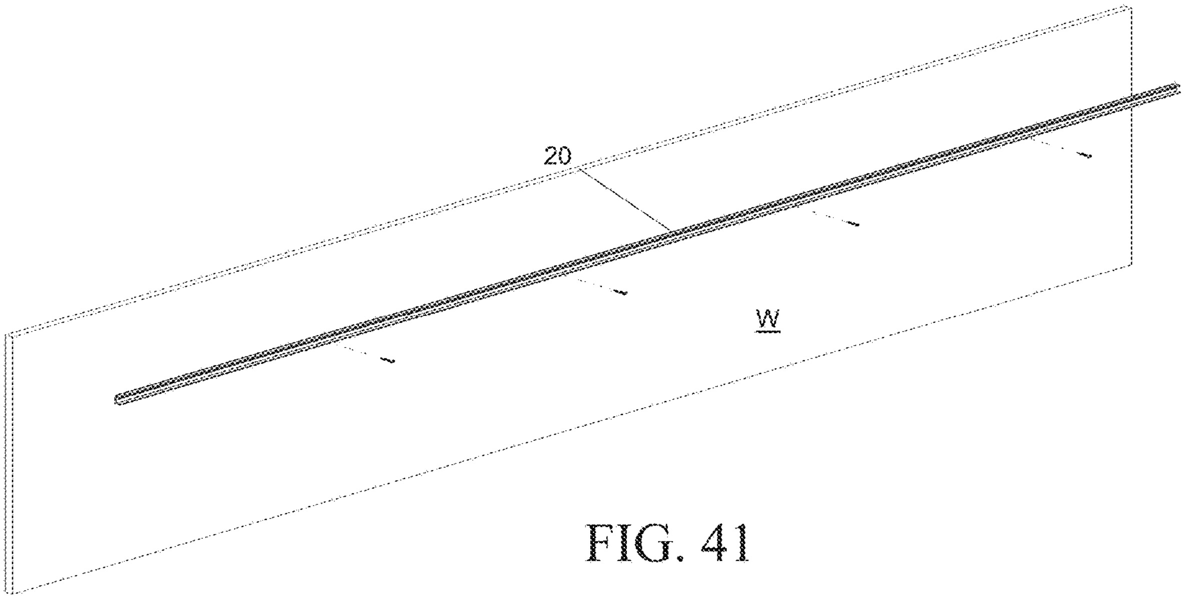
Figure 42A:
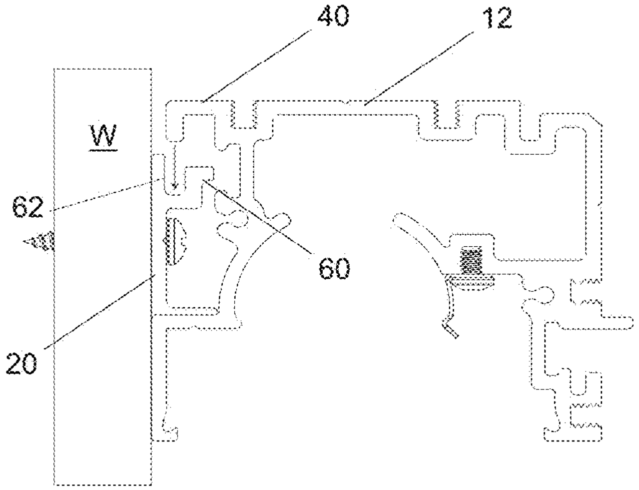
Figure 42:
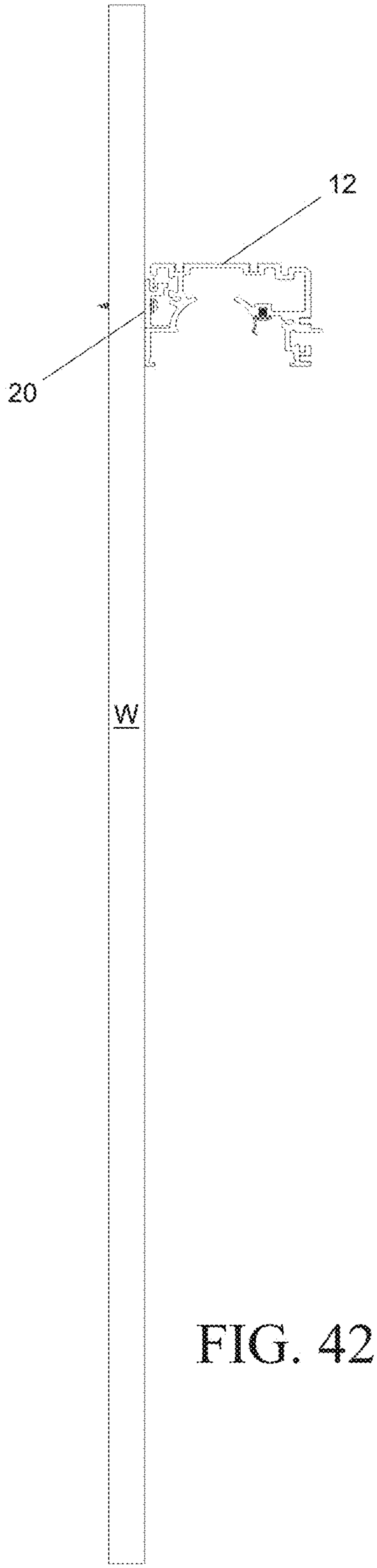
Figure 43:
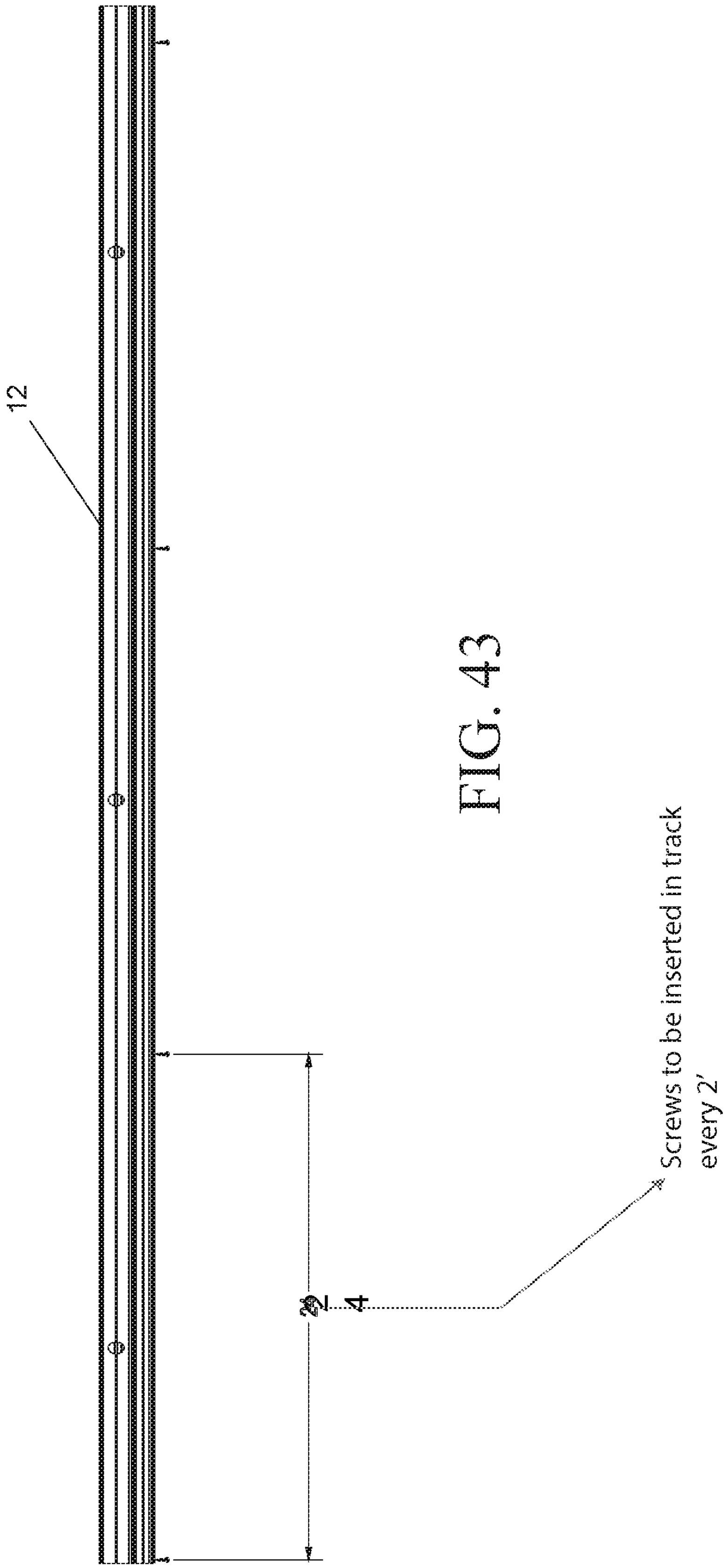
Figure 44:
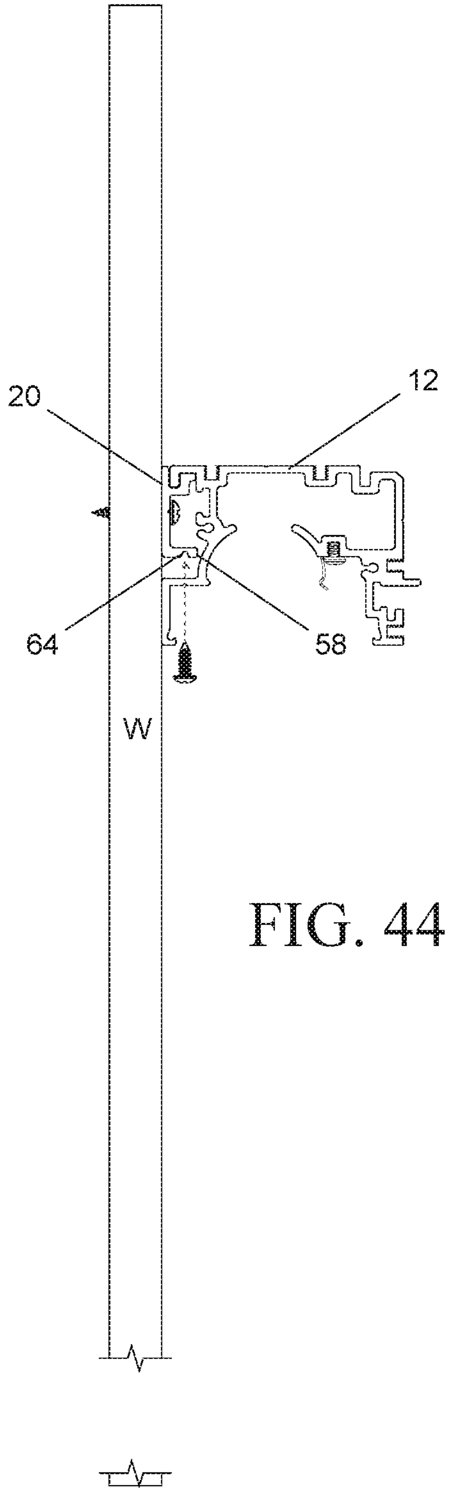
Figure 45A:
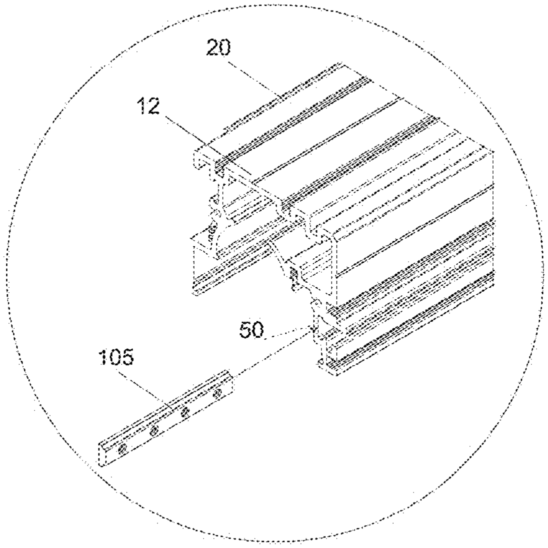
Figure 45:
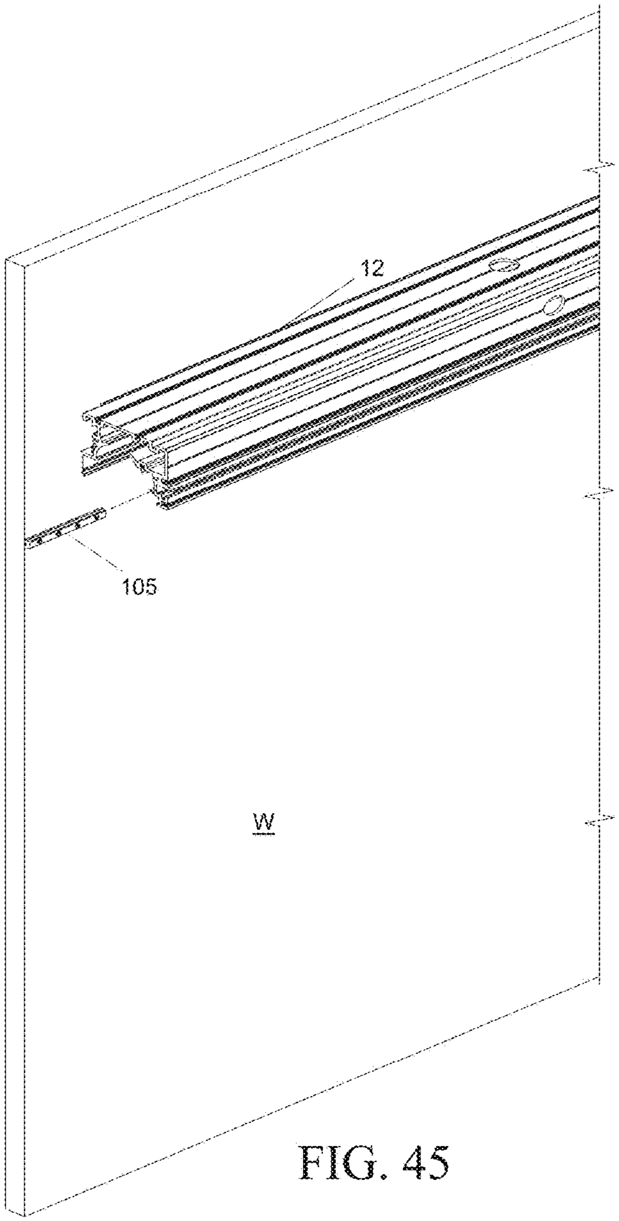

As shown in FIG. 38, the bottom of the mounting bracket 20 may be lined up with the level line L. Referring to FIGS. 40-41, the mounting bracket 20 may be secured to the wall surface W through the use of one or more fasteners, such as screws, nails or the like, at appropriated spaced intervals, for example every 16 inches or other suitable distances between wall framing. The fasteners may be installed through the mounting bracket 20 using pre-drilled holes, whether existing from the manufacturing process or drilled on-site, self-drilling fasteners, or facilitated by a groove formed in the mounting bracket 20. As shown in FIGS. 42 and 42A, the housing 12 may be hung on the mounting bracket 20 by means of engagement of the longitudinal hook 40 of the housing 12 with the retaining bay 62 and the supporting arm 60 of the mounting bracket 20. As shown in FIGS. 43 and 44, the housing 12 may be secured to the mounting bracket 20, such that the housing 12 can no longer be lifted off of the mounting bracket 20, by the insertion of one or more fasteners, such as screws, bolts, pins or the like through the housing 12 and into the indentation 64 in the foot 58 of the mounting bracket 20. Fasteners may be placed through the housing 12 and make contact with the mounting bracket 20 at designated intervals, for example every two feet. In this manner, the fastener or fasteners inhibit removal of the longitudinal hook 40 of the housing 12 from the retaining bay 62 of the mounting bracket 20, and thus accidental movement of the housing 12 relative to the mounting bracket 20. Accordingly, the fasteners must be removed or loosed so there is no longer engagement between the fasteners and the indentation 64 to allow for sufficient clearance between the longitudinal hook 40 and the retaining bay 62 if the housing 12 is to be removed from the mounting bracket 20. It is understood that the installation of the housing 12 on the mounting bracket 120 (see FIGS. 17-18) would proceed in the same manner.

Figure 46:
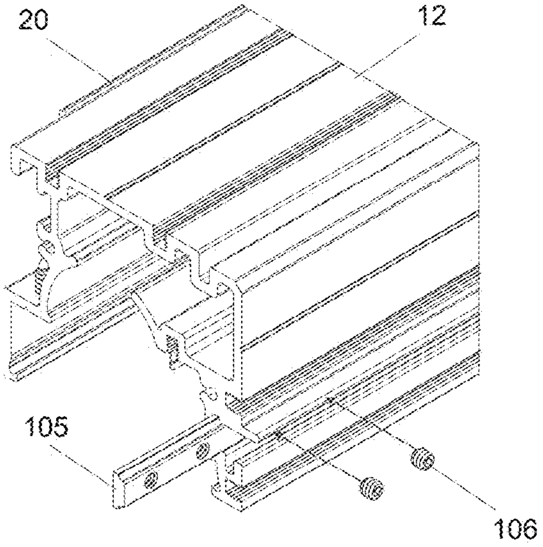
Figure 47:
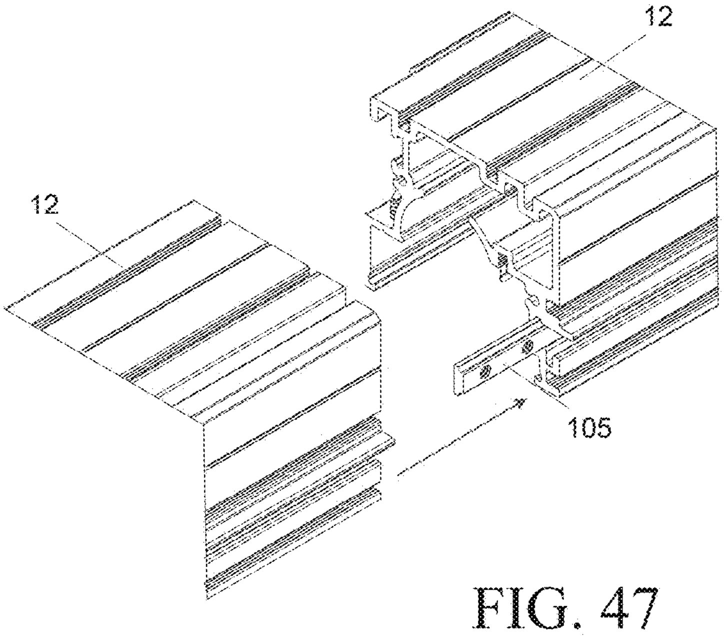
Figure 48:
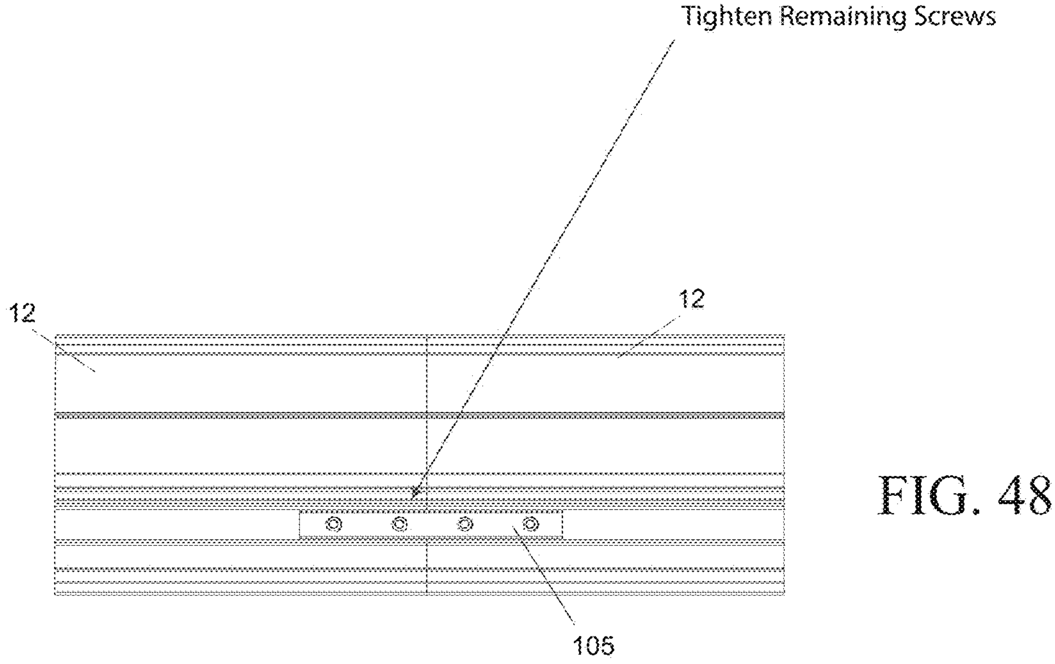
Figure 49:
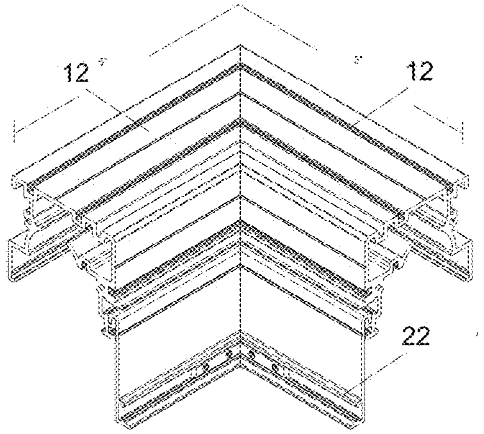
Figure 50:
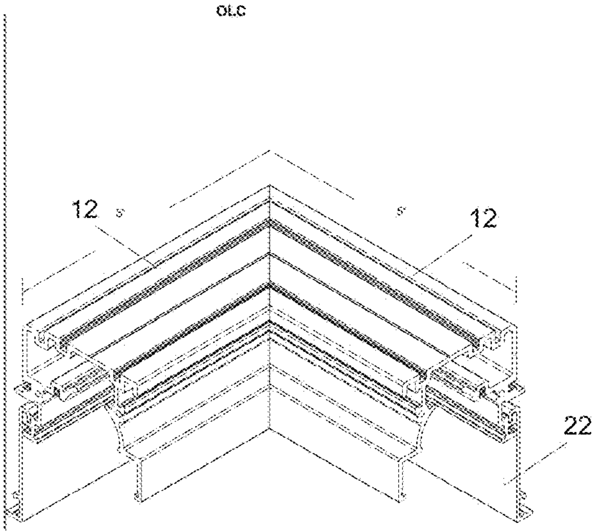
Figure 50A:
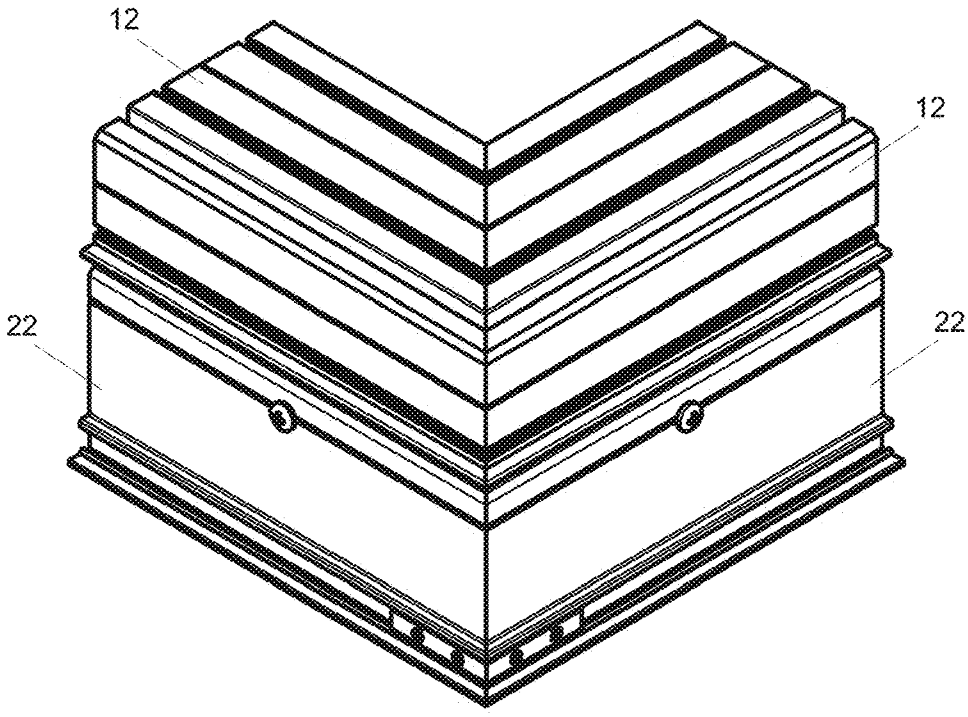
Figure 50B:
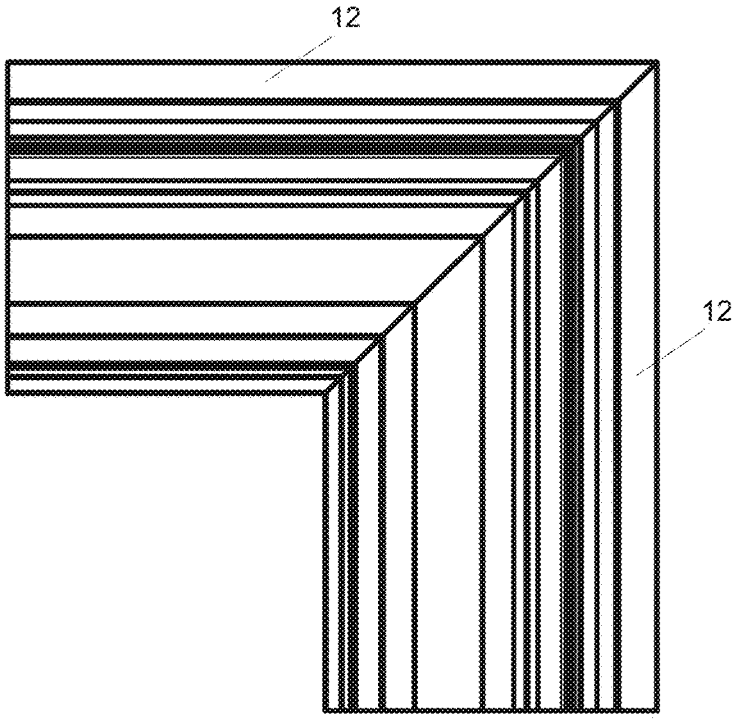

Referring now to FIGS. 45, 45A and 46-48, the connection of housings 12 will now be discussed. If multiple lengths of housing 12 are to be installed, each of the housings 12 may be connected to corresponding mounting brackets 20, or mounting brackets 120, as discussed above. In addition, it may be desirable to connect the lengths of housings 12 to each other. In order to accomplish this, an inline bracket 105 may be inserted into the longitudinal slot 50 of one of the housings 12 (see FIGS. 45 and 45A). As shown in FIG. 46, one of more set screws 106 may then be threaded into the treaded openings positioned in the inline bracket 105. The set screws 106 urge the inline bracket 105 into a tight relationship with the longitudinal slot 50 so that movement of the inline bracket 105 along the longitudinal slot 50 is inhibited. As shown in FIG. 47, a second housing 12 may then be slid onto the inline bracket 105 by aligning the longitudinal slot 50 of the second housing 12 with the inline bracket 105. As shown in FIG. 48, additional set screws 106 may be installed in the remaining treaded openings of the inline bracket 105 so as to secure the inline bracket 105 into the longitudinal slot 50 of the second housing 12. As shown in FIGS. 49-50, 50A and 50B, corner connections of the housings 12 are also contemplated by the present invention through the use of angled inline brackets.

Figure 51:
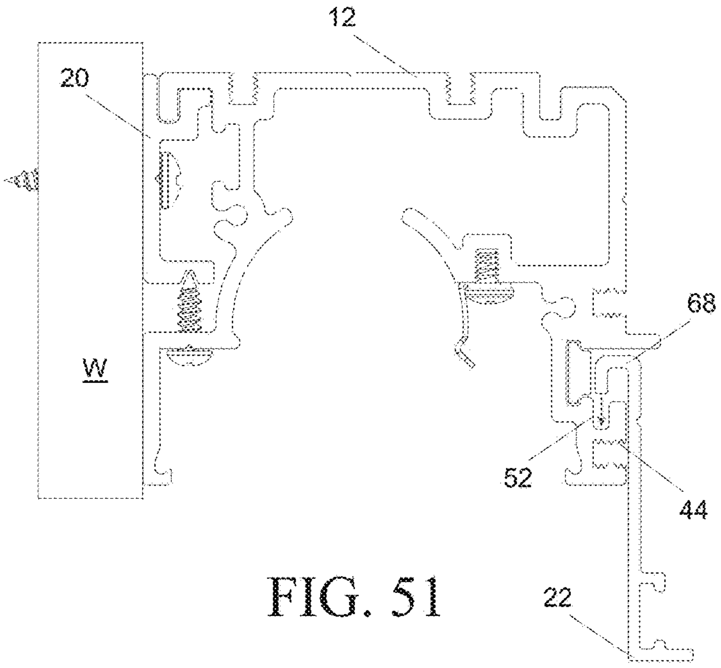
Figure 52:
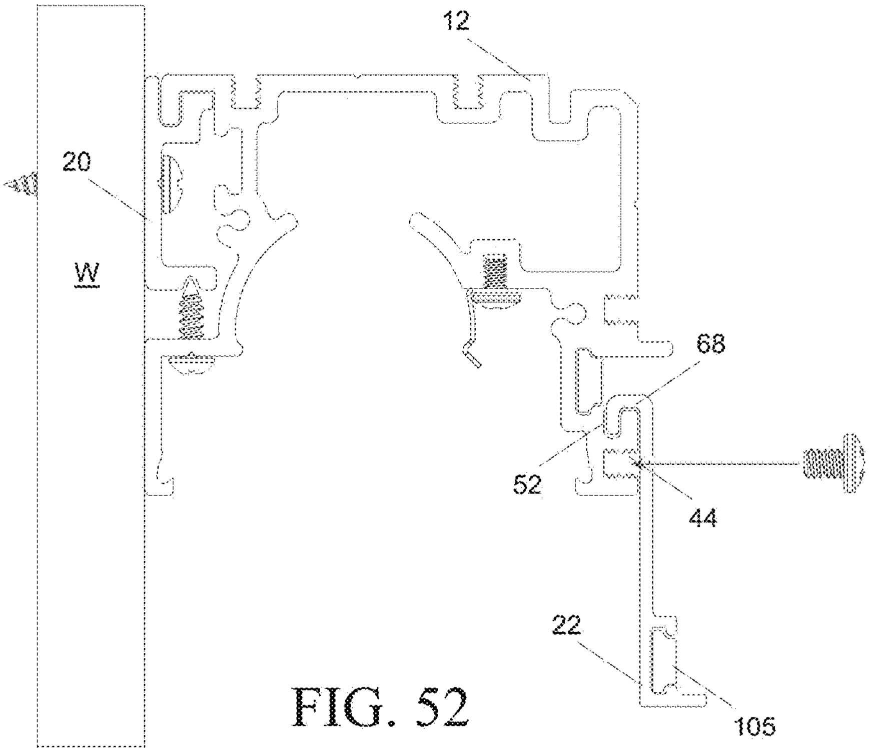
Figure 53:
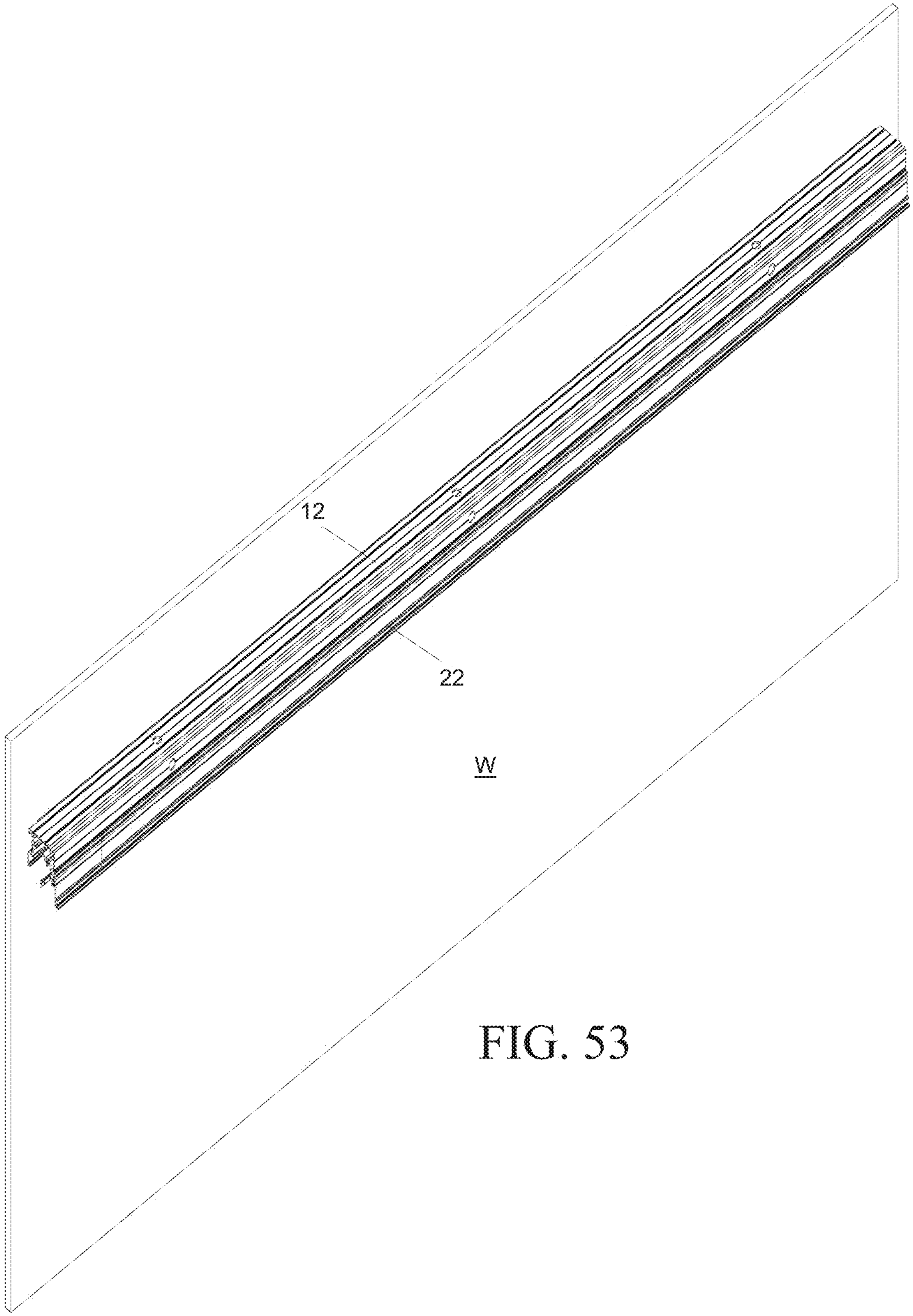
Figure 54:
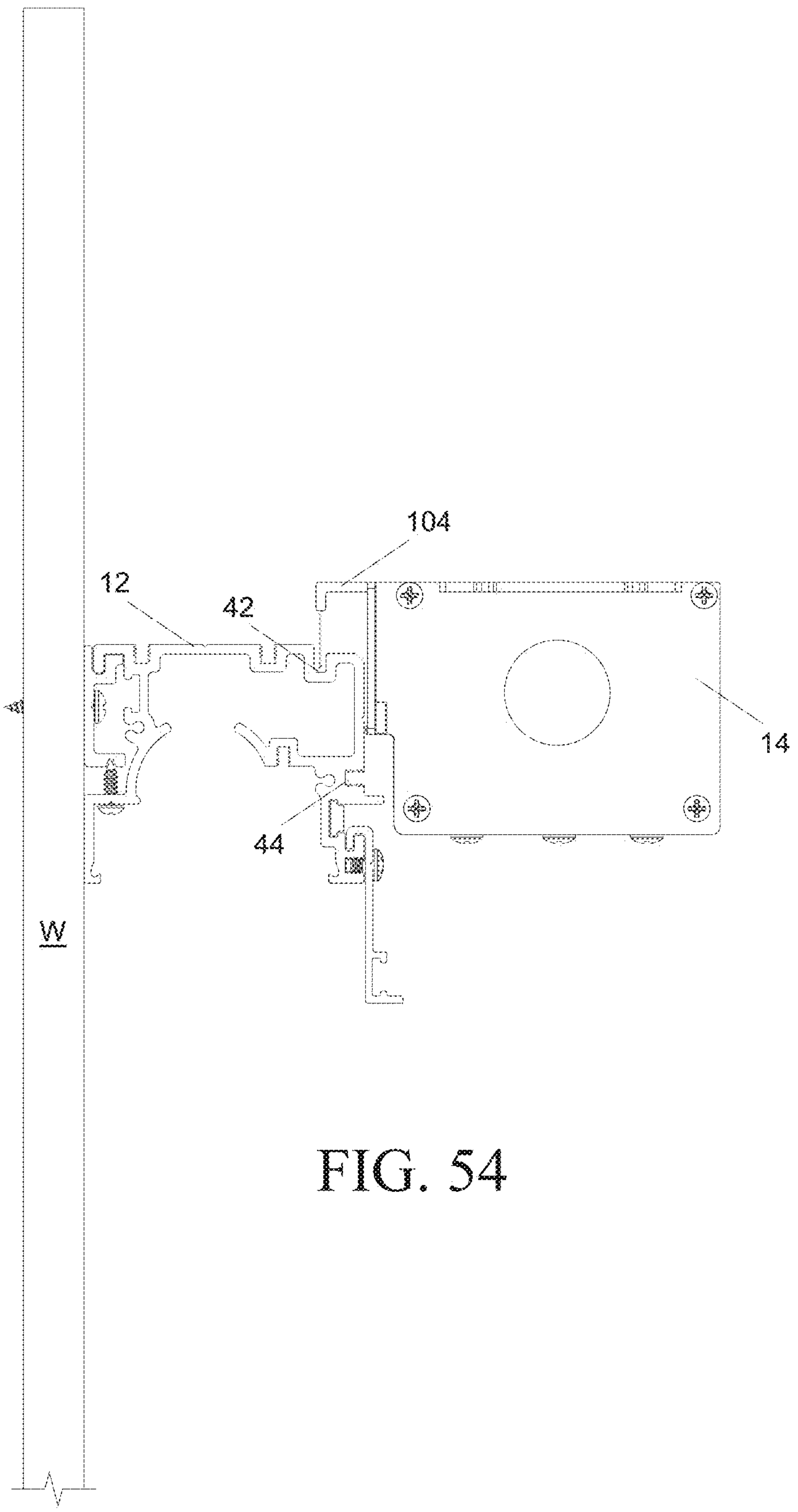
Figure 55:
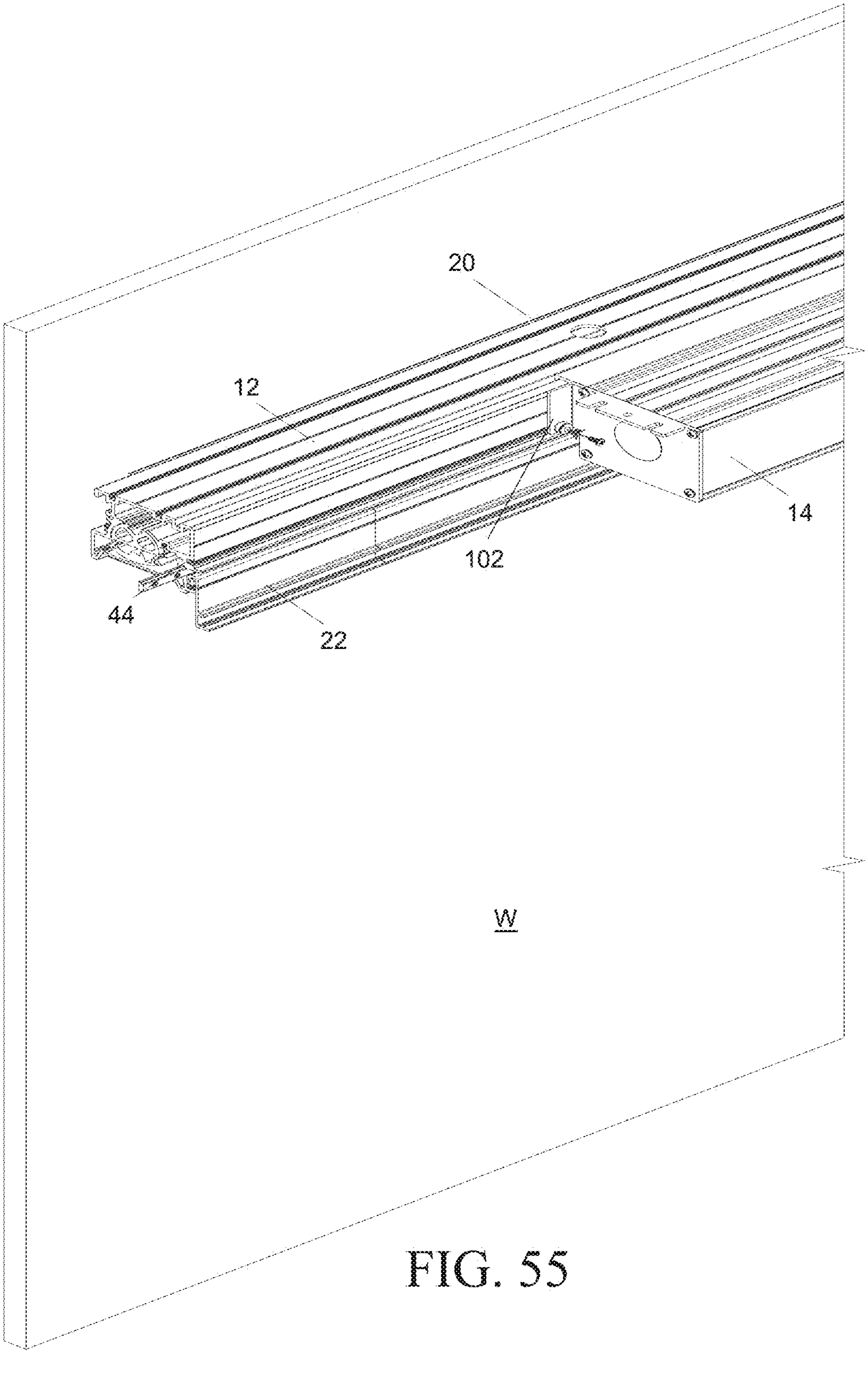
Figure 56:
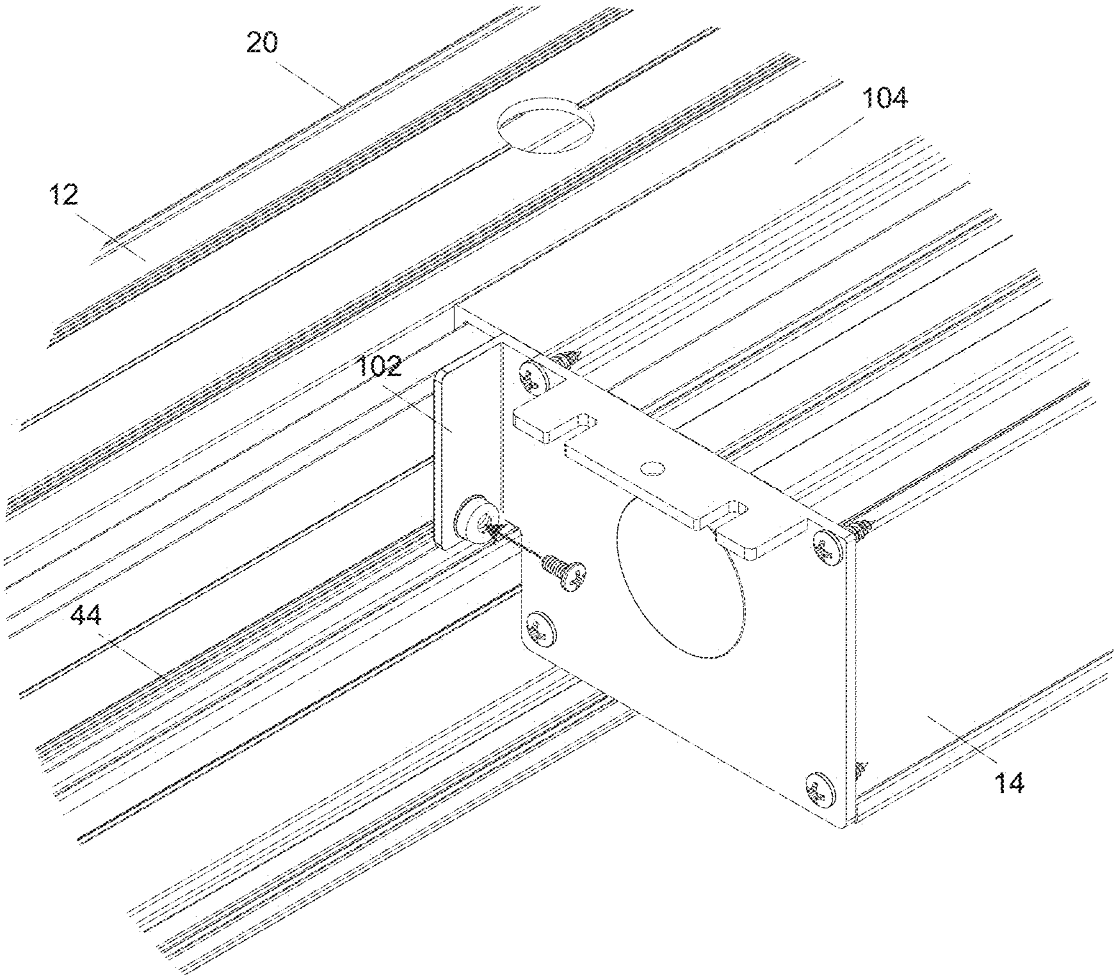
Figure 57A:
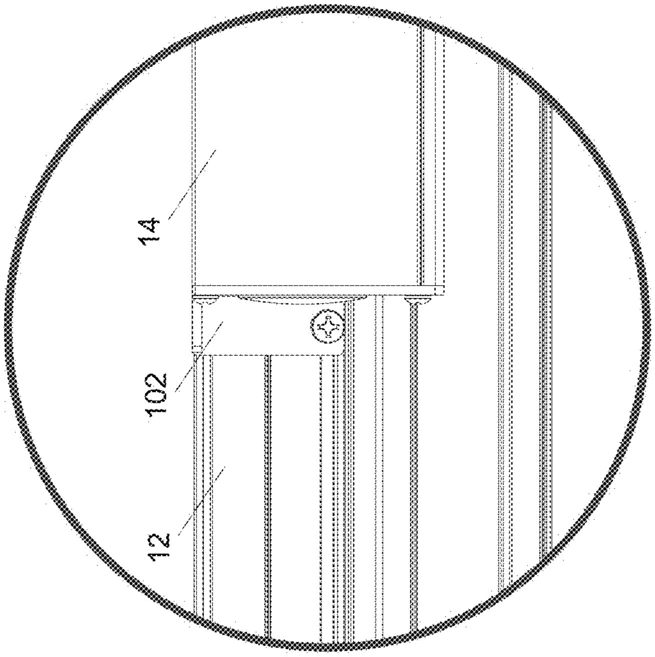
Figure 57:
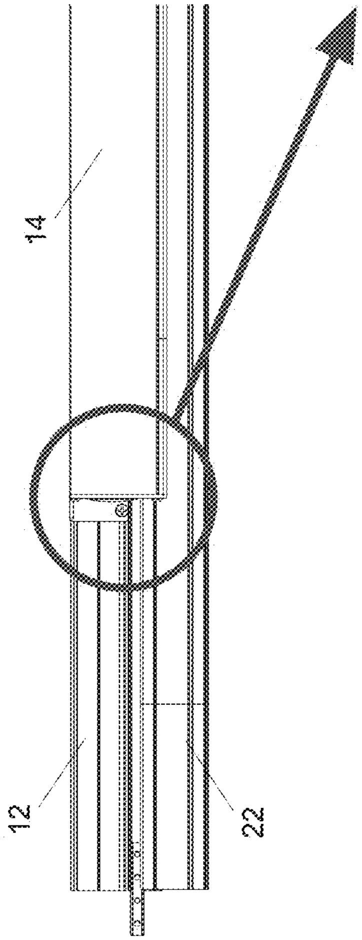
Figure 59:
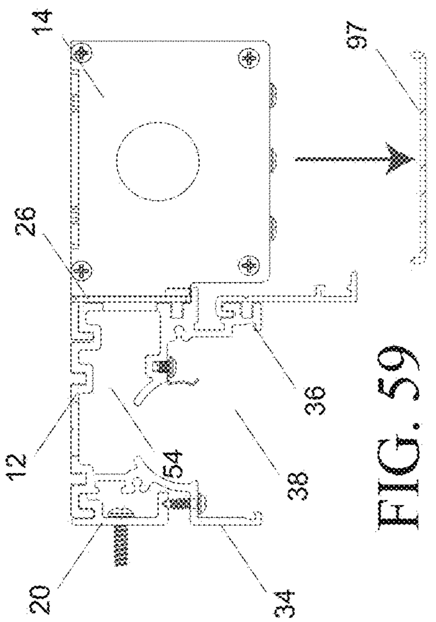
Figure 60:
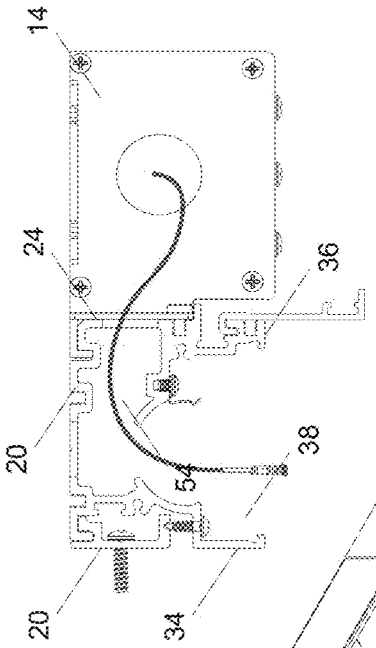
Figure 58:
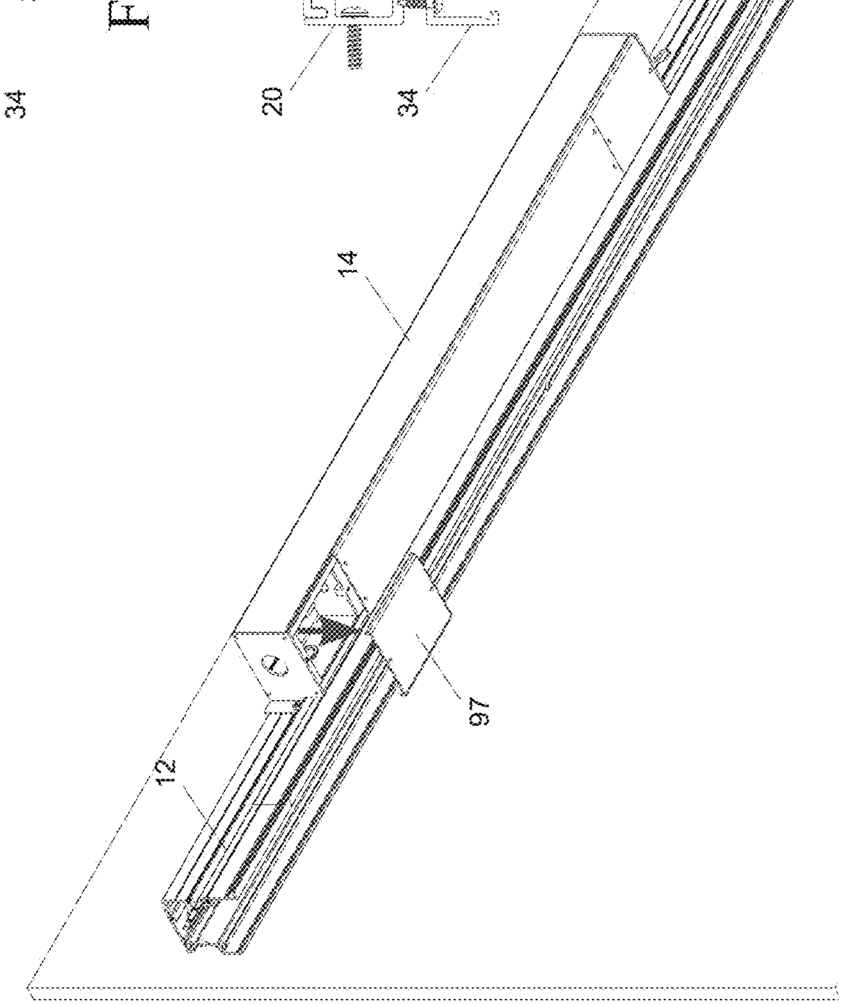
Figure 62:
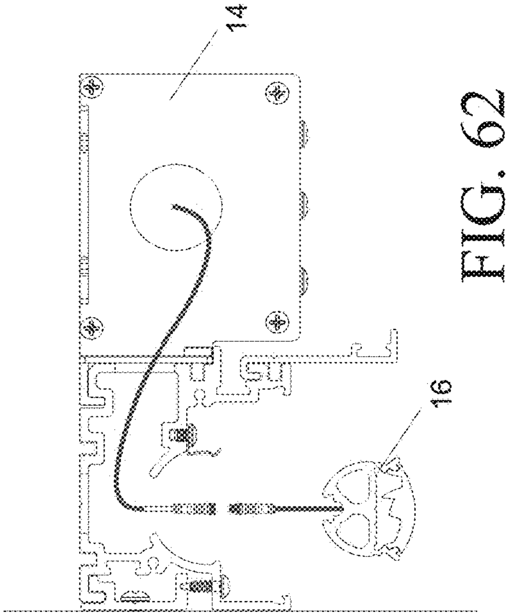
Figure 63:
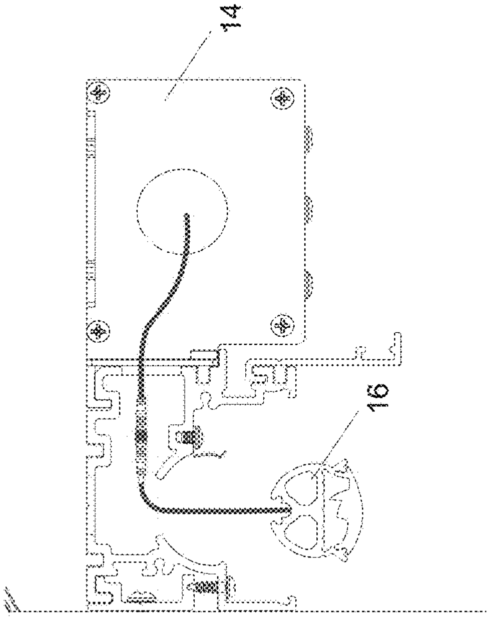
Figure 61:
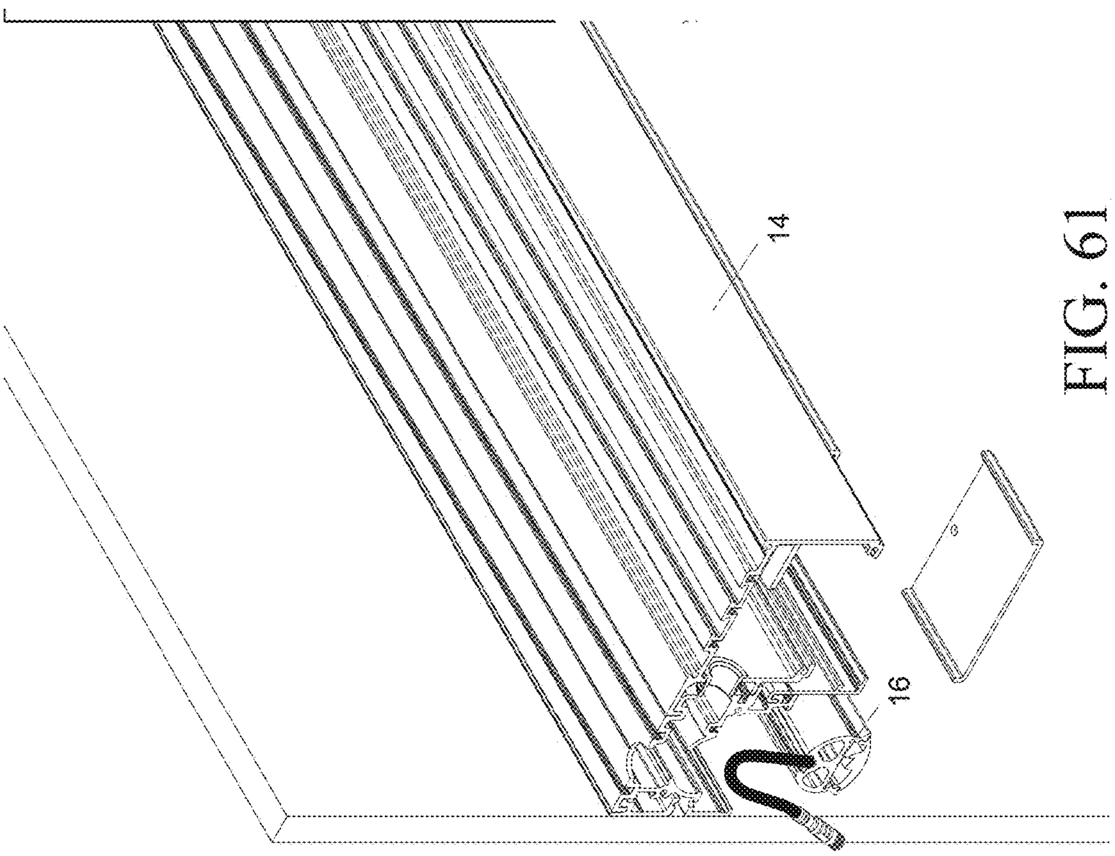
Figure 65:
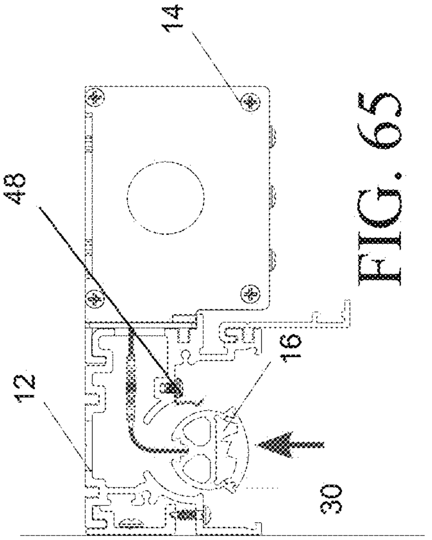
Figure 66:
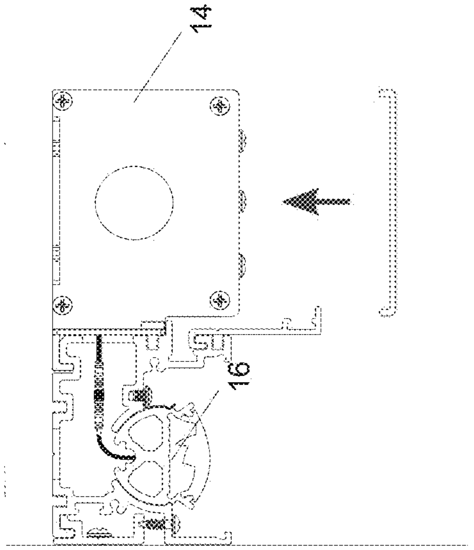
Figure 64:
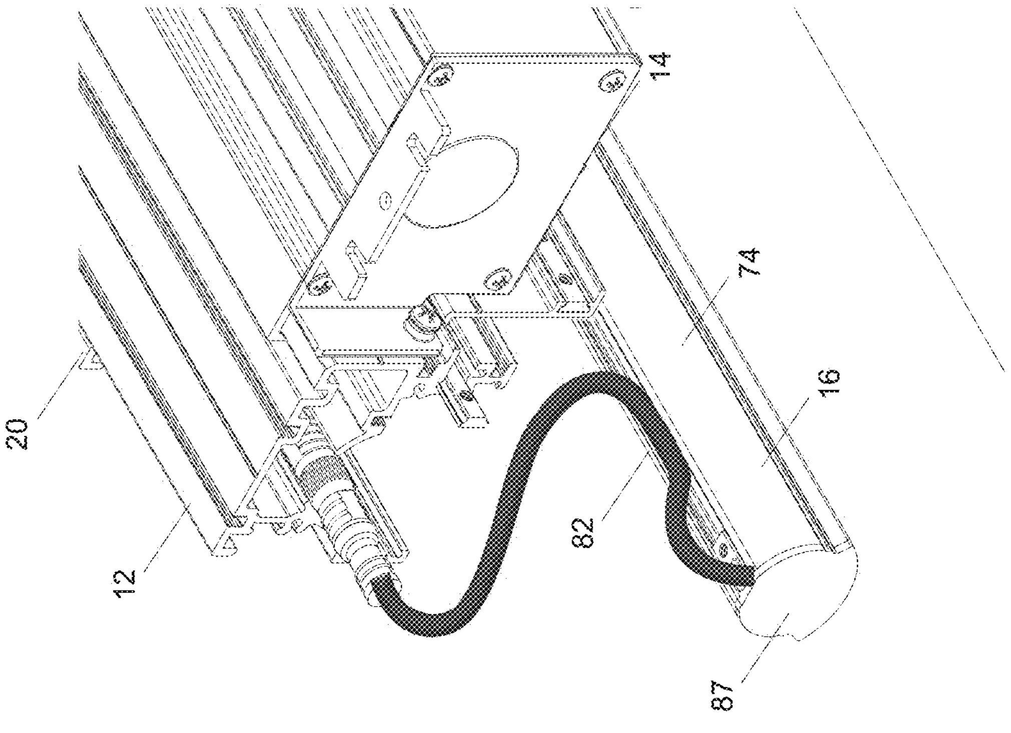
Figures 67, 68:
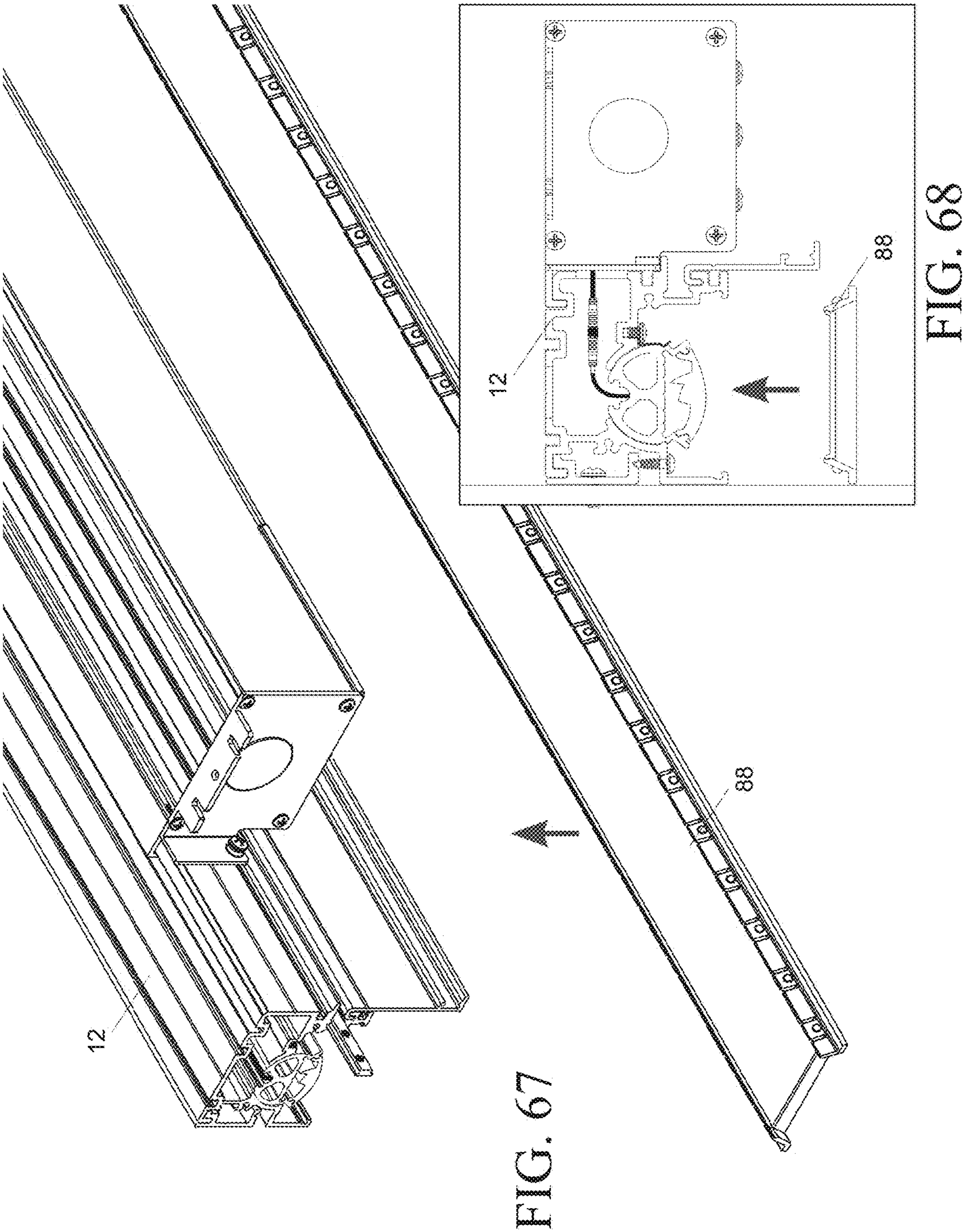
Figures 69, 70:
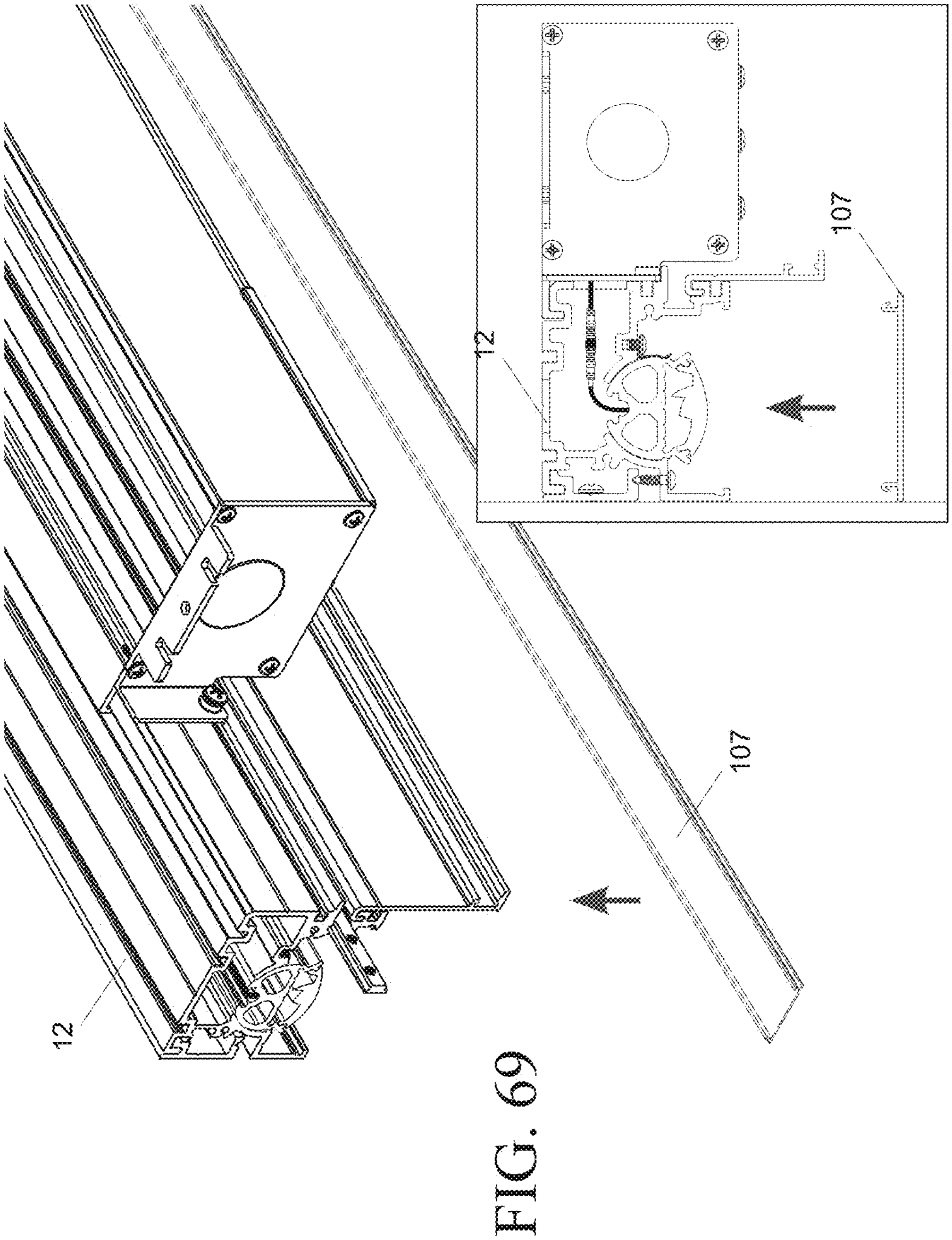
Figure 89:
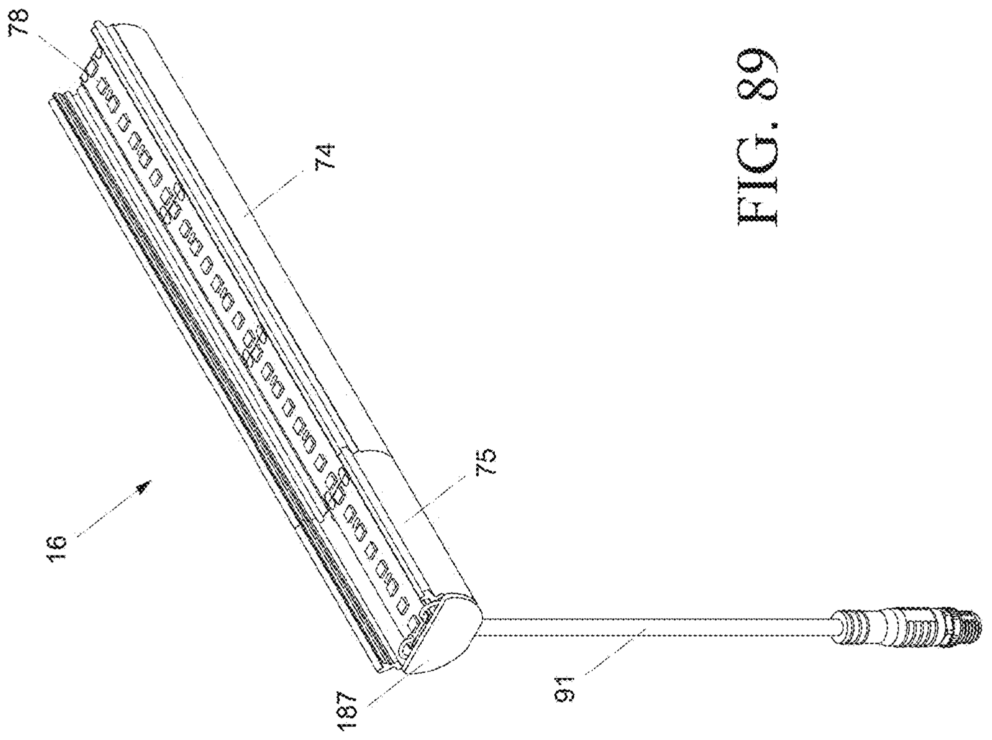
FIG. 89 is a perspective view of an exemplary light module according to an exemplary aspect of the present invention.
Figure 88:
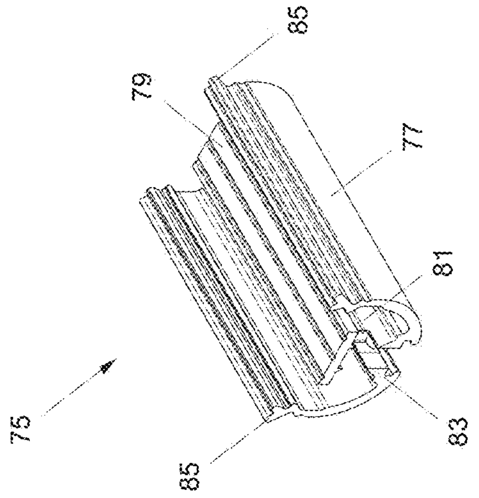
FIG. 88 is a perspective view of an exemplary seamless component for use with an exemplary light module according to an exemplary aspect of the present invention.
Figure 91:
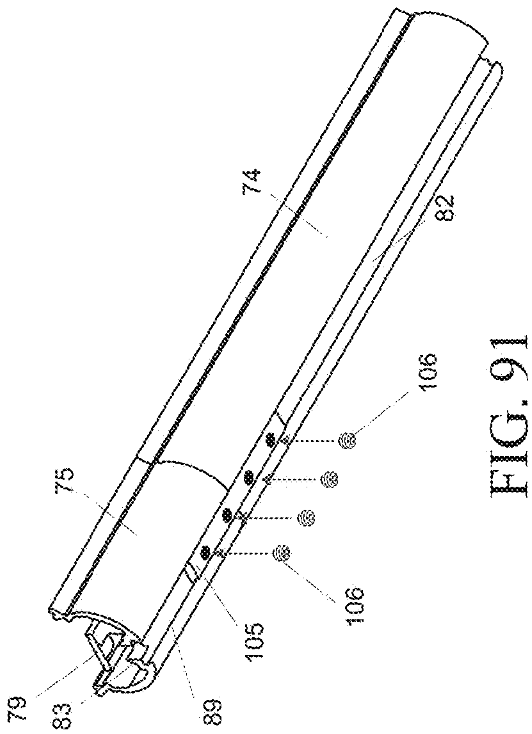
FIG. 91 is a partially exploded perspective view of an exemplary light module according to an exemplary aspect of the present invention.
Figure 90:
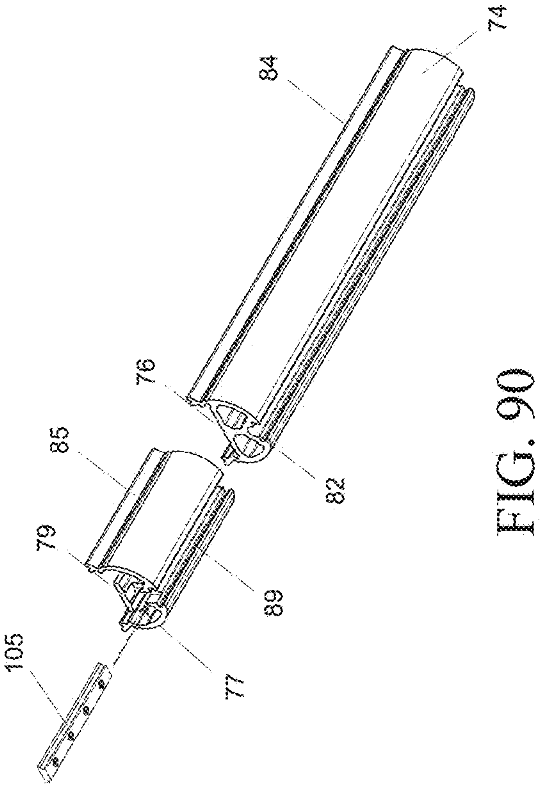
FIG. 90 is an exploded perspective view of an exemplary light module according to an exemplary aspect of the present invention.
Figure 93:
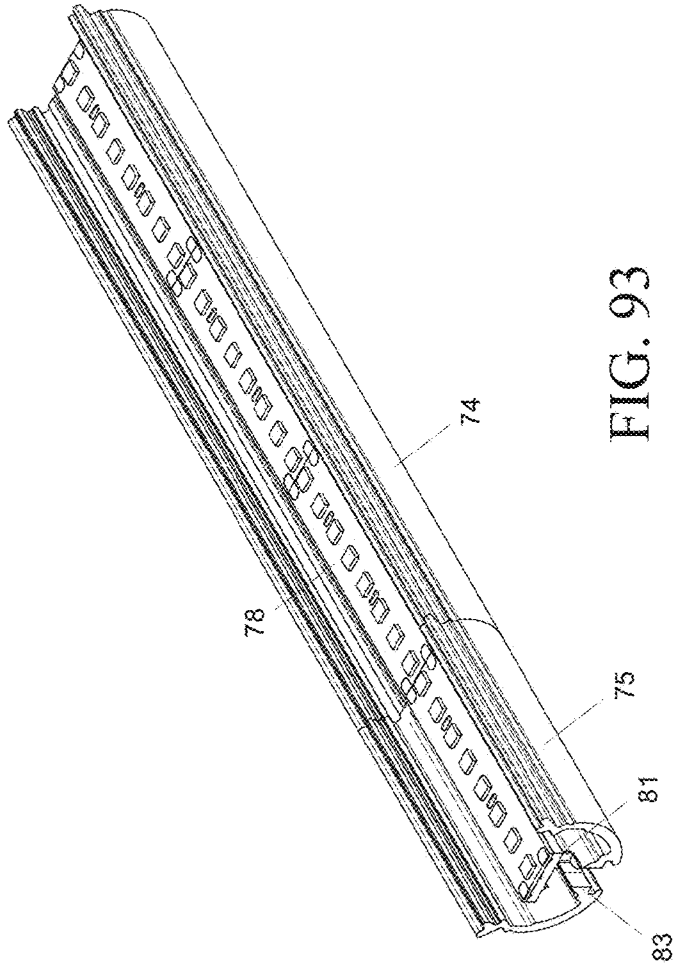
FIG. 93 is a perspective view of an exemplary light module according to an exemplary aspect of the present invention.
Figure 92:
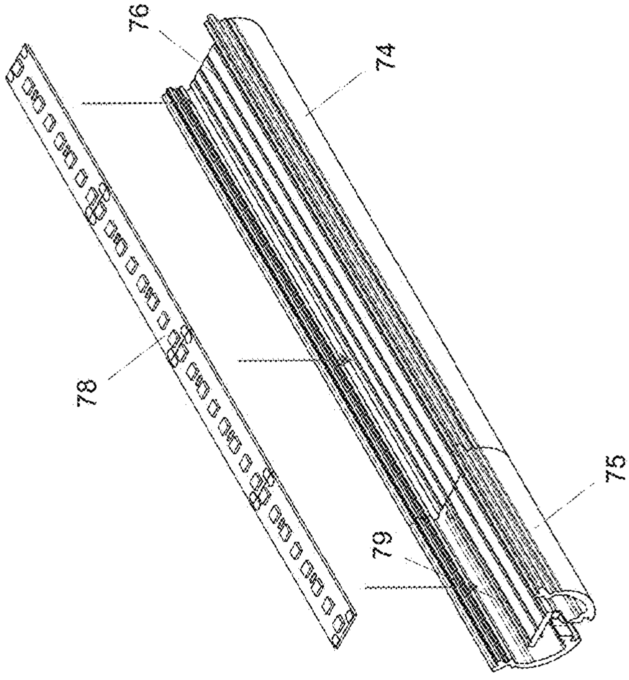
FIG. 92 is a partially exploded perspective view of an exemplary light module according to an exemplary aspect of the present invention.
Figure 95:
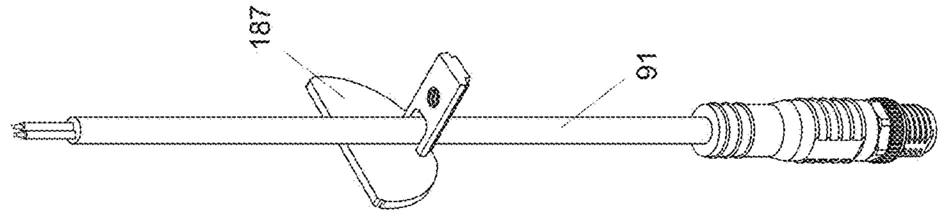
FIG. 95 is a perspective view of the exemplary end cap for use with an exemplary light module according to an exemplary aspect of the present invention.
Figure 94:
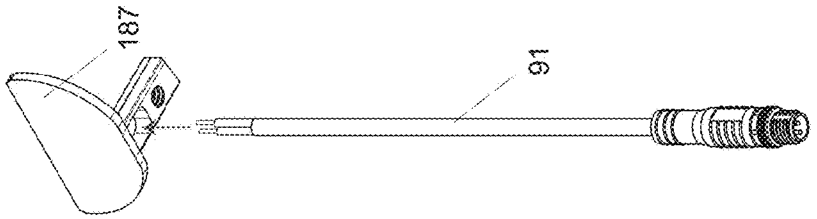
FIG. 94 is a perspective view of an exemplary end cap for use with an exemplary light module according to an exemplary aspect of the present invention.
Figure 96:
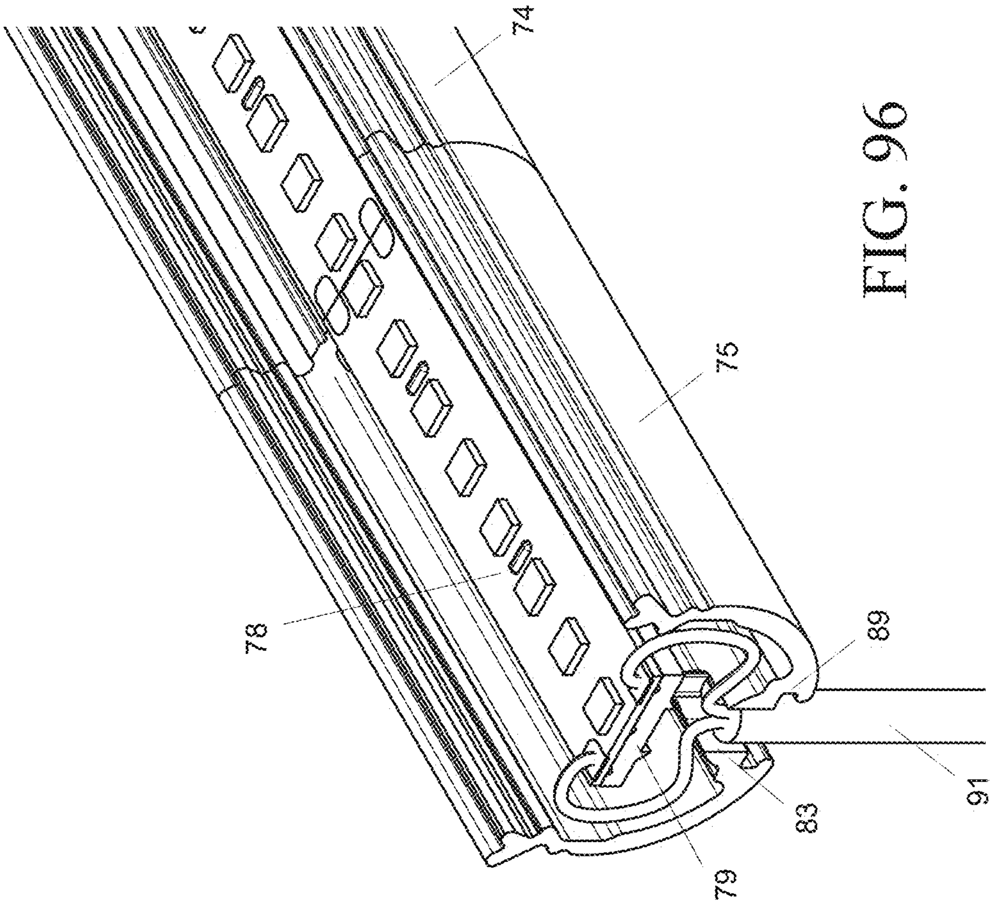
FIG. 96 is an enlarged perspective view of an exemplary light module according to an exemplary aspect of the present invention.
Figure 98:
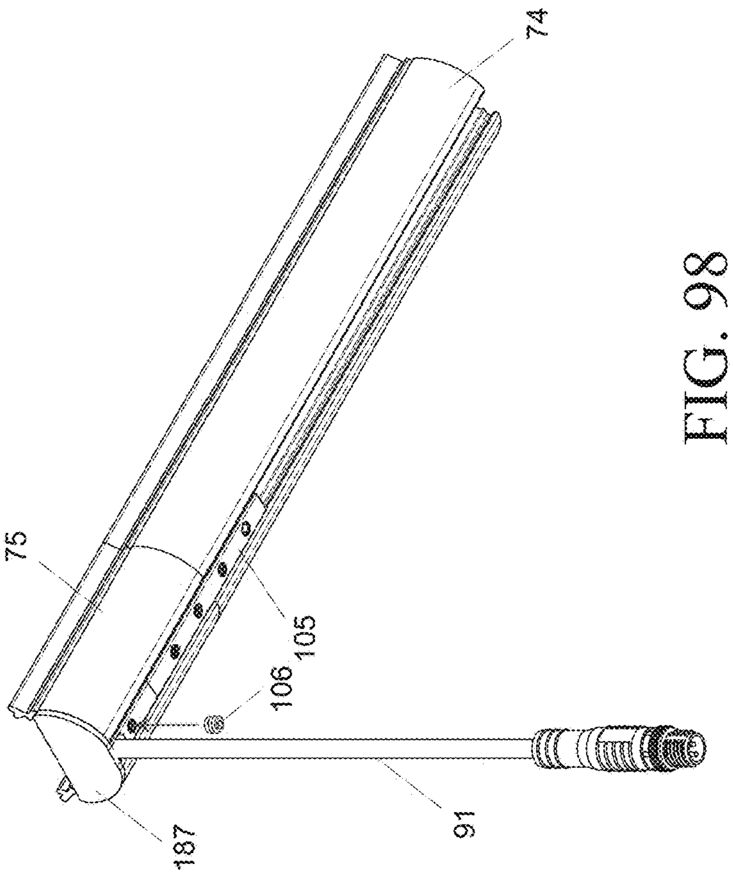
FIG. 98 is a partially exploded perspective view of an exemplary light module according to an exemplary aspect of the present invention.
Figure 97:
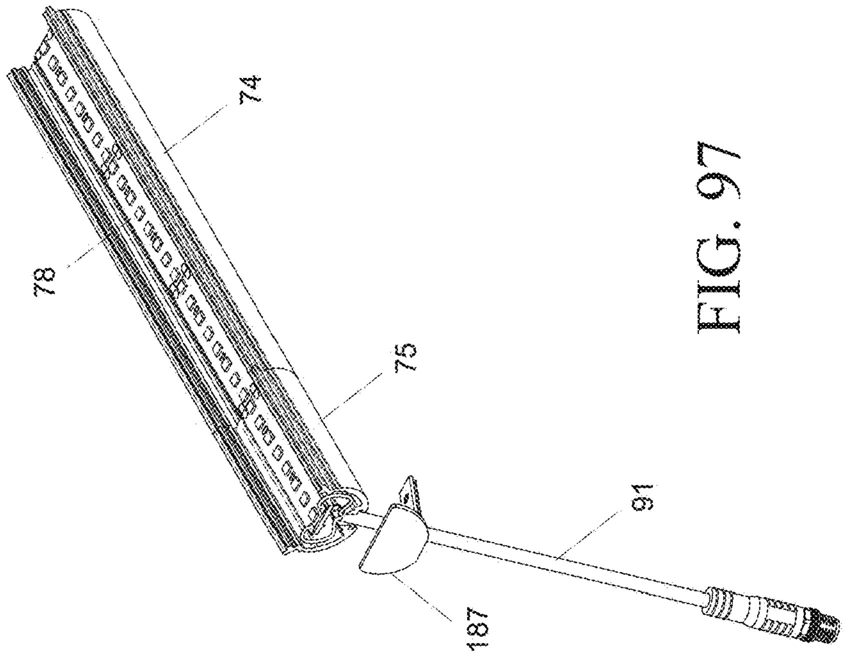
FIG. 97 is a partially exploded perspective view of an exemplary light module according to an exemplary aspect of the present invention.
Figure 100:
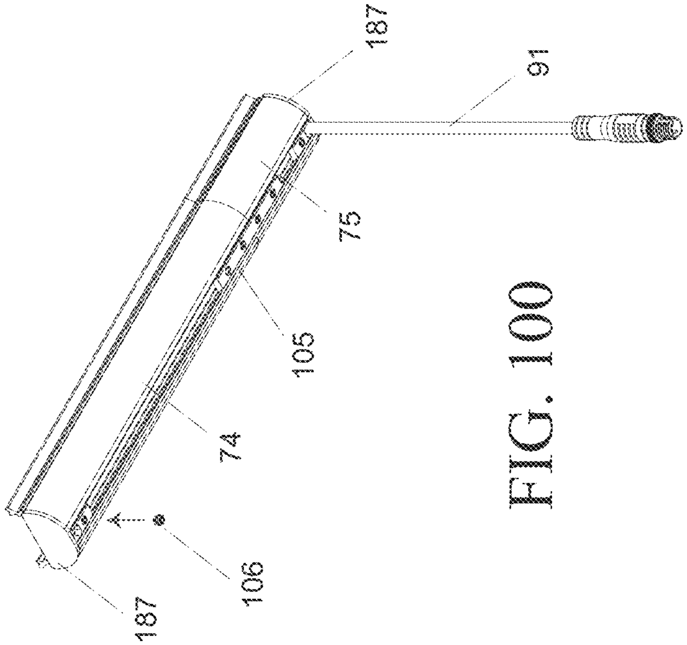
FIG. 100 is a partially exploded perspective view of an exemplary light module according to an exemplary aspect of the present invention.
Figure 99:
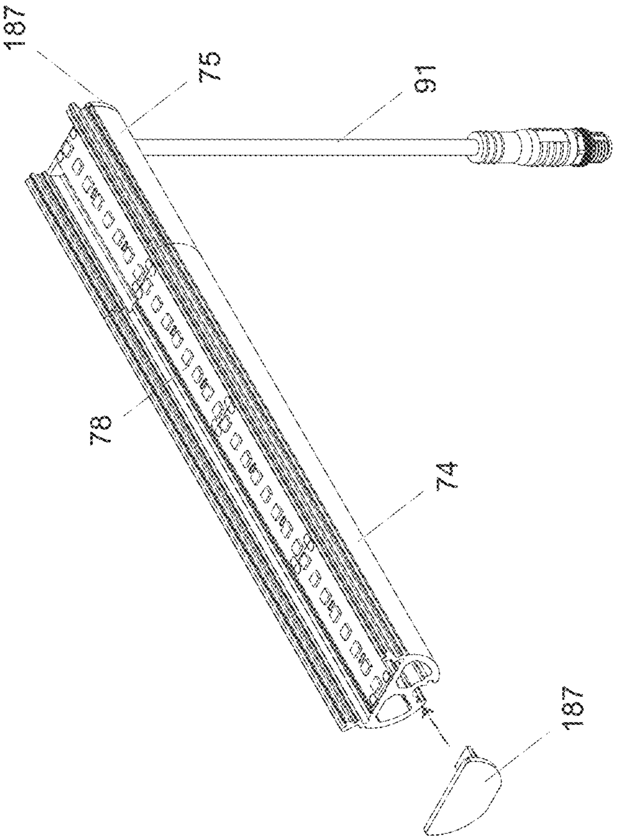
FIG. 99 is a partially exploded perspective view of an exemplary light module according to an exemplary aspect of the present invention.
Figure 102:
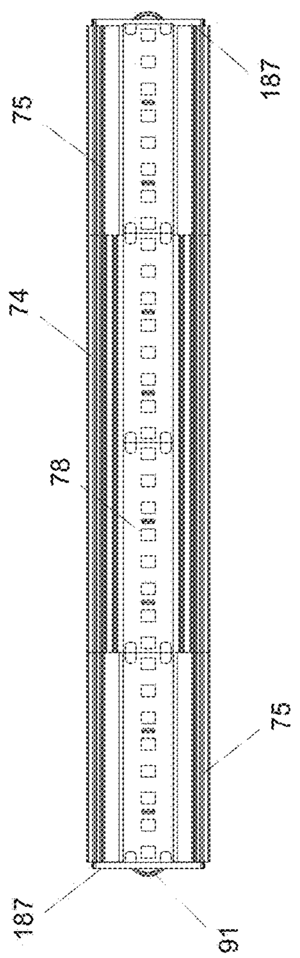
FIG. 102 is a top plan view of an exemplary light module according to an exemplary aspect of the present invention.
Figure 101:
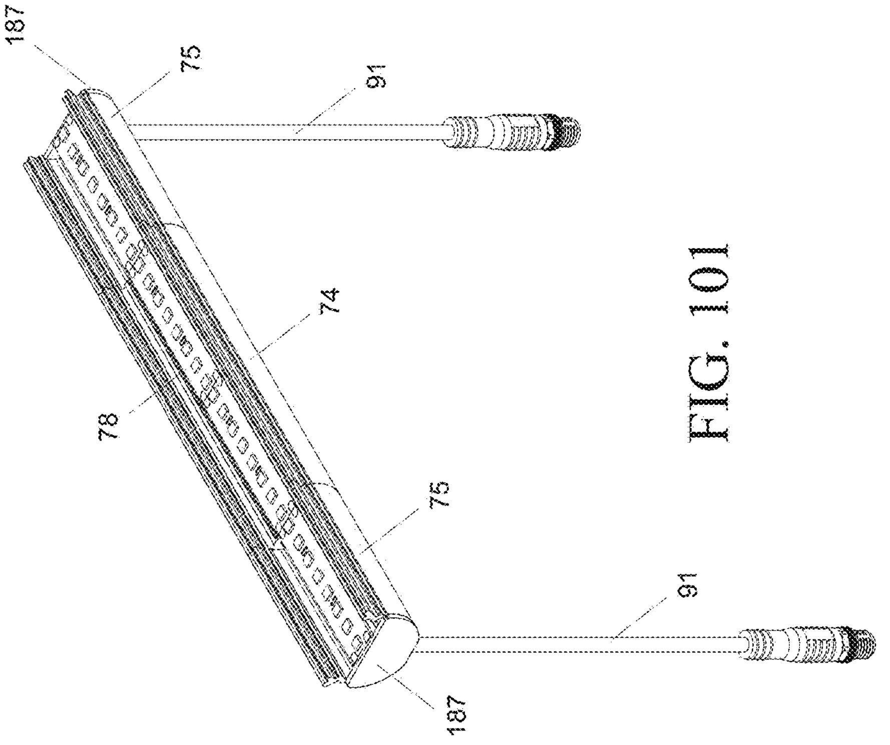
FIG. 101 is a perspective view of an exemplary light module according to an exemplary aspect of the present invention.

Referring now to FIGS. 51-53, the flange 22 may be secured to the housing 12 by engagement of the curved finger 68 of the flange 22 with the notch 52 of the housing 12. This engagement is similar with respect to the other embodiments of the flange 122, 222, 322, 422. The flange 22 may be secured to the housing 12 to reduce the likelihood of accidental uncoupling of the flange 22 from the housing 12 by one or more fasteners, such as screws, bolts, pins or the like, inserted through the flange 22 and into the longitudinal threaded channel 44 of the housing 12.

Referring now to FIGS. 54-57 and 57A, the driver 14 may be installed on the housing 12 by engagement of the connecting flange 104 of the driver 14 with the longitudinal recess 42 of the housing 12. The driver 14 may then be secured to the housing 12 through the use of one or more fasteners installed on the vertical mounting tab 102 and into the corresponding longitudinal threaded channel 44 of the housing 12.

Referring now to FIGS. 58-66, the installation of the light module 16 and connection of the light module 16 to the driver 14 is illustrated. The low voltage lighting wiring cover 97 may be removed from the driver 14, and then wiring from the driver 14 may be fed through an opening in the vertical wall 26 of the housing 12 through the cavity 54 and out of the opening 38 between the first arm 34 and the second arm 36. Corresponding wiring of the light module 16 may then be connected with the wiring from the driver 14. Extra wiring may be disposed and retained within the wire raceway 82 of the extrusion profile 74 of the light module 16. The light module 16 may then be press-fit into the housing 12 by a securing arrangement between the spring clip 48 and the first arcuate portion 30.

Referring now to FIGS. 88-102, assembly of the seamless component 75 to the extrusion profile 74 of the light module 16 will now be discussed. The seamless component 75 is aligned with the extrusion profile 74, and the inline bracket 105 is inserted into the slot 89 of the seamless component 75 and the wire raceway 82 of the extrusion profile 74. One or more set screws 106 may then be inserted into the inline bracket 105 to urge the inline bracket 105 into a secure relationship with the seamless component 75 and the extrusion profile 74. The lighting element 78, for example, a light emitting diode lighting strip, is aligned over the elevated surface 79 of the seamless component 75 and the surface 76 of the extrusion profile 74, and the lighting element 78 may then be adhered to the elevated surface 79 and surface 76 by a suitable adhesive. The wire 91 may then be inserted through a hole in the end cap 187, and the wire 91 soldered to the appropriate connections on the lighting element 78. The wire 91 is inserted into the recess 83 and passed between the elevated surface 79 and arcuate housing 77. The end cap 187 may then be inserted into the slot 89 and secured to the seamless component 75 by one or more set screws 106. A second end cap 187 may be inserted into the wire raceway 82 of the extrusion profile 74, and secured by one or more set screws 106. Alternatively, as shown for example in FIGS. 101 and 102, a seamless component 75 may be affixed to either end of the extrusion profile 74.

Referring now to FIGS. 67-70, a light diffuser 18, either in the form of the louver 88 or a housing lens 107 may be installed on the housing 12 to complete the installation of the lighting fixture 10.

FIGS. 71-79A illustrate an alternative installation of the lighting fixture 10 in which the driver 114 may be installed on the horizontal wall 24 of the housing 12. The installation and connection of the light module 16 to the driver 114 proceeds substantially the same as discussed above.

FIGS. 80-87A provide additional illustrations of the driver 14 installation of the lighting fixture 10. The installation and connection of the light module 16 to the driver 14 proceeds substantially the same as discussed above.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A lighting fixture, comprising:

a mounting bracket configured for attachment to a surface and having a supporting arm and a retaining bay at least partially bounded by the supporting arm; and a housing configured for attachment to the mounting bracket and having a longitudinal hook extending at least partially along a length of the housing;

wherein the retaining bay of the mounting bracket is configured to receive the longitudinal hook of the housing in a first direction;

wherein the mounting bracket further comprises a foot and the housing further comprises a first arm and a second arm; and wherein the first arm of the housing is configured to receive at least one fastener in a second direction substantially parallel with and opposite to the first direction and the at least one fastener operatively engages with the foot of the mounting bracket in the second direction.

2. The lighting fixture according to claim 1, wherein the mounting bracket further comprises an upright portion having the supporting arm and the foot extending therefrom.

3. The lighting fixture according to claim 2, wherein the mounting bracket further comprises an upper extended portion extending from one end of the upright portion and a lower extended portion extending from another end of the upright portion.

4. The lighting fixture according to claim 1, further comprising a light diffuser configured for attachment to the mounting bracket within an opening in the housing between the first arm and the second arm.

5. The lighting fixture according to claim 4, wherein the light diffuser comprises a louver portion and a cover extending at least partially over the louver portion.

6. The lighting fixture according to claim 1, further comprising a light emitting diode driver operatively coupled with the housing and electrically coupled with the light module.

7. The lighting fixture according to claim 1, wherein the housing further comprises a horizontal wall and a vertical wall coupled together by a shoulder portion, wherein the horizontal wall is positioned substantially perpendicular to the first direction and the vertical wall is positioned substantially parallel to the first direction.

8. The lighting fixture according to claim 7, further comprising a light emitting diode driver operatively coupled with the horizontal wall of the housing, wherein the horizontal wall of the housing comprises one or more longitudinal threaded channel each configured for receipt of one or more fasteners configured to affix the light emitting diode driver to the horizontal wall of the housing.

9. The lighting fixture according to claim 7, further comprising a light emitting diode driver operatively coupled with the horizontal wall and the vertical wall of the housing, wherein the horizontal wall of the housing comprises a longitudinal recess formed therein, and the vertical wall of the housing comprises at least one longitudinal threaded channels formed therein, wherein the light emitting diode driver comprises a connection flange configured for insertion into the longitudinal recess of the horizontal wall of the housing in the first direction, wherein the at least one longitudinal threaded channels formed in the vertical wall are configured for receipt of one or more fasteners configured to affix the light emitting diode driver to the vertical wall of the housing.

10. A lighting fixture, comprising:

a mounting bracket configured for attachment to a surface and having a supporting arm and a retaining bay at least partially bounded by the supporting arm;

a housing configured for attachment to the mounting bracket and having a longitudinal hook extending at least partially along a length of the housing; and a light module configured for removable attachment to the housing;

wherein the retaining bay of the mounting bracket is configured to receive the longitudinal hook of the housing in a first direction;

wherein the mounting bracket further comprises a foot and the housing further comprises a first arm and a second arm;

wherein the first arm of the housing is configured to receive at least one fastener in a second direction substantially opposite the first direction and the at least one fastener operatively engages with the foot of the mounting bracket in the second direction;

wherein housing further comprises a first arcuate portion and a second arcuate portion spaced apart from the first arcuate portion and having a spring clip disposed thereon; and wherein the spring clip is configured to urge the light module towards the first arcuate portion to removably attach the light module to the housing.

11. The lighting fixture according to claim 10, wherein the light module comprises an extrusion profile having a surface formed thereon for longitudinal positioning of a lighting element thereon, wherein the extrusion profile further comprises a wire raceway positioned on an opposite side of the extrusion profile from the surface.

12. The lighting fixture according to claim 11, wherein the light module further comprises a seamless component positioned on an end of the extrusion profile.

13. The lighting fixture according to claim 12, wherein the seamless component comprises an arcuate housing and an elevated surface connected to the arcuate housing by a longitudinal support, wherein when the seamless component is positioned on the end of the extrusion profile, the elevated surface is positioned on substantially the same plane as the surface of the extrusion profile.

14. The lighting fixture according to claim 13, wherein the seamless component is configured to be coupled with the extrusion profile by an inline bracket, and the lighting element is configured to extend at least partially along the elevated surface of the seamless component and the surface of the extrusion profile.

15. The lighting fixture according to claim 13, wherein the seamless component comprises a recess formed in an end thereof, and the end is configured for connection with an end cap having a hole formed therein for passage of a wire.

16. A lighting fixture, comprising:

a mounting bracket configured for attachment to a surface and having a supporting arm and a retaining bay at least partially bounded by the supporting arm;

a housing configured for attachment to the mounting bracket and having a longitudinal hook extending at least partially along a length of the housing; and a flange configured for attachment to the mounting bracket;

wherein the retaining bay of the mounting bracket is configured to receive the longitudinal hook of the housing in a first direction;

wherein the mounting bracket further comprises a foot and the housing further comprises a first arm and a second arm;

wherein the first arm of the housing is configured to receive at least one fastener in a second direction substantially opposite the first direction and the at least one fastener operatively engages with the foot of the mounting bracket in the second direction; wherein the second arm of the housing has a notch formed therein;

wherein the flange comprises a curved finger and the notch of the housing is configured to receive the curved finger in the first direction; and wherein the housing further comprises a threaded channel disposed on the second arm and configured to receive a fastener passing through the flange in a third direction substantially perpendicular to the first direction.

17. The lighting fixture according to claim 16, wherein the flange further comprises a beam portion, and the curved finger extends from one side of the beam portion, and a horizontal shoe extends from an opposite side of the beam portion.

18. The lighting fixture according to claim 17, wherein the horizontal shoe is configured for support of a ceiling surface.

19. The lighting fixture according to claim 16, wherein the flange further comprises a beam portion, and the curved finger extends from one side of the beam portion, and a horizontal shoe extends from an opposite side of the beam portion, wherein the flange further comprises an extension extending substantially parallel to the beam portion and substantially perpendicular to the horizontal shoe.

20. The lighting fixture according to claim 16, wherein the flange further comprises a beam portion, and the curved finger extends from one side of the beam portion, and a grooved shoe extends from an opposite side of the beam portion.

* * * * *